US010318266B2

United States Patent
Ribbich et al.

(10) Patent No.: US 10,318,266 B2
(45) Date of Patent: Jun. 11, 2019

(54) MODULAR MULTI-FUNCTION THERMOSTAT

(71) Applicant: Johnson Controls Technology Company, Plymouth, MI (US)

(72) Inventors: Joseph R. Ribbich, Waukesha, WI (US); Jacob P. Hicks, Milwaukee, WI (US); Zachary N. Posten, Oshkosh, WI (US); Daniel R. Gottschalk, Racine, WI (US); Michael L. Ribbich, Oconomowoc, WI (US); Charles J. Gaidish, South Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 160 days.

(21) Appl. No.: 15/360,976

(22) Filed: Nov. 23, 2016

(65) Prior Publication Data

US 2017/0146260 A1   May 25, 2017

Related U.S. Application Data

(60) Provisional application No. 62/260,141, filed on Nov. 25, 2015.

(51) Int. Cl.
*G06F 8/61* (2018.01)
*G05B 19/048* (2006.01)
(Continued)

(52) U.S. Cl.
CPC ................ *G06F 8/61* (2013.01); *F24F 11/30* (2018.01); *F24F 11/62* (2018.01); *G05B 15/02* (2013.01);
(Continued)

(58) Field of Classification Search
CPC .. F24F 11/30; F24F 11/50; F24F 11/52; F24F 11/62; G05B 15/02; G06F 8/65;
(Continued)

(56) References Cited

U.S. PATENT DOCUMENTS

| 4,107,464 A | 8/1978 | Lynch et al. |
| 4,942,613 A | 7/1990 | Lynch |

(Continued)

FOREIGN PATENT DOCUMENTS

| CA | 2466854 C | 4/2008 |
| CA | 2633200 C | 1/2011 |

(Continued)

OTHER PUBLICATIONS

Written Opinion for Singapore Application No. 11201708996V, dated Dec. 27, 2017, 6 pages.
(Continued)

*Primary Examiner* — Crystal J Barnes-Bullock
(74) *Attorney, Agent, or Firm* — Foley & Lardner LLP

(57) ABSTRACT

A thermostat includes a motherboard, a first modular board, and a display. The motherboard is configured to perform a thermostat function and generate a user interface a user interface including information relating to the thermostat function. The first modular board is configured to be added to the thermostat by coupling the first modular board to the motherboard and to be removed from the thermostat by decoupling the first modular board from the motherboard. The first modular board is configured to supplement the thermostat function performed by the motherboard when the first modular board is coupled to the motherboard. The display is communicably coupled to the motherboard. The display is configured to display the user interface. The motherboard is configured to adaptively reconfigure the user interface to include supplemental information provided by
(Continued)

the first modular board in response to coupling of the first modular board to the motherboard.

19 Claims, 19 Drawing Sheets

(51) Int. Cl.
| | |
|---|---|
| G06F 8/65 | (2018.01) |
| G05B 19/042 | (2006.01) |
| F24F 11/30 | (2018.01) |
| F24F 11/62 | (2018.01) |
| G05B 15/02 | (2006.01) |
| F24F 110/10 | (2018.01) |
| F24F 11/63 | (2018.01) |
| F24F 11/56 | (2018.01) |
| F24F 11/59 | (2018.01) |
| F24F 11/52 | (2018.01) |

(52) U.S. Cl.
CPC ....... *G05B 19/048* (2013.01); *G05B 19/0426* (2013.01); *G06F 8/65* (2013.01); *F24F 11/52* (2018.01); *F24F 11/56* (2018.01); *F24F 11/59* (2018.01); *F24F 11/63* (2018.01); *F24F 2110/10* (2018.01); *G05B 2219/2614* (2013.01); *G05B 2219/2642* (2013.01)

(58) Field of Classification Search
CPC .. G06F 9/44; G06F 8/61; G01K 13/00; H04L 12/2803; H04L 12/2807; H04L 12/2816; H04L 12/2832
See application file for complete search history.

(56) References Cited

U.S. PATENT DOCUMENTS

| | | | |
|---|---|---|---|
| 5,052,186 A | 10/1991 | Dudley et al. | |
| 5,062,276 A | 11/1991 | Dudley | |
| 5,797,729 A | 8/1998 | Rafuse et al. | |
| 6,121,885 A | 9/2000 | Masone et al. | |
| 6,164,374 A | 12/2000 | Rhodes et al. | |
| 6,169,937 B1 | 1/2001 | Peterson | |
| 6,227,961 B1 | 5/2001 | Moore et al. | |
| 6,260,765 B1 | 7/2001 | Natale et al. | |
| 6,314,750 B1 | 11/2001 | Ishikawa et al. | |
| 6,351,693 B1 | 2/2002 | Monie et al. | |
| 6,435,418 B1 | 8/2002 | Toth et al. | |
| 6,487,869 B1 | 12/2002 | Sulc et al. | |
| 6,557,771 B2 | 5/2003 | Shah | |
| 6,641,054 B2 | 11/2003 | Morey | |
| 6,726,112 B1 | 4/2004 | Ho | |
| 6,726,113 B2 | 4/2004 | Guo | |
| 6,810,307 B1 | 10/2004 | Addy | |
| 6,824,069 B2 | 11/2004 | Rosen | |
| 6,851,621 B1 | 2/2005 | Wacker et al. | |
| 6,874,691 B1 | 4/2005 | Hildebrand et al. | |
| 6,888,441 B2 | 5/2005 | Carey | |
| 6,995,518 B2 | 2/2006 | Havlik et al. | |
| 7,028,912 B1 | 4/2006 | Rosen | |
| 7,083,109 B2 | 8/2006 | Pouchak | |
| 7,099,748 B2 | 8/2006 | Rayburn | |
| 7,140,551 B2 | 11/2006 | De Pauw et al. | |
| 7,146,253 B2 | 12/2006 | Hoog et al. | |
| 7,152,806 B1 | 12/2006 | Rosen | |
| 7,156,317 B1 | 1/2007 | Moore | |
| 7,156,318 B1 | 1/2007 | Rosen | |
| 7,159,789 B2 | 1/2007 | Schwendinger et al. | |
| 7,159,790 B2 | 1/2007 | Schwendinger et al. | |
| 7,167,079 B2 | 1/2007 | Smyth et al. | |
| 7,188,002 B2 | 3/2007 | Chapman et al. | |
| 7,212,887 B2 | 5/2007 | Shah et al. | |
| 7,225,054 B2 | 5/2007 | Amundson et al. | |
| 7,232,075 B1 | 6/2007 | Rosen | |
| 7,261,243 B2 | 8/2007 | Butler et al. | |
| 7,274,972 B2 | 9/2007 | Amundson et al. | |
| 7,287,709 B2 | 10/2007 | Proffitt et al. | |
| 7,296,426 B2 | 11/2007 | Butler et al. | |
| 7,299,996 B2 | 11/2007 | Garrett et al. | |
| 7,306,165 B2 | 12/2007 | Shah | |
| 7,308,384 B2 | 12/2007 | Shah et al. | |
| 7,317,970 B2 | 1/2008 | Pienta et al. | |
| 7,331,187 B2 | 2/2008 | Kates | |
| 7,343,751 B2 | 3/2008 | Kates | |
| 7,383,158 B2 | 6/2008 | Krocker et al. | |
| 7,402,780 B2 | 7/2008 | Mueller et al. | |
| 7,434,744 B2 | 10/2008 | Garozzo et al. | |
| 7,442,012 B2 | 10/2008 | Moens | |
| 7,469,550 B2 | 12/2008 | Chapman et al. | |
| 7,475,558 B2 | 1/2009 | Perry | |
| 7,475,828 B2 | 1/2009 | Bartlett et al. | |
| 7,556,207 B2 | 7/2009 | Mueller et al. | |
| 7,565,813 B2 | 7/2009 | Pouchak | |
| 7,575,179 B2 | 8/2009 | Morrow et al. | |
| 7,584,897 B2 | 9/2009 | Schultz et al. | |
| 7,592,713 B2 * | 9/2009 | Bryan | B60R 16/0315 307/9.1 |
| 7,614,567 B2 | 11/2009 | Chapman et al. | |
| 7,624,931 B2 | 12/2009 | Chapman et al. | |
| 7,633,743 B2 | 12/2009 | Barton et al. | |
| 7,636,604 B2 | 12/2009 | Bergman et al. | |
| 7,638,739 B2 | 12/2009 | Rhodes et al. | |
| 7,641,126 B2 | 1/2010 | Schultz et al. | |
| 7,645,158 B2 | 1/2010 | Mulhouse et al. | |
| 7,667,163 B2 | 2/2010 | Ashworth et al. | |
| 7,726,581 B2 | 6/2010 | Naujok et al. | |
| 7,731,096 B2 | 6/2010 | Lorenz et al. | |
| 7,731,098 B2 | 6/2010 | Butler et al. | |
| 7,740,184 B2 | 6/2010 | Schnell et al. | |
| 7,748,225 B2 | 7/2010 | Butler et al. | |
| 7,748,639 B2 | 7/2010 | Perry | |
| 7,748,640 B2 | 7/2010 | Roher et al. | |
| 7,755,220 B2 | 7/2010 | Sorg et al. | |
| 7,765,826 B2 | 8/2010 | Nichols | |
| 7,774,102 B2 | 8/2010 | Butler et al. | |
| 7,775,452 B2 | 8/2010 | Shah et al. | |
| 7,784,291 B2 | 8/2010 | Butler et al. | |
| 7,784,704 B2 | 8/2010 | Harter | |
| 7,802,618 B2 | 9/2010 | Simon et al. | |
| 7,832,221 B2 | 11/2010 | Wijaya et al. | |
| 7,832,652 B2 | 11/2010 | Barton et al. | |
| 7,845,576 B2 | 12/2010 | Siddaramanna et al. | |
| 7,861,941 B2 | 1/2011 | Schultz et al. | |
| 7,867,646 B2 | 1/2011 | Rhodes | |
| 7,908,116 B2 | 3/2011 | Steinberg et al. | |
| 7,908,117 B2 | 3/2011 | Steinberg et al. | |
| 7,918,406 B2 | 4/2011 | Rosen | |
| 7,938,336 B2 | 5/2011 | Rhodes et al. | |
| 7,941,294 B2 | 5/2011 | Shahi et al. | |
| 7,954,726 B2 | 6/2011 | Siddaramanna et al. | |
| 7,963,454 B2 | 6/2011 | Sullivan et al. | |
| 7,979,164 B2 | 7/2011 | Garozzo et al. | |
| 7,992,794 B2 | 8/2011 | Leen et al. | |
| 8,010,237 B2 | 8/2011 | Cheung et al. | |
| 8,032,254 B2 | 10/2011 | Amundson et al. | |
| 8,078,326 B2 | 12/2011 | Harrod et al. | |
| 8,082,065 B2 | 12/2011 | Imes et al. | |
| 8,083,154 B2 | 12/2011 | Schultz et al. | |
| 8,089,032 B2 | 1/2012 | Beland et al. | |
| 8,091,794 B2 | 1/2012 | Siddaramanna et al. | |
| 8,099,195 B2 | 1/2012 | Imes et al. | |
| 8,108,076 B2 | 1/2012 | Imes et al. | |
| 8,131,506 B2 | 3/2012 | Steinberg et al. | |
| 8,141,791 B2 | 3/2012 | Rosen | |
| 8,167,216 B2 | 5/2012 | Schultz et al. | |
| 8,180,492 B2 | 5/2012 | Steinberg | |
| 8,190,296 B2 | 5/2012 | Alhilo | |
| 8,195,313 B1 | 6/2012 | Fadell et al. | |
| 8,196,185 B2 | 6/2012 | Geadelmann et al. | |
| 8,209,059 B2 | 6/2012 | Stockton | |
| 8,239,066 B2 | 8/2012 | Jennings et al. | |
| 8,276,829 B2 | 10/2012 | Stoner et al. | |
| 8,280,536 B1 | 10/2012 | Fadell et al. | |

(56) References Cited

U.S. PATENT DOCUMENTS

| | | | |
|---|---|---|---|
| 8,289,182 B2 | 10/2012 | Vogel et al. | |
| 8,289,226 B2 | 10/2012 | Takach et al. | |
| 8,299,919 B2 | 10/2012 | Dayton et al. | |
| 8,321,058 B2 | 11/2012 | Zhou et al. | |
| 8,346,396 B2 | 1/2013 | Amundson et al. | |
| 8,387,891 B1 | 3/2013 | Simon et al. | |
| 8,393,550 B2 | 3/2013 | Simon et al. | |
| 8,412,488 B2 | 4/2013 | Steinberg et al. | |
| 8,429,566 B2 | 4/2013 | Koushik et al. | |
| 8,456,293 B1 | 6/2013 | Trundle et al. | |
| 8,473,109 B1 | 6/2013 | Imes et al. | |
| 8,476,964 B1 | 7/2013 | Atri | |
| 8,489,243 B2 | 7/2013 | Fadell et al. | |
| 8,504,180 B2 | 8/2013 | Imes et al. | |
| 8,510,255 B2 | 8/2013 | Fadell et al. | |
| 8,511,576 B2 | 8/2013 | Warren et al. | |
| 8,511,577 B2 | 8/2013 | Warren et al. | |
| 8,517,088 B2 | 8/2013 | Moore et al. | |
| 8,523,083 B2 | 9/2013 | Warren et al. | |
| 8,523,084 B2 | 9/2013 | Siddaramanna et al. | |
| 8,527,096 B2 | 9/2013 | Pavlak et al. | |
| 8,532,827 B2 | 9/2013 | Stefanski et al. | |
| 8,544,285 B2 | 10/2013 | Stefanski et al. | |
| 8,549,658 B2 | 10/2013 | Kolavennu et al. | |
| 8,550,368 B2 | 10/2013 | Butler et al. | |
| 8,554,374 B2 | 10/2013 | Lunacek et al. | |
| 8,555,662 B2 | 10/2013 | Peterson et al. | |
| 8,558,179 B2 | 10/2013 | Filson et al. | |
| 8,560,127 B2 | 10/2013 | Leen et al. | |
| 8,560,128 B2 | 10/2013 | Ruff et al. | |
| 8,571,518 B2 | 10/2013 | Imes et al. | |
| 8,594,850 B1 * | 11/2013 | Gourlay | G05B 15/02 700/276 |
| 8,596,550 B2 | 12/2013 | Steinberg et al. | |
| 8,600,564 B2 | 12/2013 | Imes et al. | |
| 8,606,409 B2 | 12/2013 | Amundson et al. | |
| 8,613,792 B2 | 12/2013 | Ragland et al. | |
| 8,620,841 B1 | 12/2013 | Filson et al. | |
| 8,622,314 B2 | 1/2014 | Fisher et al. | |
| 8,626,344 B2 | 1/2014 | Imes et al. | |
| 8,630,741 B1 | 1/2014 | Matsuoka et al. | |
| 8,630,742 B1 | 1/2014 | Stefanski et al. | |
| 8,644,009 B2 | 2/2014 | Rylski et al. | |
| 8,659,302 B1 | 2/2014 | Warren et al. | |
| 8,671,702 B1 | 3/2014 | Shotey et al. | |
| 8,674,816 B2 | 3/2014 | Trundle et al. | |
| 8,689,572 B2 | 4/2014 | Evans et al. | |
| 8,695,887 B2 | 4/2014 | Helt et al. | |
| 8,706,270 B2 | 4/2014 | Fadell et al. | |
| 8,708,242 B2 | 4/2014 | Conner et al. | |
| 8,712,590 B2 | 4/2014 | Steinberg | |
| 8,718,826 B2 | 5/2014 | Ramachandran et al. | |
| 8,726,680 B2 | 5/2014 | Schenk et al. | |
| 8,727,611 B2 | 5/2014 | Huppi et al. | |
| 8,738,327 B2 | 5/2014 | Steinberg et al. | |
| 8,746,583 B2 | 6/2014 | Simon et al. | |
| 8,752,771 B2 | 6/2014 | Warren et al. | |
| 8,754,780 B2 | 6/2014 | Petite et al. | |
| 8,766,194 B2 | 7/2014 | Filson et al. | |
| 8,770,490 B2 | 7/2014 | Drew | |
| 8,770,491 B2 | 7/2014 | Warren et al. | |
| 8,788,103 B2 | 7/2014 | Warren et al. | |
| 8,802,981 B2 | 8/2014 | Wallaert et al. | |
| 8,830,267 B2 | 9/2014 | Brackney | |
| 8,838,282 B1 | 9/2014 | Ratliff et al. | |
| 8,843,239 B2 | 9/2014 | Mighdoll et al. | |
| 8,850,348 B2 | 9/2014 | Fadell et al. | |
| 8,855,830 B2 | 10/2014 | Imes et al. | |
| 8,868,219 B2 | 10/2014 | Fadell et al. | |
| 8,870,086 B2 | 10/2014 | Tessier et al. | |
| 8,870,087 B2 | 10/2014 | Pienta et al. | |
| 8,880,047 B2 | 11/2014 | Konicek et al. | |
| 8,893,032 B2 | 11/2014 | Bruck et al. | |
| 8,903,552 B2 | 12/2014 | Amundson et al. | |
| 8,918,219 B2 | 12/2014 | Sloo et al. | |
| 8,942,853 B2 | 1/2015 | Stefanski et al. | |
| 8,944,338 B2 | 2/2015 | Warren et al. | |
| 8,950,686 B2 | 2/2015 | Matsuoka et al. | |
| 8,950,687 B2 | 2/2015 | Bergman et al. | |
| 8,961,005 B2 | 2/2015 | Huppi et al. | |
| 8,978,994 B2 | 3/2015 | Moore et al. | |
| 8,998,102 B2 | 4/2015 | Fadell et al. | |
| 9,014,686 B2 | 4/2015 | Ramachandran et al. | |
| 9,014,860 B2 | 4/2015 | Moore et al. | |
| 9,020,647 B2 | 4/2015 | Johnson et al. | |
| 9,026,232 B2 | 5/2015 | Fadell et al. | |
| 9,033,255 B2 | 5/2015 | Tessier et al. | |
| RE45,574 E | 6/2015 | Harter | |
| 9,074,784 B2 | 7/2015 | Sullivan et al. | |
| 9,075,419 B2 | 7/2015 | Sloo et al. | |
| 9,077,055 B2 | 7/2015 | Yau | |
| 9,080,782 B1 | 7/2015 | Sheikh | |
| 9,081,393 B2 | 7/2015 | Lunacek et al. | |
| 9,086,703 B2 | 7/2015 | Warren et al. | |
| 9,088,306 B1 | 7/2015 | Ramachandran et al. | |
| 9,092,039 B2 | 7/2015 | Fadell et al. | |
| 9,098,279 B2 | 8/2015 | Mucignat et al. | |
| 9,116,529 B2 | 8/2015 | Warren et al. | |
| 9,121,623 B2 | 9/2015 | Filson et al. | |
| 9,122,283 B2 | 9/2015 | Rylski et al. | |
| 9,125,049 B2 | 9/2015 | Huang et al. | |
| 9,127,853 B2 | 9/2015 | Filson et al. | |
| 9,134,710 B2 | 9/2015 | Cheung et al. | |
| 9,134,715 B2 | 9/2015 | Geadelmann et al. | |
| 9,146,041 B2 | 9/2015 | Novotny et al. | |
| 9,151,510 B2 | 10/2015 | Leen | |
| 9,154,001 B2 | 10/2015 | Dharwada et al. | |
| 9,157,764 B2 | 10/2015 | Shetty et al. | |
| 9,164,524 B2 | 10/2015 | Imes et al. | |
| 9,175,868 B2 | 11/2015 | Fadell et al. | |
| 9,175,871 B2 | 11/2015 | Gourlay et al. | |
| 9,182,141 B2 | 11/2015 | Sullivan et al. | |
| 9,189,751 B2 | 11/2015 | Matsuoka et al. | |
| 9,191,277 B2 | 11/2015 | Rezvani et al. | |
| 9,191,909 B2 | 11/2015 | Rezvani et al. | |
| 9,194,597 B2 | 11/2015 | Steinberg et al. | |
| 9,194,598 B2 | 11/2015 | Fadell et al. | |
| 9,194,600 B2 | 11/2015 | Kates | |
| 9,207,817 B2 | 12/2015 | Tu | |
| 9,213,342 B2 | 12/2015 | Drake et al. | |
| 9,215,281 B2 | 12/2015 | Iggulden et al. | |
| 9,222,693 B2 | 12/2015 | Gourlay et al. | |
| 9,223,323 B2 | 12/2015 | Matas et al. | |
| 9,234,669 B2 | 1/2016 | Filson et al. | |
| 9,244,445 B2 | 1/2016 | Finch et al. | |
| 9,244,470 B2 | 1/2016 | Steinberg | |
| 9,261,287 B2 | 2/2016 | Warren et al. | |
| 9,268,344 B2 | 2/2016 | Warren et al. | |
| 9,279,595 B2 | 3/2016 | Mighdoll et al. | |
| 9,282,590 B2 | 3/2016 | Donlan | |
| 9,285,134 B2 | 3/2016 | Bray et al. | |
| 9,285,802 B2 | 3/2016 | Arensmeier | |
| 9,286,781 B2 | 3/2016 | Filson et al. | |
| 9,291,359 B2 | 3/2016 | Fadell et al. | |
| 9,292,022 B2 | 3/2016 | Ramachandran et al. | |
| 9,298,196 B2 | 3/2016 | Matsuoka et al. | |
| 9,298,197 B2 | 3/2016 | Matsuoka et al. | |
| 9,319,234 B2 * | 4/2016 | Davis | H04L 12/2803 |
| D763,707 S | 8/2016 | Sinha et al. | |
| 9,589,459 B2 * | 3/2017 | Davis | G08C 17/02 |
| D790,369 S | 6/2017 | Sinha et al. | |
| 9,762,408 B2 * | 9/2017 | Davis | G08C 17/02 |
| 9,857,238 B2 * | 1/2018 | Malhotra | G01K 13/00 |
| 9,887,887 B2 | 2/2018 | Hunter et al. | |
| 10,021,801 B2 * | 7/2018 | Deros | H04W 84/12 |
| 2001/0015281 A1 | 8/2001 | Schiedegger et al. | |
| 2003/0034897 A1 | 2/2003 | Shamoon et al. | |
| 2003/0034898 A1 | 2/2003 | Shamoon et al. | |
| 2003/0136853 A1 | 7/2003 | Morey | |
| 2003/0177012 A1 | 9/2003 | Drennan | |
| 2004/0074978 A1 | 4/2004 | Rosen | |
| 2004/0125940 A1 | 7/2004 | Turcan et al. | |
| 2004/0249479 A1 | 12/2004 | Shorrock | |
| 2004/0262410 A1 | 12/2004 | Hull | |

(56) References Cited

U.S. PATENT DOCUMENTS

| | | |
|---|---|---|
| 2005/0040943 A1 | 2/2005 | Winick |
| 2005/0083168 A1 | 4/2005 | Breitenbach |
| 2005/0119794 A1 | 6/2005 | Amundson et al. |
| 2005/0156049 A1 | 7/2005 | Van Ostrand et al. |
| 2005/0194456 A1 | 9/2005 | Tessier et al. |
| 2005/0195757 A1 | 9/2005 | Kidder et al. |
| 2005/0270151 A1 | 12/2005 | Winick |
| 2005/0270735 A1 | 12/2005 | Chen |
| 2006/0038025 A1 | 2/2006 | Lee |
| 2006/0113398 A1 | 6/2006 | Ashworth |
| 2006/0192022 A1 | 8/2006 | Barton et al. |
| 2006/0226970 A1 | 10/2006 | Saga et al. |
| 2006/0260334 A1 | 11/2006 | Carey et al. |
| 2007/0013532 A1 | 1/2007 | Ehlers |
| 2007/0045431 A1 | 3/2007 | Chapman et al. |
| 2007/0050732 A1 | 3/2007 | Chapman et al. |
| 2007/0057079 A1 | 3/2007 | Stark et al. |
| 2007/0114295 A1 | 5/2007 | Jenkins |
| 2007/0198099 A9 | 8/2007 | Shah |
| 2007/0228182 A1 | 10/2007 | Wagner et al. |
| 2007/0228183 A1 | 10/2007 | Kennedy et al. |
| 2007/0241203 A1 | 10/2007 | Wagner et al. |
| 2008/0015740 A1 | 1/2008 | Osann |
| 2008/0048046 A1 | 2/2008 | Wagner et al. |
| 2008/0054084 A1 | 3/2008 | Olson |
| 2008/0099568 A1 | 5/2008 | Nicodem et al. |
| 2008/0120446 A1 | 5/2008 | Butler et al. |
| 2008/0161978 A1 | 7/2008 | Shah |
| 2008/0216495 A1 | 9/2008 | Kates |
| 2008/0223051 A1 | 9/2008 | Kates |
| 2008/0227430 A1 | 9/2008 | Polk |
| 2008/0280637 A1 | 11/2008 | Shaffer et al. |
| 2008/0289347 A1 | 11/2008 | Kadle et al. |
| 2008/0290183 A1 | 11/2008 | Laberge et al. |
| 2008/0294274 A1 | 11/2008 | Laberge et al. |
| 2008/0295030 A1 | 11/2008 | Laberge et al. |
| 2009/0140065 A1 | 6/2009 | Juntunen et al. |
| 2009/0143880 A1 | 6/2009 | Amundson et al. |
| 2009/0143918 A1 | 6/2009 | Amundson et al. |
| 2009/0144015 A1 | 6/2009 | Bedard |
| 2009/0251422 A1 | 10/2009 | Wu et al. |
| 2009/0276096 A1 | 11/2009 | Proffitt et al. |
| 2010/0070092 A1 | 3/2010 | Winter et al. |
| 2010/0084482 A1 | 4/2010 | Kennedy et al. |
| 2010/0131884 A1 | 5/2010 | Shah |
| 2010/0145536 A1 | 6/2010 | Masters et al. |
| 2010/0163633 A1 | 7/2010 | Barrett et al. |
| 2010/0163635 A1 | 7/2010 | Ye |
| 2010/0171889 A1 | 7/2010 | Pantel et al. |
| 2010/0182743 A1 | 7/2010 | Roher |
| 2010/0190479 A1 | 7/2010 | Scott et al. |
| 2010/0204834 A1 | 8/2010 | Comerford et al. |
| 2010/0212879 A1 | 8/2010 | Schnell et al. |
| 2010/0250707 A1 | 9/2010 | Dalley et al. |
| 2011/0006887 A1 | 1/2011 | Shaull et al. |
| 2011/0067851 A1 | 3/2011 | Terlson et al. |
| 2011/0088416 A1 | 4/2011 | Koethler |
| 2011/0128378 A1* | 6/2011 | Raji ............... G06F 17/30873 348/143 |
| 2011/0132991 A1 | 6/2011 | Moody et al. |
| 2011/0181412 A1 | 7/2011 | Alexander et al. |
| 2011/0264279 A1 | 10/2011 | Poth |
| 2012/0001873 A1 | 1/2012 | Wu et al. |
| 2012/0007555 A1 | 1/2012 | Bukow |
| 2012/0048955 A1 | 3/2012 | Lin et al. |
| 2012/0061480 A1 | 3/2012 | Deligiannis et al. |
| 2012/0093141 A1 | 4/2012 | Imes et al. |
| 2012/0095601 A1 | 4/2012 | Abraham et al. |
| 2012/0101637 A1 | 4/2012 | Imes et al. |
| 2012/0126020 A1 | 5/2012 | Filson et al. |
| 2012/0126021 A1 | 5/2012 | Warren et al. |
| 2012/0131504 A1 | 5/2012 | Fadell et al. |
| 2012/0165993 A1 | 6/2012 | Whitehouse |
| 2012/0179727 A1 | 7/2012 | Esser |
| 2012/0181010 A1 | 7/2012 | Schultz et al. |
| 2012/0191257 A1 | 7/2012 | Corcoran et al. |
| 2012/0193437 A1 | 8/2012 | Henry et al. |
| 2012/0229521 A1 | 9/2012 | Hales et al. |
| 2012/0230661 A1 | 9/2012 | Alhilo |
| 2012/0239207 A1 | 9/2012 | Fadell et al. |
| 2012/0252430 A1 | 10/2012 | Imes et al. |
| 2012/0259470 A1 | 10/2012 | Nijhawan et al. |
| 2012/0298763 A1 | 11/2012 | Young |
| 2012/0303165 A1 | 11/2012 | Qu et al. |
| 2012/0303828 A1 | 11/2012 | Young et al. |
| 2012/0310418 A1 | 12/2012 | Harrod et al. |
| 2012/0315848 A1 | 12/2012 | Smith et al. |
| 2013/0002447 A1 | 1/2013 | Vogel et al. |
| 2013/0054758 A1 | 2/2013 | Imes et al. |
| 2013/0057381 A1 | 3/2013 | Kandhasamy |
| 2013/0087628 A1 | 4/2013 | Nelson et al. |
| 2013/0090767 A1 | 4/2013 | Bruck et al. |
| 2013/0099008 A1 | 4/2013 | Aljabari et al. |
| 2013/0099009 A1 | 4/2013 | Filson et al. |
| 2013/0123991 A1 | 5/2013 | Richmond |
| 2013/0138250 A1 | 5/2013 | Mowery et al. |
| 2013/0144443 A1 | 6/2013 | Casson et al. |
| 2013/0151016 A1 | 6/2013 | Bias et al. |
| 2013/0151018 A1 | 6/2013 | Bias et al. |
| 2013/0158721 A1 | 6/2013 | Somasundaram et al. |
| 2013/0163300 A1 | 6/2013 | Zhao et al. |
| 2013/0180700 A1 | 7/2013 | Aycock |
| 2013/0190932 A1 | 7/2013 | Schuman |
| 2013/0190940 A1 | 7/2013 | Sloop et al. |
| 2013/0204408 A1 | 8/2013 | Thiruvengada et al. |
| 2013/0204441 A1 | 8/2013 | Sloo et al. |
| 2013/0204442 A1 | 8/2013 | Modi et al. |
| 2013/0211600 A1 | 8/2013 | Dean-Hendricks et al. |
| 2013/0215058 A1 | 8/2013 | Brazell et al. |
| 2013/0221117 A1 | 8/2013 | Warren et al. |
| 2013/0228633 A1 | 9/2013 | Toth et al. |
| 2013/0234840 A1 | 9/2013 | Trundle et al. |
| 2013/0238142 A1 | 9/2013 | Nichols et al. |
| 2013/0245838 A1 | 9/2013 | Zywicki et al. |
| 2013/0261803 A1 | 10/2013 | Kolavennu |
| 2013/0261807 A1 | 10/2013 | Zywicki et al. |
| 2013/0268125 A1 | 10/2013 | Matsuoka |
| 2013/0268129 A1 | 10/2013 | Fadell et al. |
| 2013/0271670 A1 | 10/2013 | Sakata et al. |
| 2013/0292481 A1 | 11/2013 | Filson et al. |
| 2013/0297078 A1 | 11/2013 | Kolavennu |
| 2013/0318217 A1 | 11/2013 | Imes et al. |
| 2013/0318444 A1 | 11/2013 | Imes et al. |
| 2013/0325190 A1 | 12/2013 | Imes et al. |
| 2013/0338837 A1 | 12/2013 | Hublou et al. |
| 2013/0338839 A1 | 12/2013 | Rogers et al. |
| 2013/0340993 A1 | 12/2013 | Siddaramanna et al. |
| 2013/0345882 A1 | 12/2013 | Dushane et al. |
| 2014/0000861 A1 | 1/2014 | Barrett et al. |
| 2014/0002461 A1 | 1/2014 | Wang |
| 2014/0031989 A1 | 1/2014 | Bergman et al. |
| 2014/0034284 A1 | 2/2014 | Butler et al. |
| 2014/0039692 A1 | 2/2014 | Leen et al. |
| 2014/0041846 A1 | 2/2014 | Leen et al. |
| 2014/0048608 A1 | 2/2014 | Frank |
| 2014/0052300 A1 | 2/2014 | Matsuoka et al. |
| 2014/0058806 A1 | 2/2014 | Guenette et al. |
| 2014/0070919 A1 | 3/2014 | Jackson et al. |
| 2014/0081466 A1 | 3/2014 | Huapeng et al. |
| 2014/0112331 A1 | 4/2014 | Rosen |
| 2014/0114706 A1 | 4/2014 | Blakely |
| 2014/0117103 A1 | 5/2014 | Rossi et al. |
| 2014/0118285 A1 | 5/2014 | Poplawski |
| 2014/0129034 A1 | 5/2014 | Stefanski et al. |
| 2014/0149270 A1 | 5/2014 | Lombard et al. |
| 2014/0151456 A1 | 6/2014 | McCurnin et al. |
| 2014/0152631 A1 | 6/2014 | Moore et al. |
| 2014/0156087 A1 | 6/2014 | Amundson |
| 2014/0158338 A1 | 6/2014 | Kates |
| 2014/0165612 A1 | 6/2014 | Qu et al. |
| 2014/0175181 A1 | 6/2014 | Warren et al. |
| 2014/0188288 A1 | 7/2014 | Fisher et al. |
| 2014/0191848 A1 | 7/2014 | Imes et al. |
| 2014/0207291 A1 | 7/2014 | Golden et al. |

(56) References Cited

U.S. PATENT DOCUMENTS

| | | |
|---|---|---|
| 2014/0207292 A1 | 7/2014 | Ramagem et al. |
| 2014/0214212 A1 | 7/2014 | Leen et al. |
| 2014/0216078 A1 | 8/2014 | Ladd |
| 2014/0217185 A1 | 8/2014 | Bicknell |
| 2014/0217186 A1 | 8/2014 | Kramer et al. |
| 2014/0228983 A1 | 8/2014 | Groskreutz et al. |
| 2014/0231530 A1 | 8/2014 | Warren et al. |
| 2014/0244047 A1 | 8/2014 | Oh et al. |
| 2014/0250399 A1 | 9/2014 | Gaherwar |
| 2014/0262196 A1 | 9/2014 | Frank et al. |
| 2014/0262484 A1 | 9/2014 | Khoury et al. |
| 2014/0263679 A1 | 9/2014 | Conner et al. |
| 2014/0267008 A1 | 9/2014 | Jain et al. |
| 2014/0277762 A1 | 9/2014 | Drew |
| 2014/0277769 A1 | 9/2014 | Matsuoka et al. |
| 2014/0277770 A1 | 9/2014 | Aljabari et al. |
| 2014/0299670 A1 | 10/2014 | Ramachandran et al. |
| 2014/0309792 A1 | 10/2014 | Drew |
| 2014/0312129 A1 | 10/2014 | Zikes et al. |
| 2014/0312131 A1 | 10/2014 | Tousignant et al. |
| 2014/0312694 A1 | 10/2014 | Tu et al. |
| 2014/0316585 A1 | 10/2014 | Boesveld et al. |
| 2014/0316586 A1 | 10/2014 | Boesveld et al. |
| 2014/0316587 A1 | 10/2014 | Imes et al. |
| 2014/0317029 A1 | 10/2014 | Matsuoka et al. |
| 2014/0319231 A1 | 10/2014 | Matsuoka et al. |
| 2014/0319236 A1 | 10/2014 | Novotny et al. |
| 2014/0320282 A1 | 10/2014 | Zhang |
| 2014/0321011 A1 | 10/2014 | Bisson et al. |
| 2014/0324232 A1 | 10/2014 | Modi et al. |
| 2014/0330435 A1 | 11/2014 | Stoner et al. |
| 2014/0346239 A1 | 11/2014 | Fadell et al. |
| 2014/0358295 A1 | 12/2014 | Warren et al. |
| 2014/0367475 A1 | 12/2014 | Fadell et al. |
| 2014/0376530 A1 | 12/2014 | Erickson et al. |
| 2014/0376747 A1 | 12/2014 | Mullet et al. |
| 2015/0001361 A1 | 1/2015 | Gagne et al. |
| 2015/0002165 A1 | 1/2015 | Juntunen et al. |
| 2015/0016443 A1 | 1/2015 | Erickson et al. |
| 2015/0025693 A1 | 1/2015 | Wu et al. |
| 2015/0039137 A1 | 2/2015 | Perry et al. |
| 2015/0041551 A1 | 2/2015 | Tessier et al. |
| 2015/0043615 A1 | 2/2015 | Steinberg et al. |
| 2015/0045976 A1 | 2/2015 | Li |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0058779 A1 | 2/2015 | Bruck et al. |
| 2015/0061859 A1 | 3/2015 | Matsuoka et al. |
| 2015/0066215 A1 | 3/2015 | Buduri |
| 2015/0066216 A1 | 3/2015 | Ramachandran |
| 2015/0066220 A1 | 3/2015 | Sloo et al. |
| 2015/0081106 A1 | 3/2015 | Buduri |
| 2015/0081109 A1 | 3/2015 | Fadell et al. |
| 2015/0081568 A1 | 3/2015 | Land |
| 2015/0088272 A1 | 3/2015 | Drew |
| 2015/0088318 A1 | 3/2015 | Amundson et al. |
| 2015/0100166 A1 | 4/2015 | Baynes et al. |
| 2015/0100167 A1 | 4/2015 | Sloo et al. |
| 2015/0115045 A1 | 4/2015 | Tu et al. |
| 2015/0115046 A1 | 4/2015 | Warren et al. |
| 2015/0124853 A1 | 5/2015 | Huppi et al. |
| 2015/0127176 A1 | 5/2015 | Bergman et al. |
| 2015/0140994 A1 | 5/2015 | Partheesh et al. |
| 2015/0142180 A1 | 5/2015 | Matsuoka et al. |
| 2015/0144706 A1 | 5/2015 | Robideau et al. |
| 2015/0145653 A1 | 5/2015 | Katingari et al. |
| 2015/0148963 A1 | 5/2015 | Klein et al. |
| 2015/0153057 A1 | 6/2015 | Matsuoka et al. |
| 2015/0153060 A1 | 6/2015 | Stefanski et al. |
| 2015/0156631 A1 | 6/2015 | Ramachandran |
| 2015/0159893 A1 | 6/2015 | Daubman et al. |
| 2015/0159899 A1 | 6/2015 | Bergman et al. |
| 2015/0159902 A1 | 6/2015 | Quam et al. |
| 2015/0159903 A1 | 6/2015 | Marak et al. |
| 2015/0159904 A1 | 6/2015 | Barton |
| 2015/0160691 A1 | 6/2015 | Kadah et al. |
| 2015/0163945 A1 | 6/2015 | Barton et al. |
| 2015/0167995 A1 | 6/2015 | Fadell et al. |
| 2015/0168002 A1 | 6/2015 | Plitkins et al. |
| 2015/0168003 A1 | 6/2015 | Stefanski et al. |
| 2015/0168933 A1 | 6/2015 | Klein et al. |
| 2015/0176854 A1 | 6/2015 | Butler et al. |
| 2015/0176855 A1 | 6/2015 | Geadelmann et al. |
| 2015/0198346 A1 | 7/2015 | Vedpathak |
| 2015/0198347 A1 | 7/2015 | Tessier et al. |
| 2015/0204558 A1 | 7/2015 | Sartain et al. |
| 2015/0204561 A1 | 7/2015 | Sadwick et al. |
| 2015/0204563 A1 | 7/2015 | Imes et al. |
| 2015/0204564 A1 | 7/2015 | Shah |
| 2015/0204565 A1 | 7/2015 | Amundson et al. |
| 2015/0204569 A1 | 7/2015 | Lorenz et al. |
| 2015/0204570 A1 | 7/2015 | Adamik et al. |
| 2015/0205310 A1 | 7/2015 | Amundson et al. |
| 2015/0219357 A1 | 8/2015 | Stefanski et al. |
| 2015/0233594 A1 | 8/2015 | Abe et al. |
| 2015/0233595 A1 | 8/2015 | Fadell et al. |
| 2015/0233596 A1 | 8/2015 | Warren et al. |
| 2015/0234369 A1 | 8/2015 | Wen et al. |
| 2015/0241078 A1 | 8/2015 | Matsuoka et al. |
| 2015/0245189 A1 | 8/2015 | Nalluri et al. |
| 2015/0248118 A1 | 9/2015 | Li et al. |
| 2015/0249605 A1 | 9/2015 | Erickson et al. |
| 2015/0260424 A1 | 9/2015 | Fadell et al. |
| 2015/0267935 A1 | 9/2015 | Devenish et al. |
| 2015/0268652 A1 | 9/2015 | Lunacek et al. |
| 2015/0276237 A1 | 10/2015 | Daniels et al. |
| 2015/0276238 A1 | 10/2015 | Matsuoka et al. |
| 2015/0276239 A1 | 10/2015 | Fadell et al. |
| 2015/0276254 A1 | 10/2015 | Nemcek et al. |
| 2015/0276266 A1 | 10/2015 | Warren et al. |
| 2015/0277463 A1 | 10/2015 | Hazzard et al. |
| 2015/0277492 A1 | 10/2015 | Chau et al. |
| 2015/0280935 A1 | 10/2015 | Poplawski et al. |
| 2015/0287310 A1 | 10/2015 | Deiiuliis et al. |
| 2015/0292764 A1 | 10/2015 | Land et al. |
| 2015/0292765 A1 | 10/2015 | Matsuoka et al. |
| 2015/0293541 A1 | 10/2015 | Fadell et al. |
| 2015/0300672 A1 | 10/2015 | Fadell et al. |
| 2015/0312696 A1 | 10/2015 | Ribbich et al. |
| 2015/0316285 A1 | 11/2015 | Clifton et al. |
| 2015/0316286 A1 | 11/2015 | Roher |
| 2015/0316902 A1 | 11/2015 | Wenzel et al. |
| 2015/0323212 A1 | 11/2015 | Warren et al. |
| 2015/0327010 A1 | 11/2015 | Gottschalk et al. |
| 2015/0327084 A1 | 11/2015 | Ramachandran et al. |
| 2015/0327375 A1 | 11/2015 | Bick et al. |
| 2015/0330654 A1 | 11/2015 | Matsuoka |
| 2015/0330658 A1 | 11/2015 | Filson et al. |
| 2015/0330660 A1 | 11/2015 | Filson et al. |
| 2015/0332150 A1 | 11/2015 | Thompson |
| 2015/0338117 A1 | 11/2015 | Henneberger et al. |
| 2015/0345818 A1 | 12/2015 | Oh et al. |
| 2015/0348554 A1 | 12/2015 | Orr et al. |
| 2015/0354844 A1 | 12/2015 | Kates |
| 2015/0354846 A1 | 12/2015 | Hales et al. |
| 2015/0355371 A1 | 12/2015 | Ableitner et al. |
| 2015/0362208 A1 | 12/2015 | Novotny et al. |
| 2015/0362926 A1 | 12/2015 | Yarde et al. |
| 2015/0362927 A1 | 12/2015 | Giorgi |
| 2015/0364135 A1 | 12/2015 | Kolavennu et al. |
| 2015/0370270 A1 | 12/2015 | Pan et al. |
| 2015/0370272 A1 | 12/2015 | Reddy et al. |
| 2015/0370615 A1 | 12/2015 | Pi-Sunyer |
| 2015/0370621 A1 | 12/2015 | Karp et al. |
| 2015/0372832 A1 | 12/2015 | Kortz et al. |
| 2015/0372834 A1 | 12/2015 | Karp et al. |
| 2015/0372999 A1 | 12/2015 | Pi-Sunyer |
| 2016/0006274 A1 | 1/2016 | Tu et al. |
| 2016/0006577 A1 | 1/2016 | Logan |
| 2016/0010880 A1 | 1/2016 | Bravard et al. |
| 2016/0018122 A1 | 1/2016 | Frank et al. |
| 2016/0018127 A1 | 1/2016 | Gourlay et al. |
| 2016/0020590 A1 | 1/2016 | Roosli et al. |

(56) References Cited

U.S. PATENT DOCUMENTS

| | | |
|---|---|---|
| 2016/0026194 A1 | 1/2016 | Mucignat et al. |
| 2016/0036227 A1 | 2/2016 | Schultz et al. |
| 2016/0040903 A1 | 2/2016 | Emmons et al. |
| 2016/0047569 A1 | 2/2016 | Fadell et al. |
| 2016/0054022 A1 | 2/2016 | Matas et al. |
| 2016/0054792 A1 | 2/2016 | Poupyrev |
| 2016/0054988 A1 | 2/2016 | Desire |
| 2016/0061471 A1 | 3/2016 | Eicher et al. |
| 2016/0061474 A1 | 3/2016 | Cheung et al. |
| 2016/0069582 A1 | 3/2016 | Buduri |
| 2016/0069583 A1 | 3/2016 | Fadell et al. |
| 2016/0077532 A1 | 3/2016 | Lagerstedt et al. |
| 2016/0088041 A1 | 3/2016 | Nichols |
| 2016/0107820 A1 | 4/2016 | MacVittie et al. |
| 2016/0249437 A1 | 8/2016 | Sun et al. |
| 2016/0327298 A1 | 11/2016 | Sinha et al. |
| 2016/0327299 A1 | 11/2016 | Ribbich et al. |
| 2016/0327300 A1 | 11/2016 | Ribbich et al. |
| 2016/0327301 A1 * | 11/2016 | Ribbich .................. F24F 11/30 |
| 2016/0327302 A1 | 11/2016 | Ribbich et al. |
| 2016/0327921 A1 | 11/2016 | Ribbich et al. |
| 2016/0330084 A1 | 11/2016 | Hunter et al. |
| 2016/0377306 A1 | 12/2016 | Drees et al. |
| 2017/0041454 A1 | 2/2017 | Nicholls et al. |
| 2017/0074536 A1 | 3/2017 | Bentz et al. |
| 2017/0074537 A1 | 3/2017 | Bentz et al. |
| 2017/0074539 A1 | 3/2017 | Bentz et al. |
| 2017/0074541 A1 | 3/2017 | Bentz et al. |
| 2017/0075510 A1 | 3/2017 | Bentz et al. |
| 2017/0075568 A1 | 3/2017 | Bentz et al. |
| 2017/0076263 A1 | 3/2017 | Bentz et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0103483 A1 | 4/2017 | Drees et al. |
| 2017/0104332 A1 | 4/2017 | Wenzel et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0122613 A1 | 5/2017 | Sinha et al. |
| 2017/0122617 A1 | 5/2017 | Sinha et al. |
| 2017/0123391 A1 | 5/2017 | Sinha et al. |
| 2017/0124838 A1 | 5/2017 | Sinha et al. |
| 2017/0124842 A1 | 5/2017 | Sinha et al. |
| 2017/0131825 A1 | 5/2017 | Moore et al. |
| 2017/0263111 A1 | 9/2017 | Deluliis et al. |
| 2017/0292731 A1 | 10/2017 | Matsuoka et al. |
| 2017/0295058 A1 | 10/2017 | Gottschalk et al. |
| 2018/0023833 A1 | 1/2018 | Matsuoka et al. |

FOREIGN PATENT DOCUMENTS

| | | |
|---|---|---|
| CA | 2633121 C | 8/2011 |
| CA | 2818356 | 5/2012 |
| CA | 2818696 A1 | 5/2012 |
| CA | 2853041 | 4/2013 |
| CA | 2853081 A1 | 4/2013 |
| CA | 2812567 | 5/2014 |
| CA | 2886531 A1 | 9/2015 |
| CA | 2894359 A1 | 12/2015 |
| DE | 10 2004 005 962 | 8/2005 |
| EP | 2 283 279 A2 | 2/2011 |
| EP | 2 738 478 | 6/2014 |
| EP | 2 897 018 A1 | 7/2015 |
| EP | 2 988 188 A2 | 2/2016 |
| GB | 2 519 441 A | 4/2015 |
| WO | WO 00/22491 A1 | 4/2000 |
| WO | WO-2006/041599 A9 | 7/2006 |
| WO | WO 2009/006133 A1 | 1/2009 |
| WO | WO-2009/058127 A1 | 5/2009 |
| WO | WO-2009/036764 A3 | 1/2010 |
| WO | WO-2010/059143 A1 | 5/2010 |
| WO | WO 2010/078459 A1 | 7/2010 |
| WO | WO 2010/088663 A1 | 8/2010 |
| WO | WO-2012/042232 | 4/2012 |
| WO | WO 2012/068436 A1 | 5/2012 |
| WO | WO 2012/068495 A1 | 5/2012 |
| WO | WO 2012/068503 A1 | 5/2012 |
| WO | WO-2012/068507 A3 | 5/2012 |
| WO | WO 2012/068517 A1 | 5/2012 |
| WO | WO 2012/068526 A1 | 5/2012 |
| WO | WO 2013/033469 A1 | 3/2013 |
| WO | WO-2013/052389 A1 | 4/2013 |
| WO | WO 2013/052905 A1 | 4/2013 |
| WO | WO 2013/058933 A1 | 4/2013 |
| WO | WO-2013/058934 | 4/2013 |
| WO | WO-2013/058968 A1 | 4/2013 |
| WO | WO 2013/058969 A1 | 4/2013 |
| WO | WO 2013/059684 A1 | 4/2013 |
| WO | WO 2012/142477 A3 | 8/2013 |
| WO | WO-2013/153480 A3 | 12/2013 |
| WO | WO 2014/047501 A1 | 3/2014 |
| WO | WO 2012/068437 A3 | 4/2014 |
| WO | WO 2012/068459 A3 | 4/2014 |
| WO | WO-2013/058932 | 4/2014 |
| WO | WO 2014/051632 A1 | 4/2014 |
| WO | WO-2014/051635 A1 | 4/2014 |
| WO | WO-2014/055059 A1 | 4/2014 |
| WO | WO-2013/052901 A3 | 5/2014 |
| WO | WO 2014/152301 A2 | 9/2014 |
| WO | WO 2014/152301 A3 | 9/2014 |
| WO | WO-2015/012449 | 1/2015 |
| WO | WO-2015/039178 A1 | 3/2015 |
| WO | WO 2015/054272 A2 | 4/2015 |
| WO | WO 2015/057698 A1 | 4/2015 |
| WO | WO-2015/099721 A1 | 7/2015 |
| WO | WO 2015/127499 A1 | 9/2015 |
| WO | WO-2015/127566 A1 | 9/2015 |
| WO | WO 2015/134755 A3 | 10/2015 |
| WO | WO 2015/195772 A1 | 12/2015 |
| WO | WO 2016/038374 A1 | 3/2016 |

OTHER PUBLICATIONS

Written Opinion for Singapore Application No. 11201708997W, dated Jan. 10, 2018, 9 pages.
U.S. Appl. No. 15/179,894, filed Jun. 10, 2016, Johnson Controls Technology Company.
U.S. Appl. No. 15/207,431, filed Jul. 11, 2016, Johnson Controls Technology Company.
U.S. Appl. No. 15/247,777, filed Aug. 25, 2016, Johnson Controls Technology Company.
U.S. Appl. No. 15/247,784, filed Aug. 25, 2016, Johnson Controls Technology Company.
U.S. Appl. No. 15/247,788, filed Aug. 25, 2016, Johnson Controls Technology Company.
U.S. Appl. No. 15/247,793, filed Aug. 25, 2016, Johnson Controls Technology Company.
U.S. Appl. No. 15/247,844, filed Aug. 25, 2016, Johnson Controls Technology Company.
U.S. Appl. No. 15/247,869, filed Aug. 25, 2016, Johnson Controls Technology Company.
U.S. Appl. No. 15/247,872, filed Aug. 25, 2016, Johnson Controls Technology Company.
U.S. Appl. No. 15/247,873, filed Aug. 25, 2016, Johnson Controls Technology Company.
U.S. Appl. No. 15/247,875, filed Aug. 25, 2016, Johnson Controls Technology Company.
U.S. Appl. No. 15/247,879, filed Aug. 25, 2016, Johnson Controls Technology Company.
U.S. Appl. No. 15/247,880, filed Aug. 25, 2016, Johnson Controls Technology Company.
U.S. Appl. No. 15/247,881, filed Aug. 25, 2016, Johnson Controls Technology Company.

(56) References Cited

OTHER PUBLICATIONS

U.S. Appl. No. 15/247,883, filed Aug. 25, 2016, Johnson Controls Technology Company.
U.S. Appl. No. 15/247,885, filed Aug. 25, 2016, Johnson Controls Technology Company.
U.S. Appl. No. 15/247,886, filed Aug. 25, 2016, Johnson Controls Technology Company.
U.S. Appl. No. 62/217,788, filed Sep. 11, 2015, Johnson Controls Technology Company.
U.S. Appl. No. 62/239,131, filed Oct. 8, 2015, Johnson Controls Technology Company.
U.S. Appl. No. 62/239,231, filed Oct. 8, 2015, Johnson Controls Technology Company.
U.S. Appl. No. 62/239,233, filed Oct. 8, 2015, Johnson Controls Technology Company.
U.S. Appl. No. 62/239,245, filed Oct. 8, 2015, Johnson Controls Technology Company.
U.S. Appl. No. 62/239,246, filed Oct. 8, 2015, Johnson Controls Technology Company.
U.S. Appl. No. 62/239,249, filed Oct. 8, 2015, Johnson Controls Technology Company.
International Search Report and Written Opinion for PCT Application No. PCT/US2016/030291, dated Sep. 7, 2016, 11 pages.
International Search Report and Written Opinion for PCT Application No. PCT/US2016/030827 dated Sep. 7, 2016, 13 pages.
International Search Report and Written Opinion for PCT Application No. PCT/US2016/030829, dated Sep. 7, 2016, 15 pages.
International Search Report and Written Opinion for PCT Application No. PCT/US2016/030835, dated Sep. 7, 2016, 13 pages.
International Search Report and Written Opinion for PCT Application No. PCT/US2016/030836, dated Sep. 7, 2016, 11 pages.
International Search Report and Written Opinion for PCT Application No. PCT/US2016/030837, dated Sep. 7, 2016, 13 pages.
Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.
Written Opinion for Singapore Application No. 11201709002Y, dated Feb. 7, 2018, 5 pages.
Office Action for U.S. Appl. No. 15/260,294, dated Feb. 16, 2018, 19 pages.
Office Action for U.S. Appl. No. 15/260,297, dated Feb. 9, 2018, 17 pages.
Office Action for U.S. Appl. No. 15/260,301, dated Feb. 9, 2018, 9 pages.
Office Action for U.S. Appl. No. 15/336,789, dated Feb. 22, 2018, 15 pages.
Office Action for U.S. Appl. No. 15/336,791, dated Mar. 2, 2018, 13 pages.
Notice of Allowance for U.S. Appl. No. 15/146,649, dated Feb. 27, 2018, 7 pages.
Examination Report for Australian Application No. 2016257458, dated May 7, 2018, 4 pages.
Examination Report for Australian Application No. 2016257459, dated May 4, 2018, 3 pages.
Office Action for U.S. Appl. No. 15/146,134, dated May 14, 2018, 21 pages.
Office Action for U.S. Appl. No. 15/260,295, dated Apr. 18, 2018, 16 pages.
Office Action for U.S. Appl. No. 15/336,792, dated Mar. 29, 2018, 12 pages.
Office Action for U.S. Appl. No. 15/146,749, dated Mar. 19, 2018, 11 pages.
U.S. Appl. No. 15/338,215, filed Oct. 28, 2016, Johnson Controls Technology Company.
U.S. Appl. No. 15/338,221, filed Oct. 28, 2016, Johnson Controls Technology Company.
Search Report for International Application No. PCT/US2016/051176, dated Feb. 16, 2017, 20 pages.
Search Report for International Application No. PCT/US2017/012217, dated Mar. 31, 2017, 14 pages.
Search Report for International Application No. PCT/US2017/012218, dated Mar. 31, 2017, 14 pages.
Search Report for International Application No. PCT/US2017/012221, dated Mar. 31, 2017, 13 pages.
Search Report for International Application No. PCT/US2017/030890, dated Jun. 21, 2017, 13 pages.
Notice of Allowance for U.S. Appl. No. 15/146,763, dated Oct. 4, 2017, 8 pages.
Office Action for U.S. Appl. No. 15/146,649, dated Oct. 6, 2017, 6 pages.
Office Action for U.S. Appl. No. 15/146,749, dated Oct. 4, 2017, 9 pages.
Office Action for U.S. Appl. No. 15/336,789, dated Aug. 10, 2017, 14 pages.
Office Action for U.S. Appl. No. 15/336,792, dated Oct. 10, 2017, 12 pages.

* cited by examiner

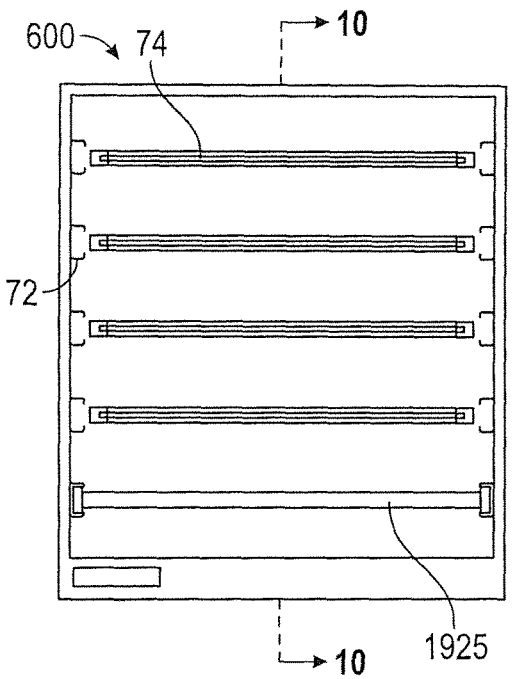
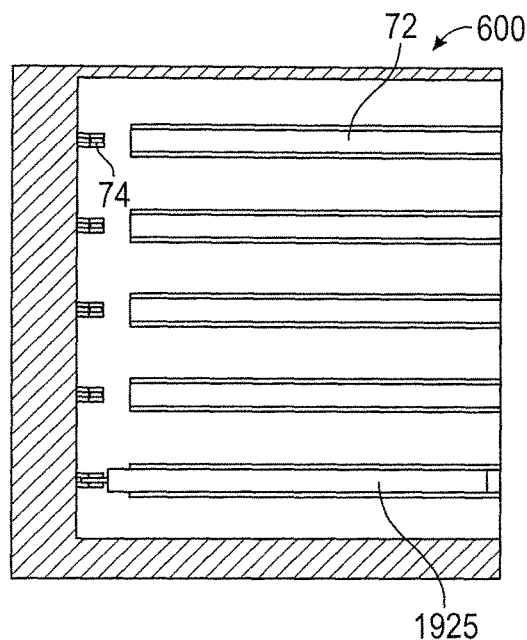
FIG. 9   FIG. 10
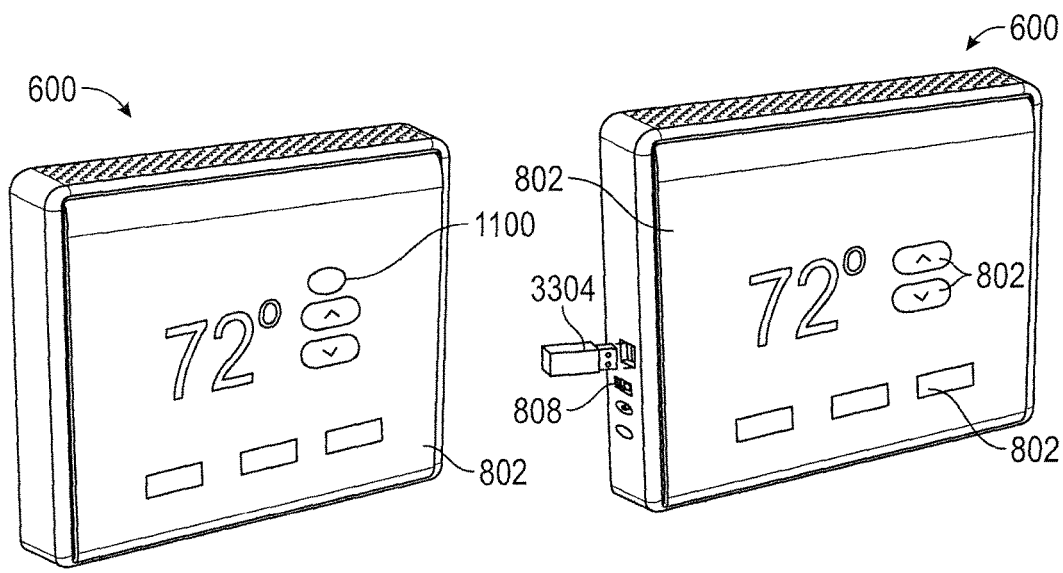
FIG. 11   FIG. 12

MODULAR MULTI-FUNCTION THERMOSTAT

CROSS-REFERENCE TO RELATED PATENT APPLICATIONS

This application claims the benefit of and priority to U.S. Provisional Patent Application No. 62/260,141, filed Nov. 25, 2015, the entire disclosure of which is incorporated by reference herein.

BACKGROUND

The present disclosure relates generally to thermostats and more particularly to the improved control of a building or space's heating, ventilating, and air conditioning (HVAC) system through the use of a multi-function, multi-touch, thermostat.

A thermostat is, in general, a component of an HVAC control system. Traditional thermostats sense the temperature of a system and control components of the HVAC in order to maintain a setpoint. A thermostat may be designed to control a heating or cooling system or an air conditioner. Thermostats are manufactured in many ways, and use a variety of sensors to measure temperature and other desired parameters of a system.

Conventional thermostats are configured for one-way communication to connected components, and to control HVAC systems by turning on or off certain components or by regulating flow. Each thermostat may include a temperature sensor and a user interface. The user interface typically includes display for presenting information to a user and one or more user interface elements for receiving input from a user. To control the temperature of a building or space, a user adjusts the setpoint via the thermostat's user interface.

SUMMARY

One implementation of the present disclosure is a thermostat. The thermostat includes a motherboard, a first modular board, and a display. The motherboard is configured to perform a thermostat function and generate a user interface a user interface including information relating to the thermostat function. The first modular board is configured to be added to the thermostat by coupling the first modular board to the motherboard and to be removed from the thermostat by decoupling the first modular board from the motherboard. The first modular board is configured to supplement the thermostat function performed by the motherboard when the first modular board is coupled to the motherboard. The display is communicably coupled to the motherboard. The display is configured to display the user interface. The motherboard is configured to adaptively reconfigure the user interface to include supplemental information provided by the first modular board in response to coupling of the first modular board to the motherboard.

Another implementation of the present disclosure is a system for operating a thermostat. The system includes a thermostat and an external device, the thermostat for interacting with a building automation system. The thermostat is configured to provide a user interface that facilitates user interaction with the building automation system. The thermostat includes a first modular board, a display, and an equipment model. The first modular board is configured to perform a thermostat function. The first modular board is configured to be removable from the thermostat. The display is configured to display the user interface. The equipment model defines a variable used by the thermostat and is configured to facilitate interactions between the thermostat and the building automation system. The equipment model is based on the thermostat function. The external device is configured to communicate with the thermostat. The external device contains a library of equipment model updates. The thermostat is configured to adaptively reconfigure the user interface to remove supplemental information provided by the first modular board in response to removal of the first modular board.

Another implementation of the present disclosure is a method for reconfiguring a thermostat. The method includes connecting a modular board to the thermostat, the modular board configured to perform a thermostat function. The method also includes receiving, by the thermostat, a signal from the modular board, the signal including information about the modular board. The method also includes transmitting, by the thermostat, an equipment model update request based on the signal from the modular board. The method also includes receiving, by the thermostat, an equipment model update in response to the equipment model update request, the equipment model update based on the signal from the modular board. The method also includes applying, by the thermostat, the equipment model update to an equipment model of the thermostat. The equipment model defines a variable used by the thermostat and is configured to facilitate interactions between the thermostat and a building automation system.

BRIEF DESCRIPTION OF THE DRAWINGS

FIG. 9 is a front view of the modular thermostat including rails, receiving slots, and a modular board mounted to modular thermostat, according to some embodiments.

FIG. 10 is a side cross-sectional view of the modular thermostat along line 10-10 of FIG. 9, showing the connection of a modular board into a receiving slot, and illustrating the alignment and relationship between the rail and the receiving slot.

FIG. 11 is a perspective view of the modular thermostat including display mounted to modular thermostat, according to some embodiments.

FIG. 12 is a perspective view of the modular thermostat including a number of individual displays mounted to modular thermostat where display includes a hardware interface and a security device, according to some embodiments.

DETAILED DESCRIPTION

Overview

Figure 1:
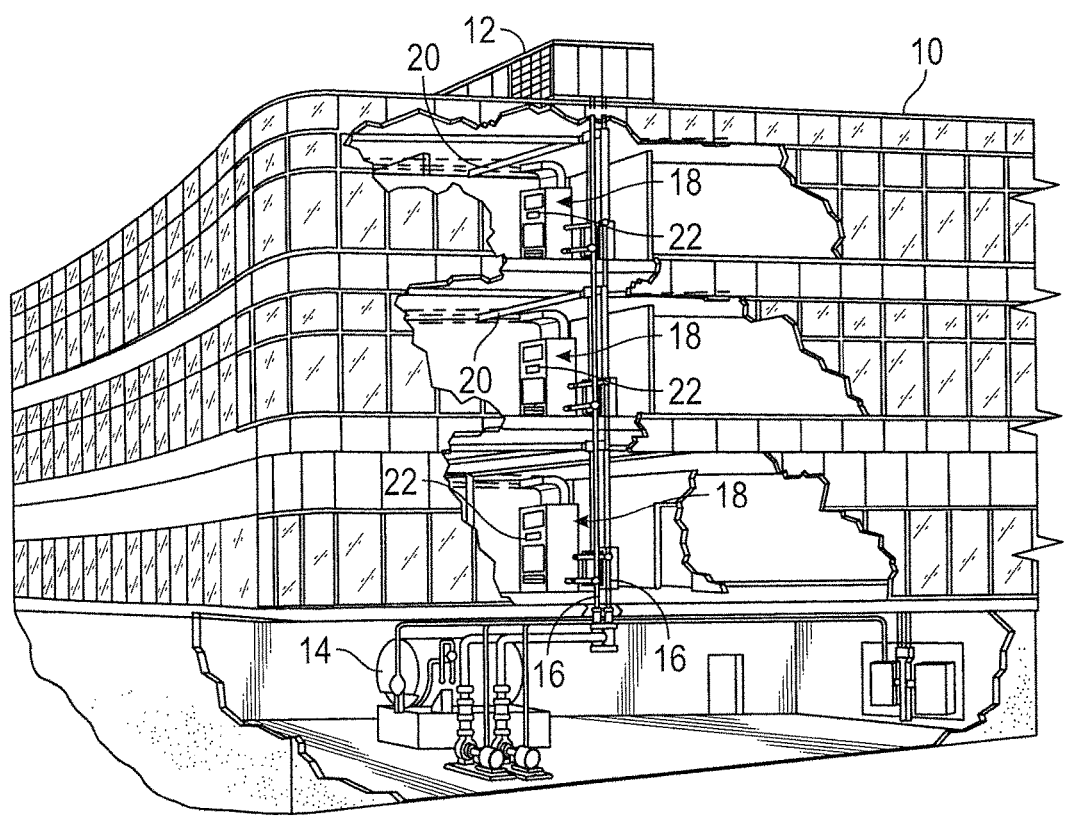
FIG. 1 is an illustration of a commercial or industrial HVAC system that employs heat exchangers, according to some embodiments.

Referring generally to the FIGURES, a modular multi-function, multi-touch thermostat is shown, according to various exemplary embodiments. The modular thermostat described herein may be used in any HVAC system, room, environment, or system within which it is desired to control and/or observe environmental conditions (e.g., temperature, humidity, etc.). In traditional HVAC systems, a thermostat may be adjusted by a user to control the temperature of a system. A traditional thermostat is not intended to be upgraded by a user once installed in an application. Rather, traditional thermostats are intended to be replaced after the thermostat has either failed (i.e., the thermostat is no longer operable for its intended purpose) or has outdated and undesirable capabilities (e.g., the user wishes to have more control over the thermostat, the user wishes to have a greater precision of control over the thermostat, etc.).

The modular thermostat is intended to provide the user with an unparalleled ability to upgrade, repair, or replace individual components of the modular thermostat without replacing the entire modular thermostat. The modular thermostat may include a multitude of modular boards, each of which may provide the modular thermostat with different capabilities which may be utilized by the user. For example, the modular thermostat may include a display, a motherboard, a networking board, an occupancy detection board, a humidity board, a near field communications (NFC) board, a temperature board, an energy harvesting board, a battery board, and/or any other type of modular board. Each board is intended to include some form of memory for storing commands, data, or other useful information. In the future, as technology advances, other types of modular boards may be developed which may, in turn, be included with or added to the modular thermostat. The modular thermostat may be directly controlled by a user, or may autonomously control the parameters of a system according to stored user specified parameters.

The various components within the modular thermostat each serve a specified purpose within the modular thermostat. For example, the display may display information to a user regarding the desired parameters of a system, such as temperature, humidity, etc. The display may be touch-sensitive, such that a user may easily manipulate objects on the display. The motherboard may be configured to interact with the modular thermostat and the various modular boards. The humidity board may be configured to measure the humidity of a system and to transmit the measured humidity information to the modular thermostat. The NFC board may be configured to allow communications between the modular thermostat and an external device through NFC. The temperature board may be configured to measure the temperature of a system and to transmit the measured temperature information to the modular thermostat. The energy harvesting board may be configured to interact with an energy harvesting apparatus in the system. The networking board may be configured to allow the modular thermostat to communicate with other devices through the internet, Bluetooth, Wi-Fi, or other suitable communications platform. The occupancy detection board may be configured to monitor the occupancy of a system (i.e., how many people are in a room) and adjust the controls of the modular thermostat accordingly. The battery board may include a supplementary battery system intended to provide backup power to the modular thermostat in the event of a power outage.

As future technologies develop, other modular boards will be made available for use with the modular thermostat. The modular thermostat is intended to be used with any combination of the listed modular boards or any other modular board to provide additional functionality. For example, the modular thermostat may only include the temperature board. In addition, the modular boards may each be upgraded independently of the modular thermostat. For example, the modular thermostat may include a temperature board which has an out-of-date sensor. A user may wish to increase the capabilities of the sensor without replacing the entire modular thermostat. In this case, the user may simply replace and upgrade the temperature board to provide the requested capability.

Building with HVAC System and Thermostat

FIGS. 1-4B illustrate an exemplary environment in which the current invention may be used. Referring specifically to FIG. 1, a HVAC system for building environmental management is shown, according to an exemplary embodiment. The HVAC system may be a communicating system employing one or more control devices (e.g., thermostats) functioning as system controllers. A building 10 is cooled by a system that includes a chiller 12 and a boiler 14. As shown, chiller 12 is disposed on the roof of building 10 and boiler 14 is located in the basement; however, the chiller and boiler may be located in other equipment spaces or areas next to the building. Chiller 12 is an air cooled or water cooled device that implements a refrigeration cycle to cool water. Chiller 12 may be a stand-alone unit or may be part of a single package unit containing other equipment, such as a blower and/or integrated air handler. Boiler 14 is a closed vessel that includes a furnace to heat water. The water from chiller 12 and boiler 14 is circulated through building 10 by water conduits 16. Water conduits 16 are routed to air handlers 18, located on individual floors and within sections of building 10.

Air handlers 18 are coupled to ductwork 20 that is adapted to distribute air between the air handlers and may receive air from an outside intake (not shown). Air handlers 18 include heat exchangers that circulate cold water from chiller 12 and hot water from boiler 14 to provide heated or cooled air. Fans, within air handlers 18, draw air through the heat exchangers and direct the conditioned air to environments within building 10, such as spaces, apartments, or offices, to maintain the environments at a designated temperature. A control device 22, shown here as including a thermostat, may be used to designate the temperature of the conditioned air. Control device 22 also may be used to control the flow of air through and from air handlers 18 and to diagnose mechanical or electrical problems with the air handlers 18. Other devices may, of course, be included in the system, such as control valves that regulate the flow of water and pressure and/or temperature transducers or switches that sense the temperatures and pressures of the water, the air, and so forth. Moreover, the control device may communicate with computer systems that are integrated with or separate from other building control or monitoring systems, and even systems that are remote from the building.

Figure 2:
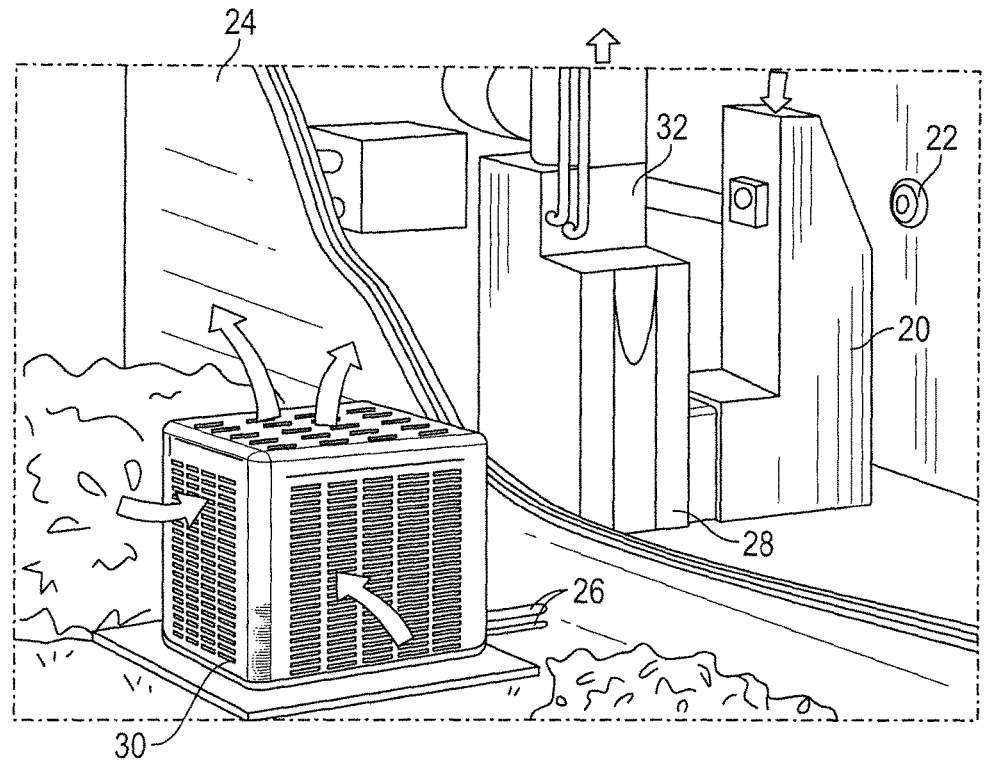
FIG. 2 is an illustration of a residential HVAC system that employs heat exchangers, according to some embodiments.

FIG. 2 illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 24 will include refrigerant conduits 26 that operatively couple an indoor unit 28 to an outdoor unit 30. Indoor unit 28 may be positioned in a utility space, an attic, a basement, and so forth. Outdoor unit 30 is typically situated adjacent to a side of residence 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the system shown in FIG. 2 is operating as an air conditioner, a coil in outdoor unit 30 serves as a condenser for recondensing vaporized refrigerant flowing from indoor unit 28 to outdoor unit 30 via one of the refrigerant conduits 26. In these applications, a coil of the indoor unit, designated by the reference numeral 32, serves as an evaporator coil. Evaporator coil 32 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outer unit coil using a fan (not shown), and expels the air as indicated by the arrows above the outdoor unit. When operating as an air conditioner, the air is heated by the condenser coil within the outdoor unit and exits the top of the unit at a temperature higher than it entered the sides. Air is blown over indoor coil 32 and is then circulated through residence 24 by means of ductwork 20, as indicated by the arrows entering and exiting ductwork 20. The overall system operates to maintain a desired temperature as set by system controller 22. When the temperature sensed inside the residence is higher than the set point on the thermostat (with the addition of a relatively small tolerance), the air conditioner will become operative to refrigerate additional air for circulation through the residence. When the temperature reaches the set point (with the removal of a relatively small tolerance), the unit will stop the refrigeration cycle temporarily.

When the unit in FIG. 2 operates as a heat pump, the roles of the coils are simply reversed. That is, the coil of outdoor unit 30 will serve as an evaporator to evaporate refrigerant and thereby cool air entering outdoor unit 30 as the air passes over the outdoor unit coil. Indoor coil 32 will receive a stream of air blown over it and will heat the air by condensing a refrigerant.

Figure 3:
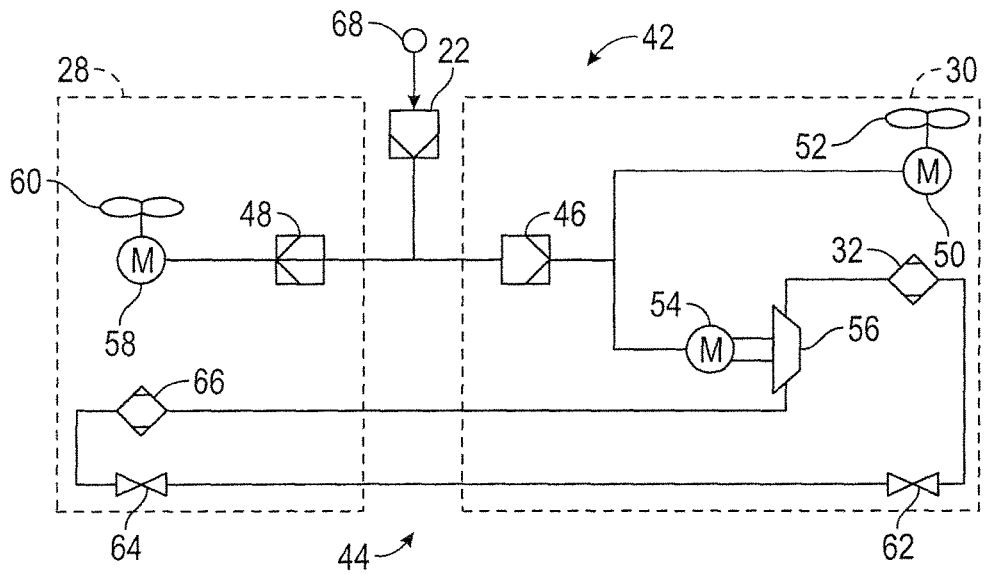
FIG. 3 is a block diagram of a HVAC system that employs a control device such as a thermostat, according to some embodiments.

FIG. 3 is a block diagram of an HVAC system 42 that includes the control device 22, indoor unit 28 functioning as an air handler, and outdoor unit 30 functioning as a heat pump. Refrigerant flows through system 42 within a closed refrigeration loop 44 between outdoor unit 30 and indoor unit 28. The refrigerant may be any fluid that absorbs and extracts heat. For example, the refrigerant may be hydro fluorocarbon (HFC) based R-410A, R-407C, or R-134a.

The operation of indoor and outdoor units 28 and 30 is controlled by control circuits 48 and 46, respectively. The control circuits 46 and 48 may execute hardware or software control algorithms to regulate the HVAC system. In some embodiments, the control circuits may include one or more microprocessors, analog to digital converters, non-volatile memories, and interface boards. In certain embodiments, the control circuits may be fitted with or coupled to auxiliary control boards that allow conventional 24 VAC wiring to be controlled through serial communications.

The control circuits 46 and 48 may receive control signals from control device 22 and transmit the signals to equipment located within indoor unit 28 and outdoor unit 30. For example, outdoor control circuit 46 may route control signals to a motor 50 that powers a fan 52 and to a motor 54 that powers a compressor 56. Indoor control circuit 48 may route control signals to a motor 58 that powers a fan 60. The control circuits also may transmit control signals to other types of equipment such as valves 62 and 64, sensors, and switches.

In some embodiments, control device 22 may communicate with control circuits 46 and 48 by transmitting communication packets over a serial communication interface. Control device 22 may function as the master system controller while control circuits 46 and 48 operate as slave devices. In certain embodiments, control device 22 may send a ping message to discover connected slave devices and their properties. For example, control circuits 46 and 48 may transmit an acknowledgement message in response to receiving a ping message from control device 22. Control circuits 46 and 48 also may transmit information, in response to requests from control device 22, identifying the type of unit and specific properties of the unit. For example, control circuit 46 may transmit a signal to control device 22 indicating that it controls a two-stage heat pump with auxiliary heat and a bonnet sensor. Control circuits 46 and 48 also may transmit signals identifying terminal connections and jumper settings of the control circuits.

Control device 22 may operate to control the overall heating and cooling provided by indoor and outdoor units 28 and 30. Indoor and outdoor units 28 and 30 include coils 66 and 32, respectively, that both operate as heat exchangers. The coils may function either as an evaporator or a condenser depending on the heat pump operation mode. For example, when heat pump system 42 is operating in cooling (or "AC") mode, outside coil 32 functions as a condenser, releasing heat to the outside air, while inside coil 66 functions as an evaporator, absorbing heat from the inside air. When heat pump system 42 is operating in heating mode, outside coil 32 functions as an evaporator, absorbing heat from the outside air, while inside coil 66 functions as a condenser, releasing heat to the inside air. A reversing valve may be positioned on closed loop 44 to control the direction of refrigerant flow and thereby to switch the heat pump between heating mode and cooling mode.

Heat pump system 42 also includes two metering devices 62 and 64 for decreasing the pressure and temperature of the refrigerant before it enters the evaporator. The metering devices also regulate the refrigerant flow entering the evaporator so that the amount of refrigerant entering the evaporator equals, or approximately equals, the amount of refrigerant exiting the evaporator. The metering device used depends on the heat pump operation mode. For example, when heat pump system 74 is operating in cooling mode, refrigerant bypasses metering device 62 and flows through metering device 64 before entering inside coil 66, which acts as an evaporator. In another example, when heat pump system 42 is operating in heating mode, refrigerant bypasses metering device 64 and flows through metering device 62 before entering outside coil 32, which acts as an evaporator. According to other exemplary embodiments, a single metering device may be used for both heating mode and cooling mode. The metering devices typically are thermal or electronic expansion valves, but also may be orifices or capillary tubes.

The refrigerant enters the evaporator, which is outside coil 32 in heating mode and inside coil 66 in cooling mode, as a low temperature and pressure liquid. Some vapor refrigerant also may be present as a result of the expansion process that occurs in metering device 62 or 64. The refrigerant flows through tubes in the evaporator and absorbs heat from the air changing the refrigerant into a vapor. In cooling mode, the indoor air flowing across the multichannel tubes also may be dehumidified. The moisture from the air may condense on the outer surface of the multichannel tubes and consequently be removed from the air.

After exiting the evaporator, the refrigerant flows into compressor 56. Compressor 56 decreases the volume of the refrigerant vapor, thereby, increasing the temperature and pressure of the vapor. The compressor may be any suitable compressor such as a screw compressor, reciprocating compressor, rotary compressor, swing link compressor, scroll compressor, or turbine compressor.

From compressor 56, the increased temperature and pressure vapor refrigerant flows into a condenser, the location of which is determined by the heat pump mode. In cooling mode, the refrigerant flows into outside coil 32 (acting as a condenser). Fan 52, which is powered by motor 50, draws air across the tubes containing refrigerant vapor. According to certain exemplary embodiments, the fan may be replaced by a pump that draws fluid across the multichannel tubes. The heat from the refrigerant is transferred to the outside air causing the refrigerant to condense into a liquid. In heating mode, the refrigerant flows into inside coil 66 (acting as a condenser). Fan 60, which is powered by motor 58, draws air across the tubes containing refrigerant vapor. The heat from the refrigerant is transferred to the inside air causing the refrigerant to condense into a liquid.

After exiting the condenser, the refrigerant flows through the metering device (62 in heating mode and 64 in cooling mode) and returns to the evaporator (outside coil 32 in heating mode and inside coil 66 in cooling mode) where the process begins again.

In both heating and cooling modes, motor 54 drives compressor 56 and circulates refrigerant through reversible refrigeration/heating loop 44. The motor may receive power either directly from an AC or DC power source or from a variable speed drive (VSD). The motor may be a switched reluctance (SR) motor, an induction motor, an electronically commutated permanent magnet motor (ECM), or any other suitable motor type.

The operation of motor 54 is controlled by control circuit 46. Control circuit 46 may receive control signals from control device 22. In certain embodiments, control device may receive information from a sensor 68 that measures the ambient indoor air temperature. Control device 22 then compares the air temperature to the temperature set point (which may be input by a user) and engages compressor motor 54 and fan motors 50 and 58 to run the cooling system if the air temperature is above the temperature set point. In heating mode, control device 22 compares the air temperature from sensor 68 to the temperature set point and engages motors 50, 54, and 58 to run the heating system if the air temperature is below the temperature set point.

The control circuit 46 and control device 22 also may initiate a defrost cycle when the system is operating in heating mode. When the outdoor temperature approaches freezing, moisture in the outside air that is directed over outside coil 32 may condense and freeze on the coil. Sensors may be included within outdoor unit 30 to measure the outside air temperature and the temperature of outside coil 32. These sensors provide the temperature information to the control circuit 46 which determines when to initiate a defrost cycle.

Figure 4A:
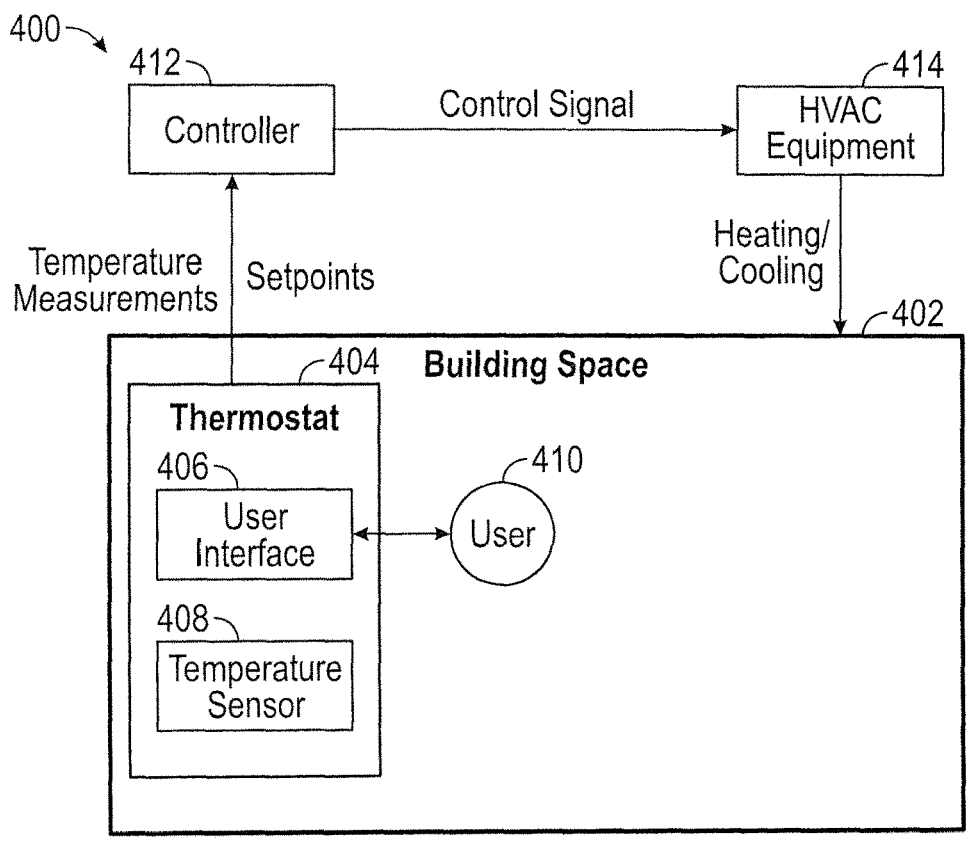
FIG. 4A is a block diagram of a system for controlling the temperature of a building space using wall-mounted thermostat, according to some embodiments.

Referring now to FIG. 4A, a system 400 for monitoring and controlling the temperature of a building space is shown, according to an exemplary embodiment. System 400 is shown to include a thermostat 404 installed within a building space 402. Typically, thermostat 404 is mounted on a wall 70 within building space 402. Thermostat 404 is shown to include user interface 406 and a temperature sensor 408. User interface 406 includes an electronic display 802 for presenting information to a user 410 and one or more physical input devices (e.g., a rotary knob, pushbuttons, manually-operable switches, etc.) for receiving input from a user 410. Temperature sensor 408 measures the temperature of building space 402 and provides the measured temperature to user interface 406.

Thermostat 404 communicates with a controller 412. In various embodiments, controller 412 may be integrated with thermostat 404 or may exist as a separate controller (e.g., a field and equipment controller, a supervisory controller, etc.) that receives input from thermostat 404. Thermostat 404 may send temperature measurements and user-defined temperature setpoints to controller 412. Controller 412 uses the temperature measurements and the setpoints to generate a control signal for HVAC equipment 414. The control signal causes HVAC equipment 414 to provide heating and/or cooling for building space 402.

Figure 4B:
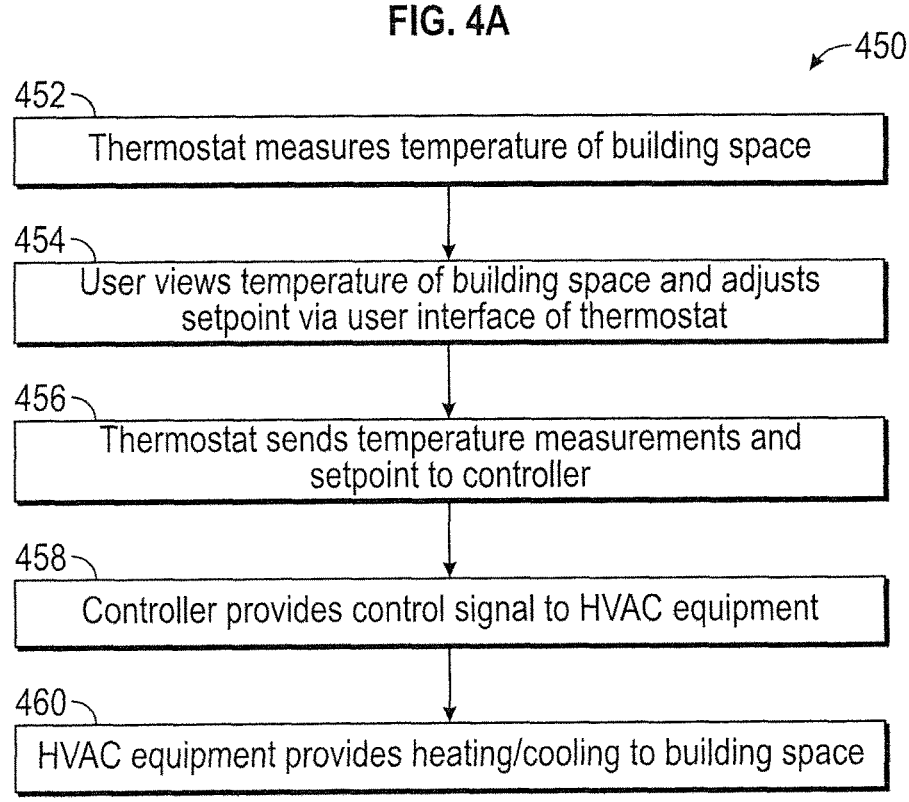
FIG. 4B is a flowchart of a process for controlling the temperature of a building space using wall-mounted thermostat, according to some embodiments.

Referring now to FIG. 4B, a process 450 for monitoring and controlling the temperature of a building space is shown, according to an exemplary embodiment. Process 450 may be performed by system 400, as described with reference to FIG. 4A. In process 450, thermostat 404 measures the temperature of building space 402 (step 452). User 410 views the measured temperature and adjusts the temperature setpoint via user interface 406 of thermostat 404 (step 454). Thermostat 404 sends the measured temperature and the setpoint to controller 412 (step 456). Controller 412 uses the measured temperature and the setpoint to generate and provide a control signal to HVAC equipment 414 (step 458). HVAC equipment 414 operates in accordance with the control signal to provide heating/cooling to building space 402 (step 460).

Modular Thermostat

Figure 5:
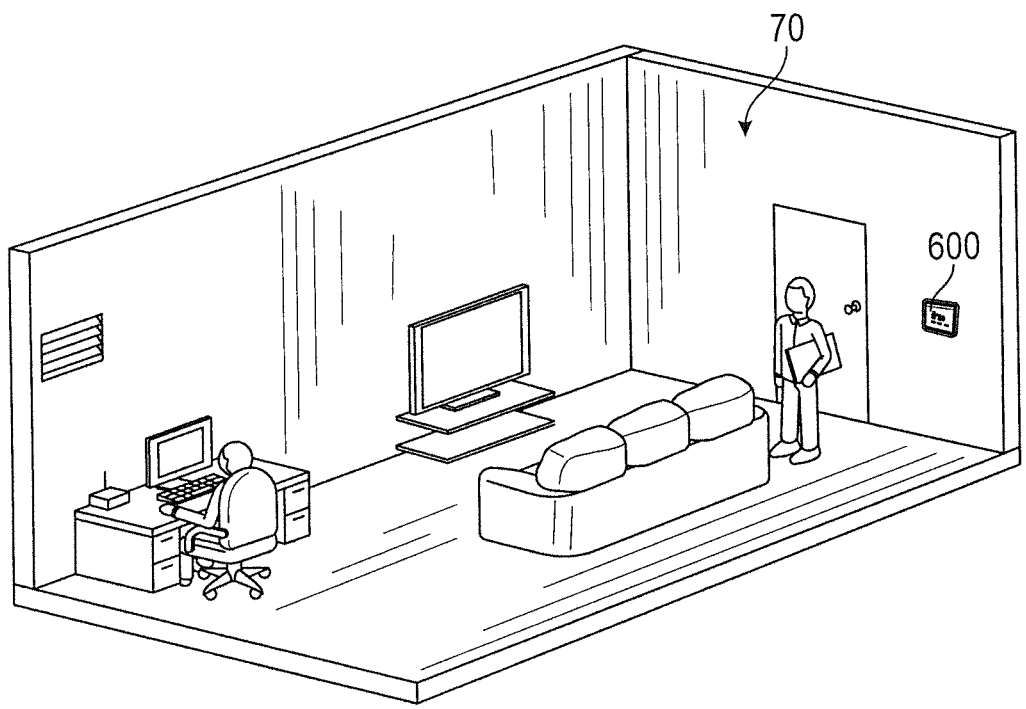
FIG. 5 is perspective view of a room including occupants and a modular thermostat, according to some embodiments.

Referring now to FIG. 5, a modular thermostat 600 is shown within a room, and mounted to a wall, such as wall 70, according to an exemplary embodiment. In some embodiments, occupants may occupy a room which has a temperature, humidity, relative humidity, and other meteorological, and psychrometric parameters. The room the occupants are in may contain electronic devices such as televisions, computers, lights, and appliances. These electronic devices may produce heat which may alter the temperature, or other parameter, of the room to an undesirable value. In some embodiments, in order to adjust the temperature, or other parameter, of the room, the occupant may interact with a modular thermostat 600. Modular thermostat 600 may interact with HVAC equipment 414 to adjust the temperature, and/or other parameters, of the room as instructed by the occupant. Modular thermostat 600 may be implemented in various applications such as commercial applications (e.g., offices, etc.), industrial applications (e.g., manufacturing facilities, warehouses, etc.), residential applications (e.g., houses, etc.), retail applications (e.g., stores, etc.), hospitals (e.g., in clean rooms, etc.), and other similar applications. In some embodiments, the occupant may interact with modular thermostat 600 remotely. According to various exemplary embodiments, the occupant may interact with modular thermostat 600 through the Internet, near field communications, cellular network, satellite network, Bluetooth, Wi-Fi, Zig-Bee, and other suitable communications platforms and networks.

Figures 6, 7:
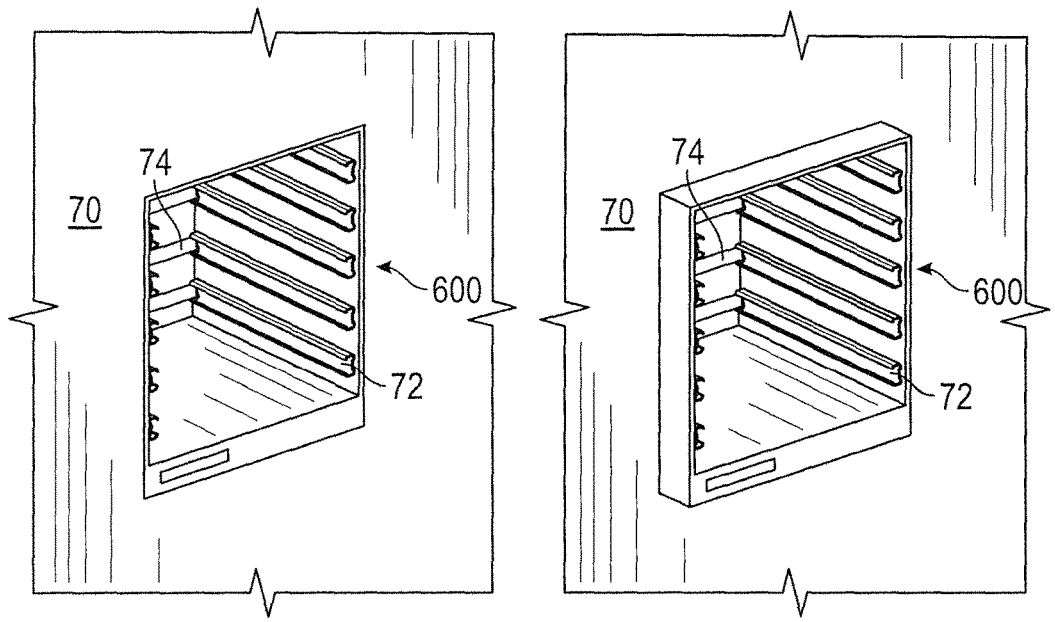
FIG. 6 is a perspective view of the modular thermostat including a number of rails and a number of receiving slots mounted within wall, according to some embodiments.
FIG. 7 is a perspective view of the modular thermostat including a number of rails and a number of receiving slots mounted to wall, such that a portion of modular thermostat protrudes from wall, according to some embodiments.

In FIG. 6, modular thermostat 600 attached is shown mounted within wall 70. In various applications, modular thermostat 600 may be mounted to any wall 70 or similarly suitable mounting surface. For example, modular thermostat 600 may be mounted to a vertical wall 70, and disposed at a suitable height for user interaction (i.e., with user interface 406, etc.). However, according to various embodiments, modular thermostat 600 may be mounted at various heights on a vertical wall 70, on the ceiling, or within the floor of a space. In some embodiments, modular thermostat 600 is mounted within a slot in wall 70. For example, wall 70 may have a slot in a side face of wall 70 that receives modular thermostat 600.

FIG. 6 illustrates a flush-mounting application of modular thermostat 600. In many applications, it is undesirable for there to be any large objects protruding from wall 70. For example, in an office setting a walkway may be positioned near wall 70 with a protrusion encroaching the space above the walkway. During normal use of the walkway, a pedestrian or piece of equipment (e.g., forklift, rolling cart, etc.) may inadvertently contact the protrusion. In such applications, having a flush mounted modular thermostat 600 may be beneficial. Further, modular thermostat 600 may be inset relative to wall 70.

FIG. 7 illustrates an application where modular thermostat 600 is installed within wall 70 such that a portion of modular thermostat 600 protrudes from wall 70. For example, in applications where wall 70 may extremely thin, where accessibility to modular thermostat 600 may be improved, or where the added clearance provided by the flush mounted modular thermostat 600 is not needed, modular thermostat 600 may be installed such that a portion of modular thermostat 600 protrudes from wall 70.

Figure 17:
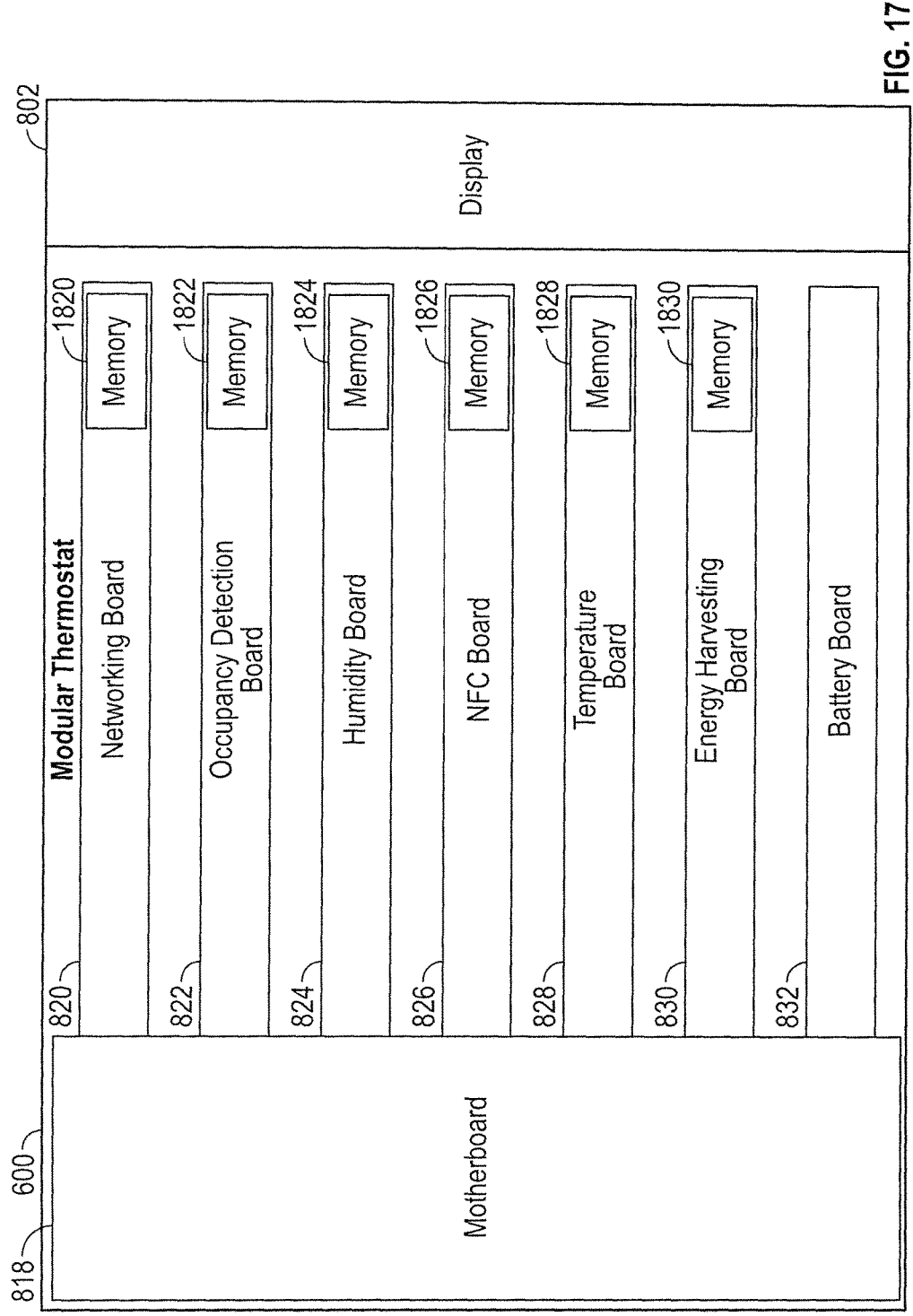
FIG. 17 is a cross-sectional structural view of the modular thermostat shown in FIG. 11, where the modular thermostat is shown to include a plurality of modular boards and a display, according to some embodiments.
Figure 18:
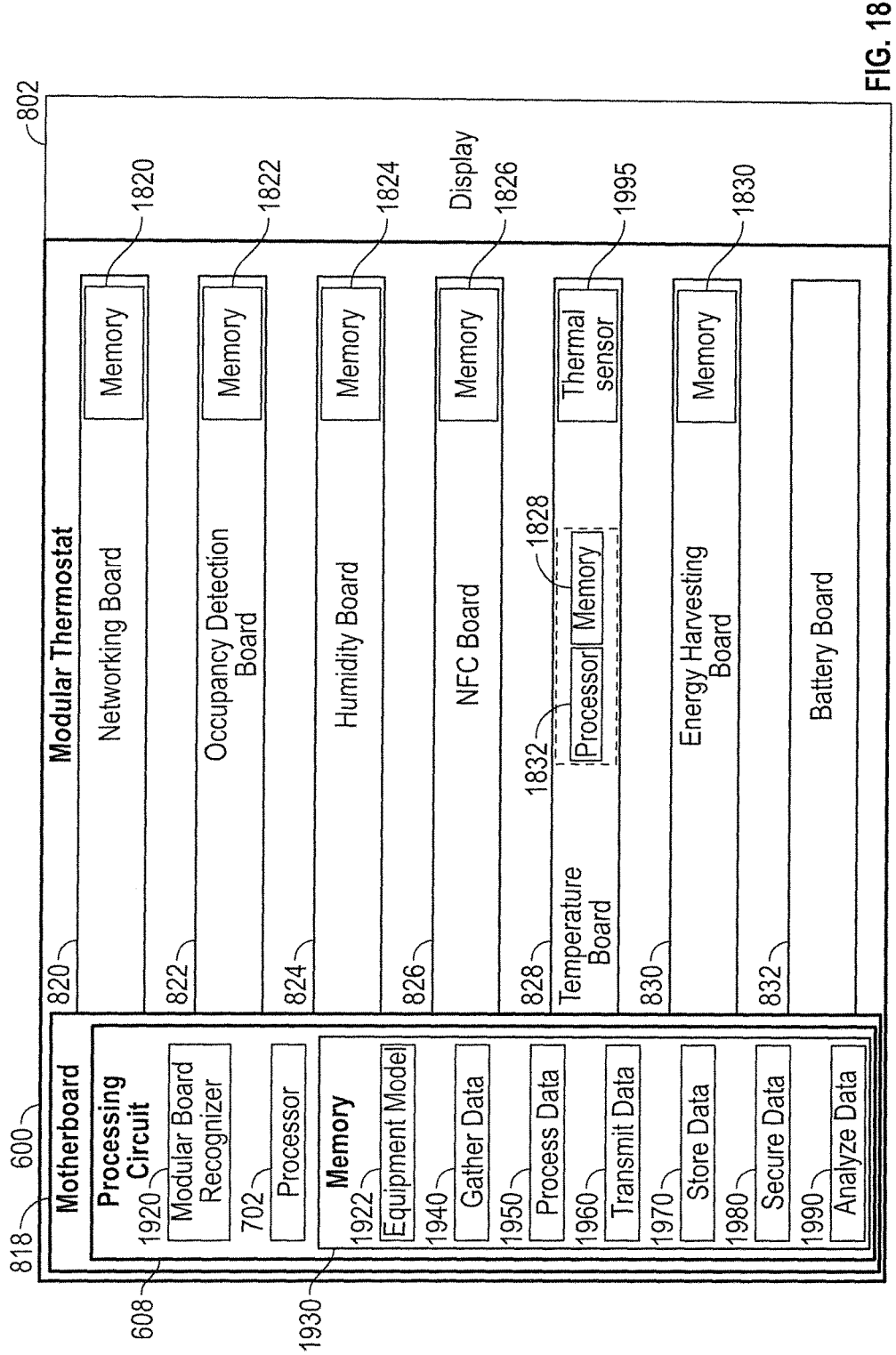
FIG. 18 is another cross-sectional structural view of the modular thermostat shown in FIG. 11, where the modular thermostat is shown to include a plurality of modular boards and a display, according to some embodiments.
Figure 19:
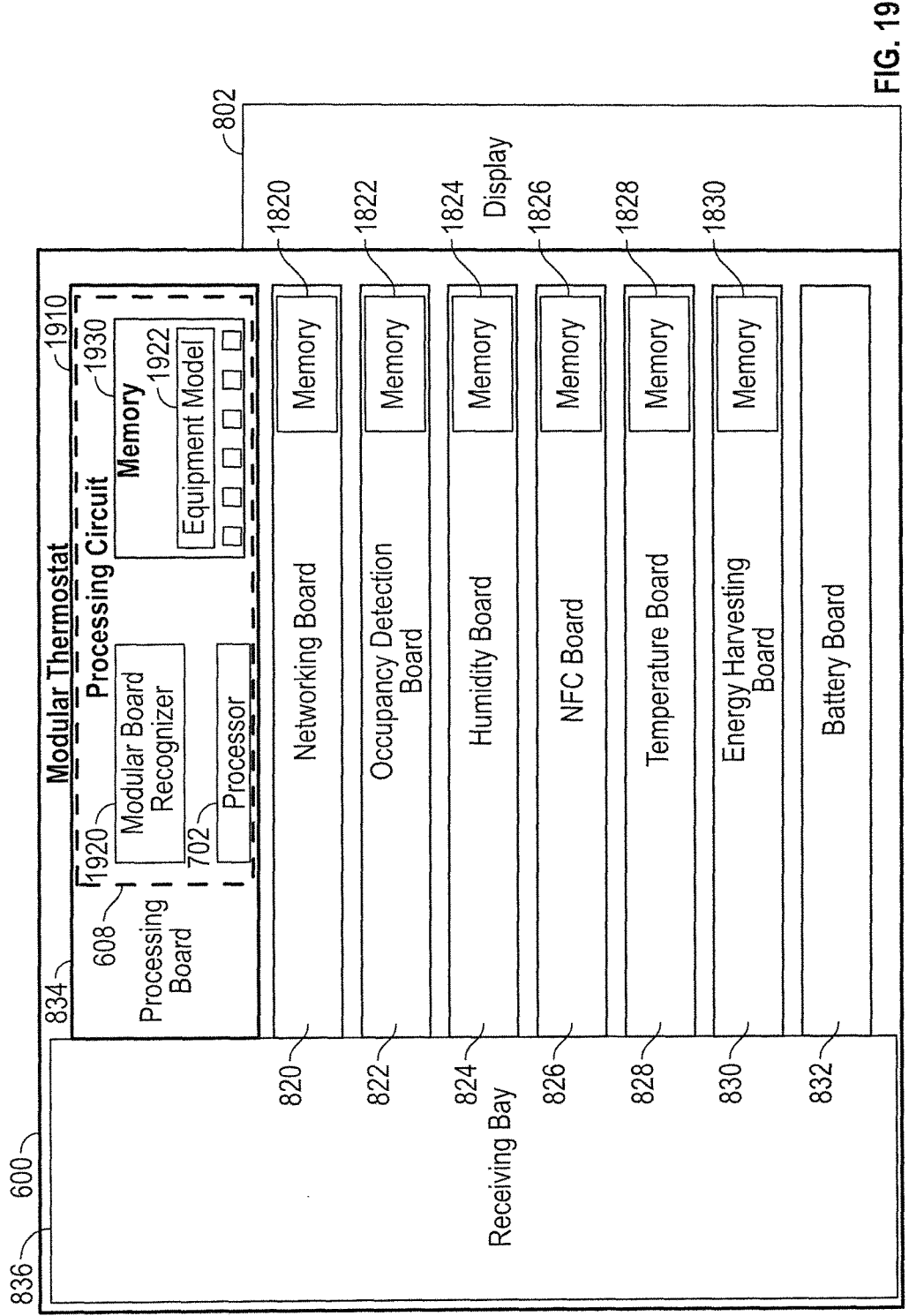
FIG. 19 is another cross-sectional structural view of modular thermostat shown in FIG. 11, where the modular thermostat is shown to include a plurality of modular boards and a display, according to some embodiments.

A number of receiving slots 74 included within modular thermostat 600 may come in various shapes and of various dimensions in order to suit application needs. For example, according to some embodiments and as shown in FIGS. 6-7, receiving slots 74 may be orthogonal to rails 72, such that receiving slots 74 are parallel with wall 70. According to some embodiments, receiving slots 74 may extend from one rail to the corresponding coplanar rail along a rear interior surface of modular thermostat 600. In application, receiving slots 74 may be present on a motherboard 818 (e.g., mainboard, system board, planar board, logic board, mobo, etc.), a receiving bay 836, and/or other suitable receiving component mounted along the rear interior surface of modular thermostat 600, as shown in FIGS. 17-19.

Motherboard 818 may be a printed circuit board (PCB) and may contain a central processing unit (CPU) and memory, as well as also providing a number of connectors for various peripherals such as a number of modular boards 1925 and display 802. Motherboard 818 may be produced in a variety of computer form factors, such as, but not limited to, Neo-ITX, Pico-ITX, Mobile-ITX, Nano-ITX, Mini-ITX, Extended ATX (ETAX), LPX, Mini-LPX, SWTX, UTX, Enhanced Extended ATX (EEATX), SSI CEB, SSI EEB, SSI MEB, CoreExpress, COM Express Basic, COM Express Compact, COM Express Mini, PCI/104-Express, PCIe/104, PC/104-Plus, PC/104, ETX, BTX, MicroBTX, PicoBTX, FlexATX, NLX, WTX, ATX, Baby-AT, AT, XT, HPTX, smartModule, Mini-ATX, DTX, Mini-DTX, XTX, and microATC. A person having ordinary skill in the art would understand that various computer form factors are possible and that motherboard 818 may easily be adapted for future computer form factors. According to various embodiments, motherboard 818 may include any number and combination of disk controllers, integrated graphics controllers supporting 2D and/or 3D graphics, an integrated sound card, a fast Ethernet network controller, a SATA connector, a nSATA connector, an IDE connector, a DIMM memory slot, a CPU fan, a PCI slot, an integrated audio codec chip, a CPU fan and heat sink mount, a power connector, a super IO chip, a USB 2.0 and USB 3.0, or similar, connectivity, IrDA controller for infrared data communication, temperature, voltage, and fan-speed sensors, or other suitable computing, graphics, or audio components. Motherboard 818 may include a basic input output system (BIOS) stored in an EEPROM chip soldered to or socketed on motherboard 818, used to boot an operating system.

Receiving bay 836 may include any number of connectors for structurally and electronically connecting to any number of modular boards 1925. The connectors may operate similarly to expansion slots, such as PCI slots, of a traditional motherboard 818. According to various embodiments, receiving bay 836 does not include processor 702 and serves to provide an infrastructure for the interconnection of the modular boards 1925 with each other and additional components of modular thermostat 600, such as display 802. However, in some embodiments, receiving bay 836 may optionally include processor 702.

Receiving slots 74 are intended to receive any one of the compatible modular boards 1925. In one embodiment, when inserting the modular board 1925 into modular thermostat 600, the user first inserts the board into rails 72 disposed at the desired location. Next, the modular board 1925 is guided along rails 72 until the modular board 1925 connects to the receiving slot. The connection of the modular board 1925 to the receiving slot is not only structural but electrical as well. For example, inserting humidity board 824 into a receiving slot and connecting it may allow the user to measure the humidity of a space. Depending on the receiving slot, the modular board 1925 may snap or lock into place. For example, certain connector holds and press-fit mechanisms exist that could be utilized by the receiving slot and modular board. While it is envisioned that all modular boards 1925 may be compatible with all receiving slots 74, it is possible that only some modular boards 1925 are compatible with some receiving slots 74. For example, as technology becomes more advanced, modular thermostat 600 may have more than one version (e.g., generation) of receiving slot, such as motherboard 818 or a receiving bay 836. The new version receiving slot may provide added capability and therefore may require different modular boards 1925. While the modular boards 1925 and receiving slots 74 illustrated are generally square or rectangular in shape, in other various embodiments modular thermostat 600 may accept boards of all shapes and of all dimensions. As modular boards 1925 become more advanced, other physical configurations may prove to be advantageous over traditional modular board 1925 design. For example, in order to maximize space, modular boards 1925 may become cylindrical and would connect to corresponding cylindrical receiving slots 74 within modular thermostat 600.

Rails 72 included within modular thermostat 600 may come in various shapes and of various dimensions in order to suit application needs. For example, in some embodiments, server rack rails 72 may be used. Rails 72 of modular thermostat 600 may be sized to accept a plurality of modular boards 1925, which will be discussed in greater detail herein. Rails 72 are intended to provide a universal receiving mechanism for all modular boards 1925. FIGS. 6-7 depict exemplary embodiments where rails 72 are all the same. According to various embodiments, different rail types may be interchangeably used within modular thermostat 600. For example, certain rail types may be intended for a certain grouping of compatible modular boards 1925, where another rail type may be intended for a different grouping of compatible boards. Other suitable rail types include, but are not limited to, ball-bearing rails 72, c-channel rails 72, channel rails 72, magnetic rails 72, sliding rails 72, and more.

According to various embodiments, other suitable holding mechanisms may be alternatively used. For example, rather than sliding the modular boards 1925 into and out of rails 72, the user may simply place them into a different holding mechanism, such as a number of shelves, or, alternatively, one continuous shelf. Other holding mechanisms include pegs, slots, etc. As shown in FIGS. 6-7, rails 72 may be disposed on the vertical interior surfaces of modular thermostat 600. However, in some embodiments rails 72 may be disposed on the inner vertical surfaces of modular thermostat 600 or the inner surfaces of modular thermostat 600 which are parallel with wall 70. Various numbers of rails 72, distances between rails 72, and sizes of rails 72 may all be employed within modular thermostat 600. In one embodiment, modular thermostat 600 may contain any number of rails 72 vertically spaced at equal distances apart. However, in other embodiments larger distances between certain rails 72, or even different rail configurations, within modular thermostat 600 may exist. By incorporating different rail structures or spacing, various sizes and types of modular boards 1925 may be inserted into modular thermostat 600. In some embodiments, variations of rails 72 may necessitate corresponding variations in receiving slots 74. For example, greater spacing between rails 72 may require greater spacing between receiving slots 74.

While FIGS. 6-7 illustrate different mounting configurations of modular thermostat 600 within wall 70, it is also possible that modular thermostat 600 be mounted recessed within wall 70. Recessing modular thermostat 600 within wall 70 may allow for the flush installation of display 802 or other component, or may provide other structural benefits. For example, in some applications mounting modular thermostat 600 recessed within wall 70 may allow for glare reduction on the screen, or for an additional cover to be placed over modular thermostat 600. In some applications, mounting modular thermostat 600 recessed within wall 70 may even allow for a faux wall piece to be installed over modular thermostat 600, camouflaging the position of modular thermostat 600 within wall 70. By mounting modular thermostat 600 within wall 70, all of the components of modular thermostat 600 are held inside wall 70.

Figure 8:
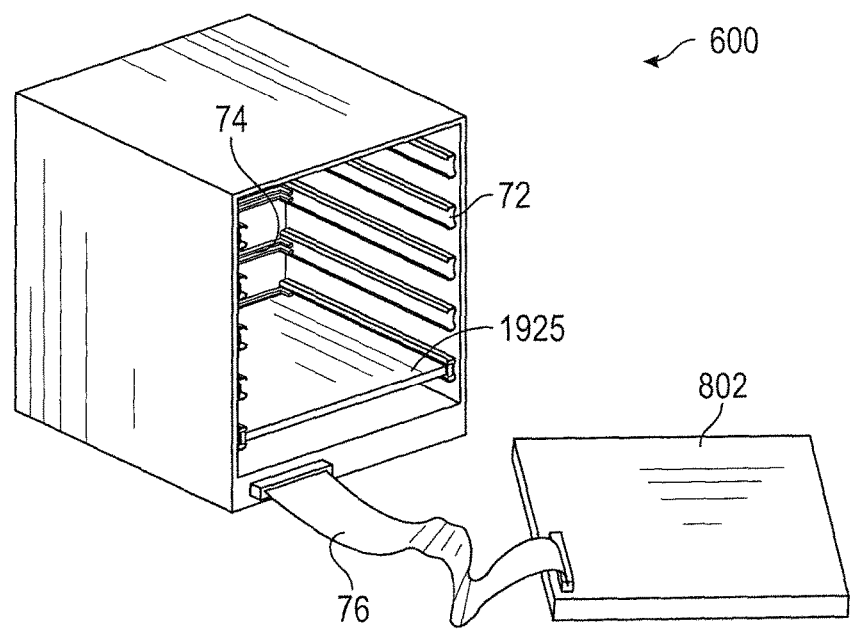
FIG. 8 is a perspective view of the modular thermostat including a number of rails and a number of receiving slots, where modular thermostat is attached to a display through the use of a ribbon cable, according to some embodiments.
Figure 13:
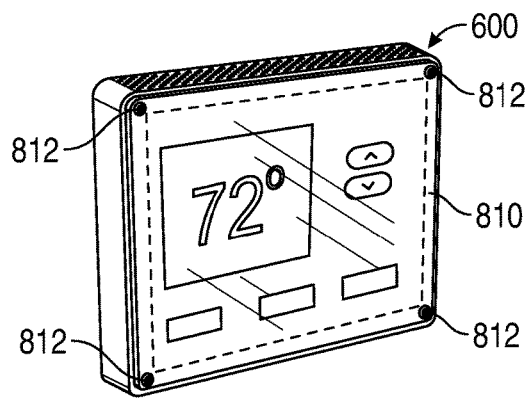
FIG. 13 is modular thermostat including front plate mounted to modular thermostat, according to some embodiments.
Figures 14, 15:
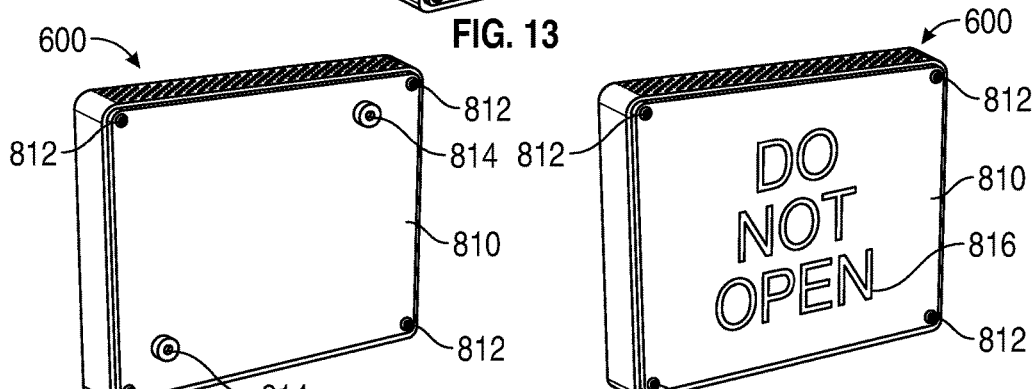
FIG. 14 is modular thermostat including front plate mounted to modular thermostat where front plate includes a number of locks, according to some embodiments.
FIG. 15 is modular thermostat including front plate mounted to modular thermostat where indicia is present on front plate, according to some embodiments.

FIG. 8 illustrates an exemplary embodiment of modular thermostat 600 while not installed within wall 70. According to FIGS. 6-8, and other various embodiments, modular thermostat 600 has a substantially cuboidal shape. However, other shapes are possible including a cubic, spherical, toroidal, or other prismatic shape. According to various embodiments, modular thermostat 600 includes a plurality of rails 72 disposed on parallel interior sides of modular thermostat 600. While shown as one shape, modular thermostat 600 may also take the form of various combined shapes. For example, modular thermostat 600 may have a square opening and a rectangular body.

In terms of material construction, modular thermostat 600 may be constructed out of any suitable structural material or grouping thereof. According to one embodiment, modular thermostat 600 may be constructed from plastic or another polymeric blend. In other embodiments, modular thermostat 600 may be constructed from a metallic material such as aluminum.

In some applications, modular thermostat 600 may provide another distinct advantage over a conventional thermostat. During building construction, a thermostat installation requires a joint effort between HVAC installers as well as the building construction service due to the various connections that need to be made. Using modular thermostat 600 allows installation of the thermostat to be completed after building construction. First, the building construction service simply pre-wires modular thermostat 600 to a power source. Second, after the installation of the building has been completed, the rest of the necessary installation can be performed by the HVAC installers.

According to various embodiments, modular thermostat 600 may include display 802, as shown in FIG. 8. Display 802 may be connected to modular thermostat 600 via any suitable connection means. For example, display 802 may be connected to modular thermostat 600 via ribbon cable 76. In some embodiments, display 802 may structurally and electronically connect to modular thermostat 600 through securing mechanisms incorporated within modular thermostat 600 and display 802. For example, display 802 may be fastened to modular thermostat 600 by a number of fasteners 812. According to various embodiments, other types of electrical connections between modular thermostat 600 and display 802 may be made. For example, Universal Serial Bus (USB), Thunderbolt, micro-USB, or any other electrical connection may be made. In still other embodiments, display 802 may have separate electrical and graphical communications connections to modular thermostat 600. In one embodiment, display 802 may electrically connect to modular thermostat 600 via a basic wired connection while providing graphics to modular thermostat 600 through a high-definition multimedia interface (HDMI), video graphics array (VGA) connection, or other suitable communications connection.

Referring to FIGS. 9-10, the modular thermostat 600 containing a number of receiving slots 74 and rail 72 is illustrated. Additionally, FIGS. 9-10 show a modular board 1925 installed within the rails 72, the receiving slots 74, and the modular thermostat 600. While in the FIGURES modular boards 1925 have been shown mating with a singular set of rails 72 and a corresponding, aligned, receiving slot 74, it is possible that a modular board 1925 may be utilized that occupies two, or more, sets of rails 72. In these embodiments, the modular board 1925 may be received within one, two, or more receiving slots 74. For example, a modular board 1925 may be received within three sets of rails 72 and it may be configured to connect to two receiving slots 74. The receiving slots 74 may be received at any position on the modular board 1925 capable of receiving the receiving slots 74.

Display 802 may include many different components. In some embodiments, display 802 includes a frame partially or completely surrounding display 802. Display 802 may also take various functional forms. FIGS. 11-12 illustrates modular thermostat 600 with an attached touch-sensitive display 802. In some embodiments, the touch-sensitive display 802, is a capacitive liquid crystal display 802 (LCD) screen. In other embodiments, the frame is touch-sensitive. In some embodiments, a capacitive layer may extend from display 802 out over the frame (i.e., both display 802 and frame are touch-sensitive). According to some embodiments, modular thermostat 600 may be configured to have buttons on the frame. Buttons on frame may be touch sensitive buttons that appear on display 802 but may also be physical buttons. Buttons may also be predefined areas of the capacitive layer which extends over frame. In some embodiments, buttons may be associated with large areas of frame and are not finely sensitive. In some embodiments display 802 may also be a plasma screen, a light emitting diode (LED) screen, or an organic light emitting diode (OLED screen). Display 802 may also be two-dimensional or three-dimensional. It is envisioned that display 802 may be adapted to utilize a holographic or other virtual reality display as well.

Display 802 may define a front face of modular thermostat 600. Display 802 may be mounted substantially flush with wall 70 such that modular thermostat 600 is entirely contained within wall 70. By mounting display 802 flush with wall 70, modular thermostat 600 may be more aesthetically pleasing then conventional thermostats that extend from a wall. As shown in FIG. 11, modular thermostat 600 includes an integrated sensor 1100. According to various embodiments, integrated sensor 1100 is an infrared sensor (e.g., IR gun, non-contact sensor, etc.). In an exemplary embodiment, integrated sensor 1100 is configured to measure temperature of an environment (e.g., a space, a surface, a wall, an object, etc.) facing integrated sensor 110. For example, modular thermostat 600 may be mounted on a first wall 70 and integrated sensor 1100 may determine the temperature of a second wall 70 opposite the first wall 70. Modular thermostat 600 may correlate the temperature determined by the integrated sensor 1100 of the wall 70 with the temperature of an environment surrounded by that wall 70. In another example, integrated sensor 110 may directly determine the temperature of air surrounding modular thermostat 600.

In some applications, integrated sensor 1100 is integrated into display 802. In these applications, integrated sensor 1100 may be connected to any modular board 1925, motherboard 818, and/or receiving bay 836. In other applications, integrated sensor 1100 is integrated into any modular board 1925, motherboard 818, and/or receiving bay 836. In these applications, display 802 may include a portion (e.g., hole, etc.) through which integrated sensor 1100 may protrude or through which integrated sensor 1100 may project a sensor beam through.

According to various embodiments, display 802 may be of various sizes and thicknesses. According to some embodiments, display 802 may be oversized relative to the opening on modular thermostat 600. FIG. 12 illustrates modular thermostat 600 including, according to various embodiments, a hardware interface 808. Hardware interface 808 may be disposed on any side, portion, or location on modular thermostat 600. Hardware interface 808 may include various hardware connections such as USB, micro-USB, Firewire, Thunderbolt, Ethernet, VGA, or other suitable communications connection. In various embodiments, hardware interface 808 may be connected directly to any number of modular boards 1925. For example, hardware interface 808 may be connected directly to battery board 832. In this example, hardware interface 808 may provide electrical energy to battery board 832 through, for example, power over Ethernet (PoE) and line power. In other embodiments, hardware interface 808 may be directly connected to motherboard 818 or receiving bay 836. In still other embodiments, hardware interface 808 may be connected directly to any number of modular boards 1925 and motherboard 818 or receiving bay 836. Depending on the configuration of modular thermostat 600, some, or all of the features on the hardware interface 808 may be active (i.e., some of the ports may not be connected to a modular board/motherboard 818/receiving bay 836. Different hardware interfaces 808, security devices, modular boards 1925, and displays 802 may be interchanged (e.g., swapped, replaced, upgraded, updated, etc.) by the user throughout the life of the modular interface without the need for rewiring. While the hardware interface 808, security device, modular boards 1925, and display 802 characteristics have been outlined above, according to various embodiments, it is envisioned that as technology changes so shall the capabilities of the hardware interface 808, security device, and display 802. For example, a new communication connection could simply be added into the hardware interface 808 in order to provide compatibility of modular thermostat 600 with the new communications connection.

According to various embodiments, modular thermostat 600 may include additional components disposed on modular thermostat 600. For example, modular thermostat may include a security device. According to other embodiments, display 802 may be smaller than the face of modular thermostat 600, meaning that there is a certain spacing between display and the frame. In some embodiments, this spacing may be occupied by buttons. In other embodiments, the security device such as a keypad entry, a tumbler, a biometric device, a retinal scanner, an iris recognition device, or other suitable security device may be disposed in this spacing.

Referring still to FIG. 12, modular thermostat 600 may be compatible with external accessories. Modular thermostat 600 is shown to include device 3304. Modular thermostat 600 may contain multiple ports. Device 3304 may be compatible with USB, Thunderbolt, HDMI, Ethernet, 3.5 mm, or any other communications standards, and may be used to communicate tabulated, visual, audio, or any other type of data. FIG. 12 is shown to include device 3304. In one embodiment, device 3304 is exclusively compatible with modular thermostat 600. In some embodiments, device 3304 is compatible with a variable of devices, and can transfer data between modular thermostat 600 and another device compatible with device 3304. For example, external accessory may be a USB dongle which can store data to be analyzed from modular thermostat 600 and transfer the data to a laptop. In some embodiments, device 3304 is able to communicate with a user device and may be used during installation for troubleshooting. For example, device 3304 may be a phone dongle which assists a technician in troubleshooting wiring installation such as a Cat5e tester.

Device 3304 may provide additional capabilities to modular thermostat 600. In some embodiments, device 3304 contains communications means which modular thermostat 600 does not otherwise have. For example, modular thermostat 600 may only have communications electronics which are configured for Bluetooth communications. Device 3304 may contain communications electronics which allow modular thermostat 600 to communicate over Wi-Fi, expanding the network of devices and applications with which modular thermostat 600 can interact. In one embodiment, a previous model of thermostat may be retrofit with device 3304 to gain functionality of features of modular thermostat 600.

FIG. 13-16 illustrate instances where display 802 of modular thermostat 600 has been covered by front plate 810 (e.g., cover, lid, face, etc.). In some applications, it may be desirable for display 802 modular thermostat 600 to be selectively visible and accessible. For example, in many commercial applications, such as within a shopping mall or retail store, modular thermostat 600 without front plate 810 may be unintentionally damaged or tempered with. By placing a front cover over modular thermostat 600, a building owner can control access and use of modular thermostat 600 to a greater extent, and can even camouflage the location of modular thermostat 600. Front plate 810 can be attached to modular thermostat 600 through any fastener or other attachment mechanism. Special fasteners 812 such as security Torx (temper resistant Torx, Torx TR, pin-in Torx, etc.) or other suitable security fasteners 812 may be used to fasten front plate 810 to modular thermostat 600.

Any number of fasteners 812 may be used to secure front plate 810 to modular thermostat 600. Further, there is no requirement that all fasteners 812 be of the same variety. For example, front plate 810 could be fastened to modular thermostat 600 using two Torx fasteners 812 and two security Torx fastener. Alternatively, front plate 810 may simply be snapped in to modular thermostat 600, or magnetically coupled to modular thermostat 600, or affixed to modular thermostat 600 through the use of an adhesive. Front plate 810 may be made of any desired material. For example, front plate 810 may be made to match the surface of wall 70 modular thermostat 600 is mounted to. In other embodiments, front plate 810 may have indicia 816 printed, engraved, or otherwise inscribed on it. In other embodiments, a sticker containing indicia 816 may be placed on front plate 810. The indicia 816 may include warnings printed in a language, instructions, graphical images, or other suitable communications languages. For example, front plate 810 may be red in color and have "DO NOT OPEN" inscribed on it to discourage unauthorized individuals from tampering with modular thermostat 600.

According to some embodiments, front plate 810 may include a number of locks 814 to secure front plate 810 to modular thermostat 600 and prevent tampering or use by unauthorized users. These locks 814 may be key locks 814, tumbler locks 814, or other suitable locking mechanisms. In some embodiments, front plate 810 may include a dedicated security device may be configured to lock and unlock front plate 810. The dedicated security device may be a keypad entry, a tumbler, a biometric device, a retinal scanner, an iris recognition device, or other suitable security device.

In some embodiments, display 802 provides a security interface (e.g., lock screen, authorization request, etc.). For example, display 802 may request a security key (e.g., a person identification number, a biometric identifier, a key card, an RFID badge, a password, etc.) from a user before providing the user with access to various features of modular thermostat 600 such as configuration and set-up features. In some applications, this may allow an authorized maintenance worker to adjust the settings of modular thermostat 600 while preventing an unauthorized occupant from doing so. According to various embodiments, display 802 is configured to display information (e.g., temperature, humidity, occupancy, date, time, etc.) to users without requiring entry of the security key. In this way, modular thermostat 600 may achieve a more aesthetically pleasing external appearance compared to conventional thermostats which are often encased in supplemental, tamper-proof enclosures to prevent unauthorized modifications.

While front plate 810 has been discussed as attaching to modular thermostat 600 through fastening or other attachment mechanisms, it is also envisioned that front plate 810 could be of the sliding door variety. For example, according to one embodiment, front plate 810 may be flexible, may move through slots disposed on modular thermostat 600 or wall 70, and may have a lock that the user can articulate to secure the door to modular thermostat 600 or to open modular thermostat 600. According to some embodiments, front plate 810 may also include a dedicated hardware interface 808. The dedicated hardware interface 808 may be configured to accept USB, micro-USB, Firewire, Thunderbolt, Ethernet, VGA, or any other suitable communications connection. In various embodiments, the dedicated hardware interface 808 may be connected directly to any number of modular boards 1925. In other embodiments, the dedicated hardware interface 808 may be directly connected to motherboard 818 or receiving bay 836. In still other embodiments, the dedicated hardware interface 808 may be connected directly to any number of modular boards 1925 and motherboard 818 or receiving bay 836. Depending on the configuration of modular thermostat 600, some, or all of the features on the dedicated hardware interface 808 may be active (i.e., some of the ports may not be connected to a modular board/motherboard 818/receiving bay 836. Different dedicated hardware interfaces 808 and dedicated security devices may be interchanged (e.g., swapped, replaced, upgraded, updated, etc.) by the user throughout the life of the modular interface without the need for rewiring. In some embodiments, front plate 810 may be a thin sheet or film attached to modular thermostat 600 configured only to prevent the modular boards 1925 or other internal components of modular thermostat 600 from encountering undesirable particulates. According to various embodiments, the user may utilize modular thermostat 600 without display 802 or front plate 810. In some applications, it may not be necessary for modular thermostat 600 to be covered or constant accessibility to the modular boards 1925 is desired.

In some applications, it may be desirable for front plate 810 or display 802 to be sealed. For example, various types of seals such water proof, water tight, water resistant, air tight, impact resistant, corrosion resistant, or to have other suitable seals can be attained. It is envisioned that front plate 810 and/or display 802 could be easily adapted to meet these needs. For example, in some applications modular thermostat 600 may be installed in a high-humidity environment such as a green house or laboratory. In such environments, condensation build-up may be an issue. As such, various sealing mechanisms such as gaskets, seals, epoxies, and other suitable sealing mechanisms may prevent condensation from penetrating modular thermostat 600. In some applications, such as marine applications, it may desirable to have complete water protection of modular thermostat 600. In these situations, more robust sealing mechanisms may be necessary. In some applications, front plate 810 may be included with modular thermostat 600 to provide the necessary sealing mechanism.

Figure 16:
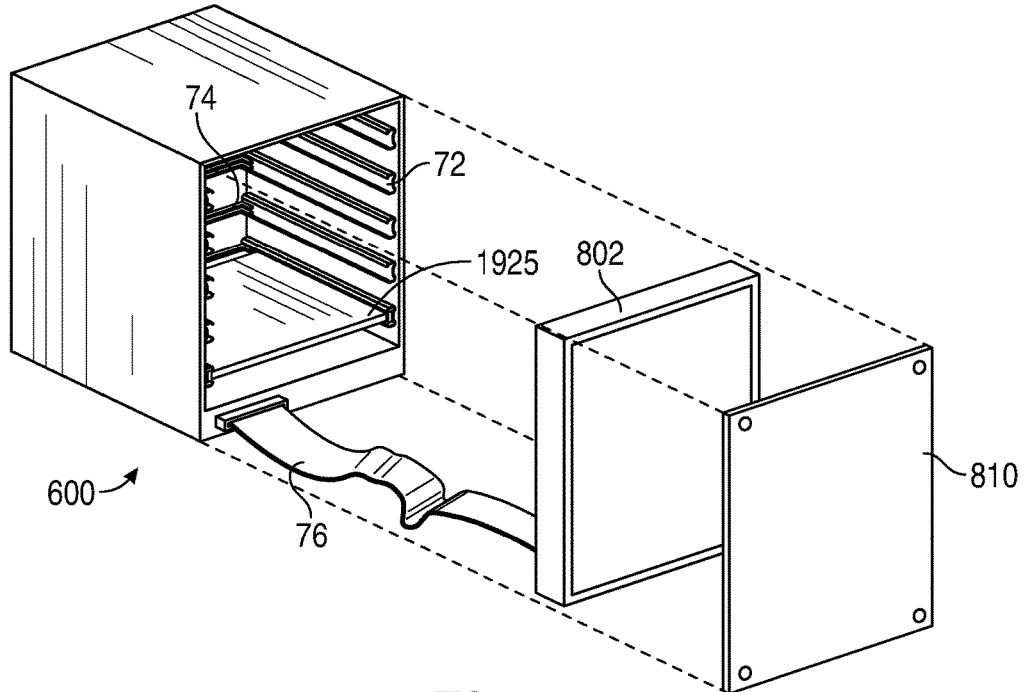
FIG. 16 is a perspective view of the modular thermostat including display mounted to modular thermostat and a front plate covering the display and mounted to the modular thermostat according to some embodiments.

Further, according to the exemplary embodiment shown in FIG. 16, the front plate 810 may be provided to seal the display 802 of the modular thermostat 600 from water or other contaminants. In these embodiments, as with other embodiments, it is possible that the front plate 810 be constructed from a transparent or semi-transparent material, such that a user may see the display 802 may be viewed through the front plate 810. In these embodiments, if a user wishes to utilize the modular thermostat 600, the front plate 810 may simply be removed either through the removal of fasteners 812 or other securing mechanism.

Modular Boards

FIGS. 17-19 illustrate cross-sectional structural views of various embodiments of modular thermostat 600. Modular thermostat 600 is shown to include several modular boards 1925. As will be described in greater detail, each modular board 1925 provides additional capabilities and/or functionality to modular thermostat 600. For example, each modular board 1925 may be configured to perform various thermostat functions or may be configured to provide various thermostat functions to modular thermostat 600. Each modular board 1925 is configured to be received within any receiving slot, either in motherboard 818 or receiving bay 836. According to various embodiments, additional modular boards 1925 are possible. According to various embodiments, it is possible that various generations or models of modular boards 1925 are possible. In these embodiments, all modular boards 1925 of the model or generation corresponding to modular thermostat 600 may be interchangeable and share common connections to receiving slots 74.

In some embodiments, modular boards 1925 communicate with modular thermostat using an encrypted communication. In these embodiments, only authorized modular boards 1925 may be communicable (i.e., capable of communicating) with modular thermostat 600. For example, pirated (e.g., counterfeit, etc.) components may not be communicable with motherboard 818. The encrypted communication may be updated and/or supplemented at regular intervals for both modular thermostat 600 and modular boards 1925. Alternatively, modular boards 1925 may include an authentication chip is required for recognition by, and communication with, modular thermostat 600.

As will be described according to various embodiments, various configurations and combinations of modular boards 1925 within modular thermostat 600 are possible. For example, modular thermostat 600 may include any combination of display 802, motherboard 818, networking board 820 including memory, occupancy detection board 822 including memory, humidity board 824 including memory, NFC board 826 including memory, temperature board 828 including memory, an energy harvesting board 830 including memory, and battery board 832 including memory. Additional modular boards 1925 may be included within modular thermostat 600 as needed for a given application.

According to various embodiments, motherboard 818 adaptively reconfigures (e.g., displays relevant information, hides non-essential information, etc.) user interface 406 displayed on display 802 based on which modular boards 1925 are included in modular thermostat 600. For example, if modular thermostat 600 includes humidity board 824 and temperature board 828, motherboard 818 may configure user interface 406 that is displayed (e.g., provided, etc.) on display 802 to display temperature information and humidity information. Following this example, if humidity board 824 is interchanged with occupancy detection board 822, motherboard 818 may adaptively reconfigure user interface 406 displayed on display 802 to display occupancy information rather than humidity information. In other examples, motherboard 818 may configure user interface 406 provided on display 802 to display battery information (e.g., current battery level, time to charge battery, battery cell life, etc.) if battery board 832 is included in modular thermostat 600, motherboard 818 may configure user interface 406 provided on display 802 to display energy harvesting information (e.g., amount of energy harvested, amount of money saved through energy harvesting, etc.) if energy harvesting board 830 is included in modular thermostat 600, motherboard 818 may configure user interface 406 displayed on display 802 to include NFC information (e.g., number of nearby NFC devices, etc.) if NFC board 826 is included in modular thermostat 600, and motherboard 818 may configure user interface 406 to include network information (e.g., network name, network speed, etc.) if modular thermostat 600 includes networking board 820.

The cross-sectional structural views illustrated in FIGS. 17-19 are simplified views taken at line 10-10 of FIG. 9. According to the embodiment shown in FIG. 17, modular thermostat 600 may include display 802, motherboard 818, networking board 820 including memory, occupancy detection board 822 including memory, humidity board 824 including memory, NFC board 826 including memory, temperature board 828 including memory, an energy harvesting board 830 including memory, and battery board 832 including memory.

As shown in FIG. 18, motherboard 818 includes processing circuit 608 which includes processor 702, a modular board recognizer (e.g., application programming interface (API), etc.) 1920, and memory 1930. Motherboard 818 includes an equipment model 1922, stored in memory 1930. Equipment model 1922 defines (e.g., lists, stores, correlates, etc.) a variable (e.g., value, etc.) used by a building automation system (BAS). In some embodiments, the variable defined by equipment model 1922 is related to how the BAS interacts with modular thermostat 600. Equipment model 1922 may be defined by a different variable, or a number of variables, depending on the configuration of modular thermostat 600. For example, particular modular boards 1925 being included in modular thermostat 600 may influence the variable defined by equipment model 1922. Modular board recognizer 1920 functions to recognize which modular boards 1925 are communicable with motherboard 818 and then to configure equipment model 1922 of motherboard 818 accordingly. In this way, modular board recognizer 1920 ensures that motherboard 818 is able to effectively communicate within modular thermostat 600 and with the BAS when modular boards 1925 are changed (e.g., replaced, upgraded, interchanged, etc.).

Equipment model 1922 may be implemented in a provisioning system (e.g., auto-provisioning system, etc.) where modular thermostat is interacted with differently by a BAS depending on the modular boards 1925 coupled to modular thermostat 600. Through the use of equipment model 1922, modular thermostat 600 may appear differently to the BAS depending on the thermostat functions available to modular thermostat 600 through the modular boards 1925 coupled to modular thermostat 600. For example, if humidity board 824 is coupled to modular thermostat 600, equipment model 1922 may have a variable that indicates to the BAS that modular thermostat 600 is capable of obtaining humidity measurements. However, if occupancy detection board 822 is also coupled to modular thermostat 600, equipment model 1922 may have a variable that indicates to the BAS that modular thermostat 600 is capable of obtaining humidity and occupancy measurements.

FIG. 19 illustrates an embodiment where motherboard 818 has been replaced by receiving bay 836 and processing board 1910 has been included to provide processing power for modular thermostat 600 that is typically provided by motherboard 818. In these embodiments, all references to motherboard 818 apply to processing board 1910. For example, processing board 1910 is similarly defined by equipment model 1922. In some applications, processing board 1910 could be utilized to supplement the processing power modular thermostat 600. For instance, an entry level modular thermostat 600 with a relatively small computation power could be purchased by the user. According to this example, if the user would like to upgrade the processing power of modular thermostat 600, in order, for instance, to provide greater functional or response time, the user could purchase processing board 1910 and insert it into modular thermostat 600 to offset the computational power of the relatively small computational power of the original modular thermostat 600. Additionally, while replacing motherboard 818 of modular thermostat 600 may not be a user-friendly task, interchanging or adding processing board 1910 to modular thermostat 600 is simple. Therefore, as technology advances and newer processors 702 are desired, the user could purchase and easily install a new and up-to-date processor 702 rather than replacing motherboard 818 or modular thermostat 600. In this embodiment, processing board 1910 includes memory 1930 which contains modular board recognizer 1920 and equipment model 1922.

In some embodiments, memory 1930 contains a database with attributes, capabilities, and configuration information for various modular boards 1925. In these embodiments, when modular board recognizer 1920 receives a signal from modular board 1925 when modular board 1925 first becomes communicable with motherboard 818, modular board recognizer 1920 transmits the identification and/or type to memory 1930. Memory 1930 then searches the database for the attributes, capabilities, and configuration information corresponding to that identification and/or type. Memory 1930 then flags the corresponding attributes, capabilities, and configuration information as associated with modular board 1925. Memory 1930 may be periodically updated such that the database is updated. In this way, memory 1930 may recognize additional modular boards 1925.

Modular board recognizer 1920 then stores all of the information from the signal in memory 1930 such that the information remains associated with the modular board 1925 from which it was transmitted. Modular board recognizer 1920 may then reconfigure modular thermostat 600 based on information stored in memory 1930 or based on information obtained from an external device. For example, modular board recognizer 1920 may recognize that a new networking board 820 has been connected to modular thermostat 600. Modular board recognizer 1920 may reconfigure modular thermostat 600 based on information (e.g., communication protocols, power consumption requirements, etc.) stored in memory 1930, or may download that information from an external device (e.g., personal electronic device, computer, smart phone, server, cloud network, mobile device, etc.).

Based on the attributes, capabilities, and configuration information for all modular boards 1925 communicable with modular thermostat 600, modular thermostat 600 may be operated differently. For example, when temperature board 828 is connected to modular thermostat 600 and becomes communicable with motherboard 818, motherboard 818 may adaptively reconfigure user interface 406 displayed on display 802 to display temperature information. Similarly, when humidity board 824 is removed and is no longer communicable with motherboard 818, motherboard 818 may adaptively reconfigure user interface 406 displayed on display 802 to remove any humidity information.

Memory 1930 includes a module for gathering data 1940, a module for processing data 1950, a module for transmitting data 1960, a module for storing data 1970, a module for securing data 1980, and a module for analyzing data 1990. Gathering data module 1940 may be utilized to obtain data from modular boards 1925. For example, gathering data module 1940 may periodically request data from any modular boards 1925 communicable with motherboard 818. Processing data module 1950 may process data obtained by gathering data module 1940 to make various determinations. For example, processing data module 1950 may compare the temperature provided by temperature board 828 and the humidity provided by humidity board 824 to determine if modular thermostat 600 should instruct an air conditioning system to be turned on to provide cooling.

Transmitting data module 1960 may transmit data from modular thermostat to an external device (e.g., personal electronic device, computer, smart phone, server, cloud network, mobile device, etc.). For example, transmitting data module 1960 may transmit temperature information provided by temperature board 828 to a smart phone associated with a user so that the user can visualize temperature in real time on the smart phone. In some applications, transmitting data module 1960 may transmit a push notification to a user, potentially causing a display on a person electronic device associated with the user to activate. According to various embodiments, transmitting data module 1960 is utilized to update motherboard 818 for a new modular board 1925. Transmitting data module 1960 may communicate with an external device (e.g., via NFC, via RFID, via Bluetooth, via Bluetooth low energy, etc.). The external device may upload attributes, capabilities, and configuration information corresponding to the new modular board 1925 to motherboard 818. The new modular board 1925 may then be connected to modular thermostat 600. In applications where an existing modular board 1925 is replaced by a new modular board 1925, transmitting data module 1960 may transmit various information (e.g., settings, configurations, etc.) from the old modular board 1925 to the external device (e.g., via NFC, via RFID, via Bluetooth, via Bluetooth low energy, etc.). The external device may then transmit the various information received from transmitting data module 1960 to the new modular board 1925 (e.g., via NFC, via RFID, via Bluetooth, via Bluetooth low energy, etc.).

Storing data module 1970 may be utilized by motherboard 818 to store information received from modular boards 1925 and to store identifications, types, attributes, capabilities, and configuration information corresponding to various modular boards 1925. For example, storing data module 1970 may periodically store temperature information provided by temperature board 828 (e.g., to develop a chronological temperature plot, etc.). In another example, storing data module 1970 may be periodically updated to increase the database of modular boards 1925 that modular board recognizer 1920 can search. Securing data module 1980 may encrypt and decrypt signals between, for example, motherboard 818 and modular boards 1925. Securing data module 1980 may determine if a module board communicable with motherboard 818 is an authentic (i.e., non-counterfeit, non-pirated, etc.) modular board 1925. Further, securing data module 1980 may encrypt and decrypt transmissions between motherboard 818 and external devices. In some embodiments, securing data module 1980 is contained in modular board 1925. In this way, different encryptions and security protocols can be selectively employed by modular thermostat 600. In some applications, securing data module 1980 may be certified (e.g., by a government agency, etc.) for use in certain applications. Analyzing data module 1990 may independently determine interactions between modular thermostat 600 and, for example, surrounding building management systems. In one example, a user programs modular thermostat 600 to maintain a target set point temperature. Analyzing data module 1990 may analyze temperature readings from temperature board 828 and then adjust various building management system components to achieve the target set point temperature.

According to the embodiment shown in FIG. 19, modular thermostat 600 may include display 802, a receiving bay 836, a processing board 1910, networking board 820 including memory, occupancy detection board 822 including memory, humidity board 824 including memory, NFC board 826 including memory, temperature board 828 including memory, an energy harvesting board 830 including memory, and battery board 832 including memory. According to yet another exemplary embodiment modular thermostat 600 may include display 802, motherboard 818, processing board 1910, networking board 820 including memory, occupancy detection board 822 including memory, humidity board 824 including memory, NFC board 826 including memory, temperature board 828 including memory, an energy harvesting board 830 including memory, and battery board 832 including memory.

Collectively, processing board 1910, networking board 820, occupancy detection board 822, humidity board 824, NFC board 826, temperature board 828, the energy harvesting board 830, and battery board 832 are referred to as the "modular boards" or, can individually be generally referred to as a "modular board" where the type of modular board 1925 may be selected from the foregoing list of modular boards 1925. Collectively, memory 1820, memory 1822, memory 1824, memory, 1826, memory 1828, memory 1830, memory 1834, and memory 1930, if applicable, is referred to as "the memory." The memory may include one or more devices (e.g., memory units, memory devices, storage devices, etc.) for storing data and/or computer code for completing and/or facilitating the various processes described in the present disclosure. The memory may include random access memory (RAM), read-only memory (ROM), hard drive storage, temporary storage, non-volatile memory, flash memory, optical memory, or any other suitable memory for storing software objects and/or computer instructions. The memory may include database components, object code components, script components, or any other type of information structure for supporting the various activities and information structures described in the present disclosure. The memory may be communicably connected to processor 702 via processing circuit and may include computer code for executing (e.g., by processor 702) one or more processes described herein. When processor 702 executes instructions stored in the memory for completing the various activities described herein, processor 702 generally configures modular thermostat 600 (and more particularly processing circuit) to complete such activities.

Any of the modular boards 1925, the hardware interface 808, display 802, receiving bay 836, and modular thermostat 600 may optionally include a processing circuit. For example, as shown in FIG. 18, temperature board 828 may include a processing circuit having a processor 1832 and memory 1828. In some embodiments, each modular board 1925 may perform necessary processing operations internally within an integrated processing circuit, comprised of a processor and memory. In other embodiments, each modular board 1925 may perform necessary processing operations through the use of an external processing circuit. For example, each modular board 1925 may perform necessary processing operations through the use of processing board 1910. Further, each modular board 1925 may perform necessary processing operations through the use of a processing circuit included within motherboard 818 or receiving bay 836. Further, each modular board 1925 may perform necessary processing operations through the use of a processing circuit included in a different modular board 1925.

Each modular board 1925 may perform a different thermostat function or may provide modular thermostat 600 with the ability to perform a different thermostat function. Thermostat functions may be broadly defined as operations performed by any of modular boards 1925 as described herein. Each of processing board 1910, networking board 820, occupancy detection board 822, humidity board 824, NFC board 826, temperature board 828, the energy harvesting board 830, and battery board 832 may perform various thermostat functions or provide various thermostat functions to modular thermostat 600.

For example, processing board 1910 may perform the thermostat functions of processing data, storing data, transmitting data, analyzing data, adaptively reconfiguring user interface 406, and other similar functions. In another example, networking board 820 may perform the thermostat functions of communicating (e.g., transmitting information to, receiving information from, etc.) with an external device (e.g., an intermediate device, a BAS, another modular thermostat, etc.) and other similar functions. Occupancy detection board 822 may perform the thermostat functions of determining an occupancy in a target location (e.g., room, building, zone, etc.), tracking of individuals (e.g., tracking of a target individual, etc.), transmitting occupancy information, analyzing recorded occupancy information (e.g., to determine thermal loads from occupants, etc.), and other similar functions.

In one example, humidity board 824 performs the thermostat functions of measuring humidity in a target location (e.g., room, building, zone, etc.), analyzing humidity data, transmitting humidity data, determining other variables (e.g., temperature, occupancy, etc.) based on humidity data, and other similar functions. NFC board 826 may perform the thermostat functions of facilitate communication with another device over NFC. For example, NFC board 826 may perform the thermostat functions of receiving information over NFC, transmitting information over NFC, preparing transmission for transmission over NFC, and other similar functions. In some examples, temperature board 828 performs the thermostat functions of measuring temperature in a target location (e.g., room, building, zone, etc.), analyzing temperature data, transmitting temperature data, determining other variables (e.g., humidity, occupancy, etc.) based on temperature data, and other similar functions. Energy harvesting board 830 may perform the thermostat functions of harvesting energy from a location (e.g., room, building, zone, etc.), analyzing harvest energy (e.g., voltage, current, efficiency, etc.), identifying energy sources (e.g., rooms, buildings, zones, etc.) suitable for energy harvesting, providing harvested energy to modular thermostat 600, providing harvested energy to the BAS, and other similar functions. In some examples, battery board 832 may perform the thermostat functions of providing electrical energy to modular boards 1925 and modular thermostat 600, determining an amount of remaining electrical energy available to modular boards 1925 and modular thermostat 600, providing an active or passive back-up system for modular boards 1925 and modular thermostat 600, and other similar functions.

Figure 20A:
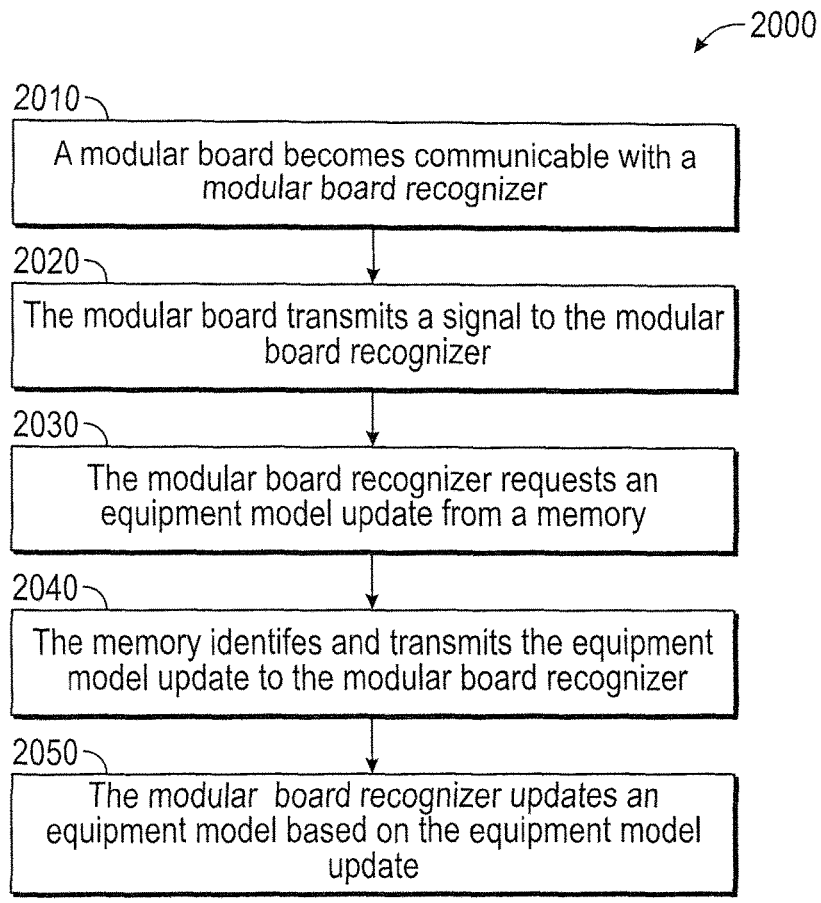
FIG. 20A is a flow diagram of a process for updating the equipment model of a modular thermostat, according to some embodiments.
Figure 20B:
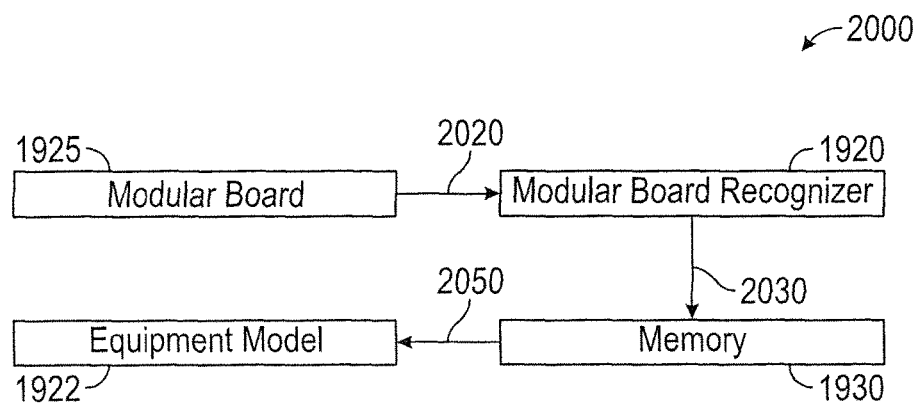
FIG. 20B is a block diagram of part of the process shown in FIG. 20A, according to some embodiments.

As shown in FIG. 20A-20B, modular board recognizer 1920 reconfigures the equipment model 1922 (e.g., changes the variable defined by equipment model 1922, etc.) via process 2000. In step 2010, modular board 1925 first becomes communicable with modular board recognizer 1920. For example, modular board 1925 may be connected to (e.g., plugged into, etc.) receiving bay 836 or directly connected to motherboard 818. In step 2020, modular board 1925 transmits a signal (e.g., announcement, etc.) which is received by modular board recognizer 1920. Modular board 1925 may first become communicable with motherboard 818 when modular board 1925 is plugged into motherboard 818, when modular thermostat 600 is turned on, when modular thermostat 600 is in a discovery mode, and in other similar situations. The signal transmitted by modular board 1925 to modular board recognizer 1920 includes, for example, an identification (e.g., unique identification, identification number, name, etc.) for that modular board 1925, a type (e.g., networking board, occupancy detection board, humidity board, NFC board, temperature board, energy harvesting board, battery board, etc.), and all attributes, capabilities, and configuration information associated with that modular board 1925.

Next, modular board recognizer 1920 reconfigures equipment model 1922 (e.g., changes the variable defined by equipment model 1922, etc.). Modular board recognizer 1920 requests, in step 2030, an equipment model update from memory 1930, the equipment model update corresponding to the signal received from modular board 1925. According to process 2000, memory 1930 contains a library of various equipment model updates for various modular boards 1925 sorted by, for example, identification, type, attributes, capabilities, and configuration information. This library may be updated periodically, such as through the use of networking board 820. In step 2040, memory 1930 identifies the equipment model update based on at least a portion of the signal and transmits the equipment model update to modular board recognizer 1920. Modular board recognizer 1920, in step 2050, then updates equipment model 1922 based on the equipment model update. Updating equipment model 1922 may include deleting or overwriting obsolete information, such as that corresponding to modular boards 1925 that were removed from modular thermostat 600. After step 2050, process 2000 is complete and modular thermostat 600 is fully capable of interacting with the BAS using modular board 1925.

Figure 21A:
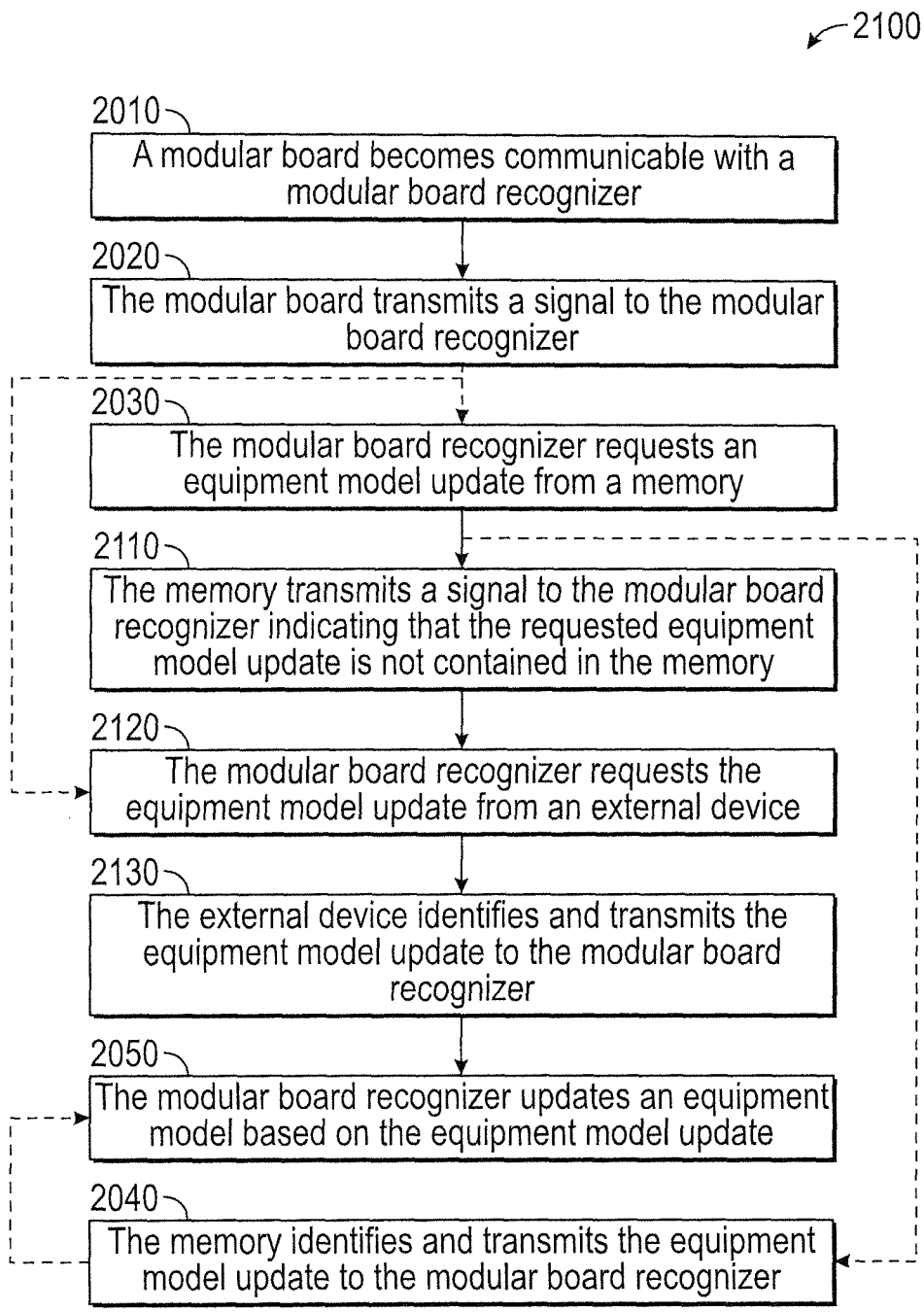
FIG. 21A is a flow diagram of another process for updating the equipment model of a modular thermostat, according to some embodiments.
Figure 21B:
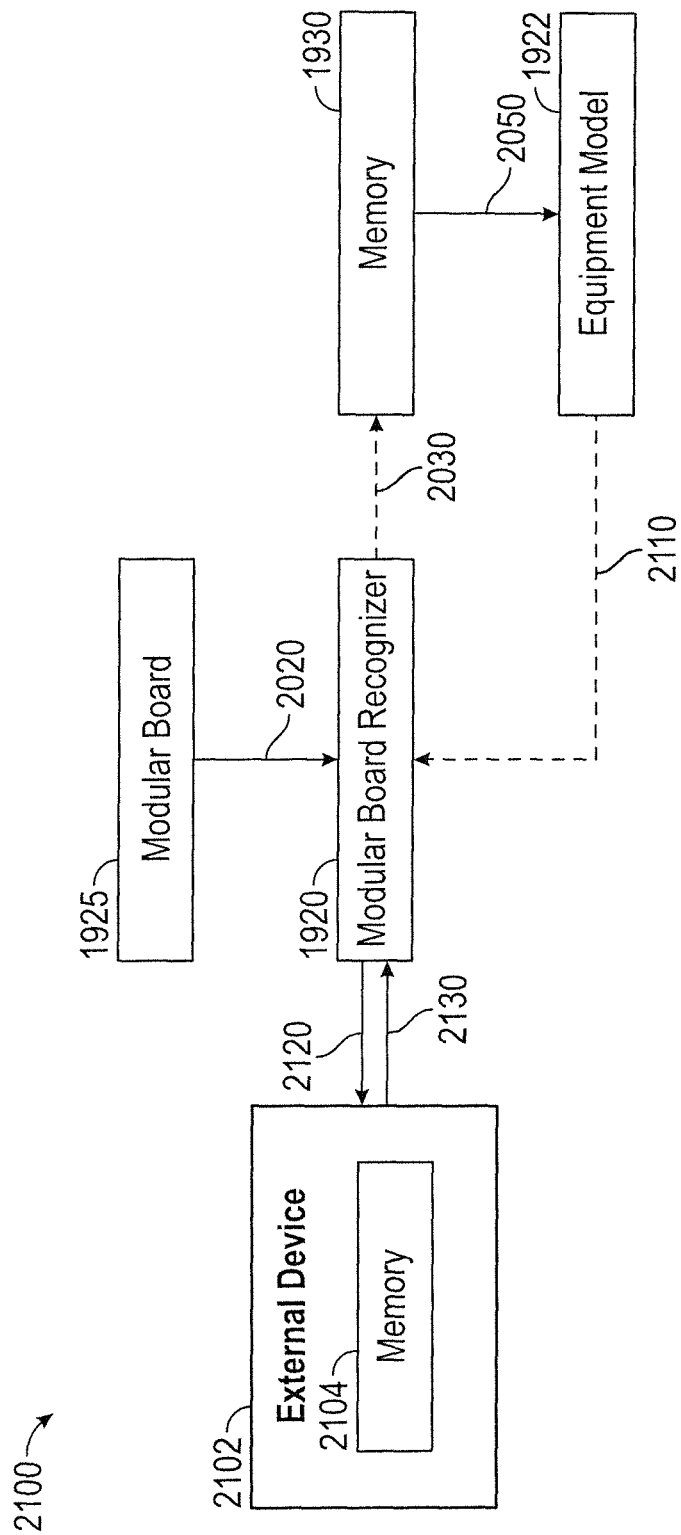
FIG. 21B is a block diagram of part of the process shown in FIG. 21A, according to some embodiments.

As shown in FIG. 21A-21B, modular board recognizer 1920 reconfigures the equipment model 1922 (e.g., changes the variable defined by equipment model 1922, etc.) via process 2100. Process 2100 is different from process 2000 in that in process 2100, modular board recognizer 1920 cooperates with external device (e.g., personal electronic device, computer, smart phone, server, cloud network, mobile device, etc.) 2102 to reconfigure equipment model 1922 (e.g., changes the variable defined by equipment model 1922, etc.). Similar to process 2000, process 2100 begins with step 2010 and step 2020 as previously described. As described in process 2000, memory 1930 may contain a library of various equipment model updates for various modular boards 1925.

In some implementations of process 2100, modular board recognizer 1920 may request an equipment model update from memory 1930, in step 2030. For example, memory 1930 may be configured to have several pre-loaded equipment model updates. If memory 1930 contains the requested equipment model update, process 2100, similar to process 2000, proceeds with step 2040 and step 2050. However, in the event that memory 1930 does not contain the requested equipment model update, memory 1930 may transmit, in step 2110, a signal to modular board recognizer 1920 indicating that the requested equipment model update was not found.

In step 2120, modular board recognizer 1920 requests the equipment model update from external device 2102. External device 2102 may include a memory 2104 that contains a library of various equipment model updates for various modular boards 1925 sorted by, for example, identification, type, attributes, capabilities, and configuration information. This library may be updated periodically, for example, as new (e.g., new models, new version, etc.) modular boards 1925 are produced or as new features (e.g., new firmware, etc.) are released for existing modular boards 1925. In some implementations, process 2100 moves directly from step 2020 to step 2120. In these implementations, memory 1930 may not contain any equipment model updates. This may allow memory 1930 to operate more efficiently. In step 2130, the external device identifies the requested equipment model update and transmits the equipment model update to the modular board recognizer 1920. Process 2100 concludes with step 2050 as previously described.

Figure 22A:
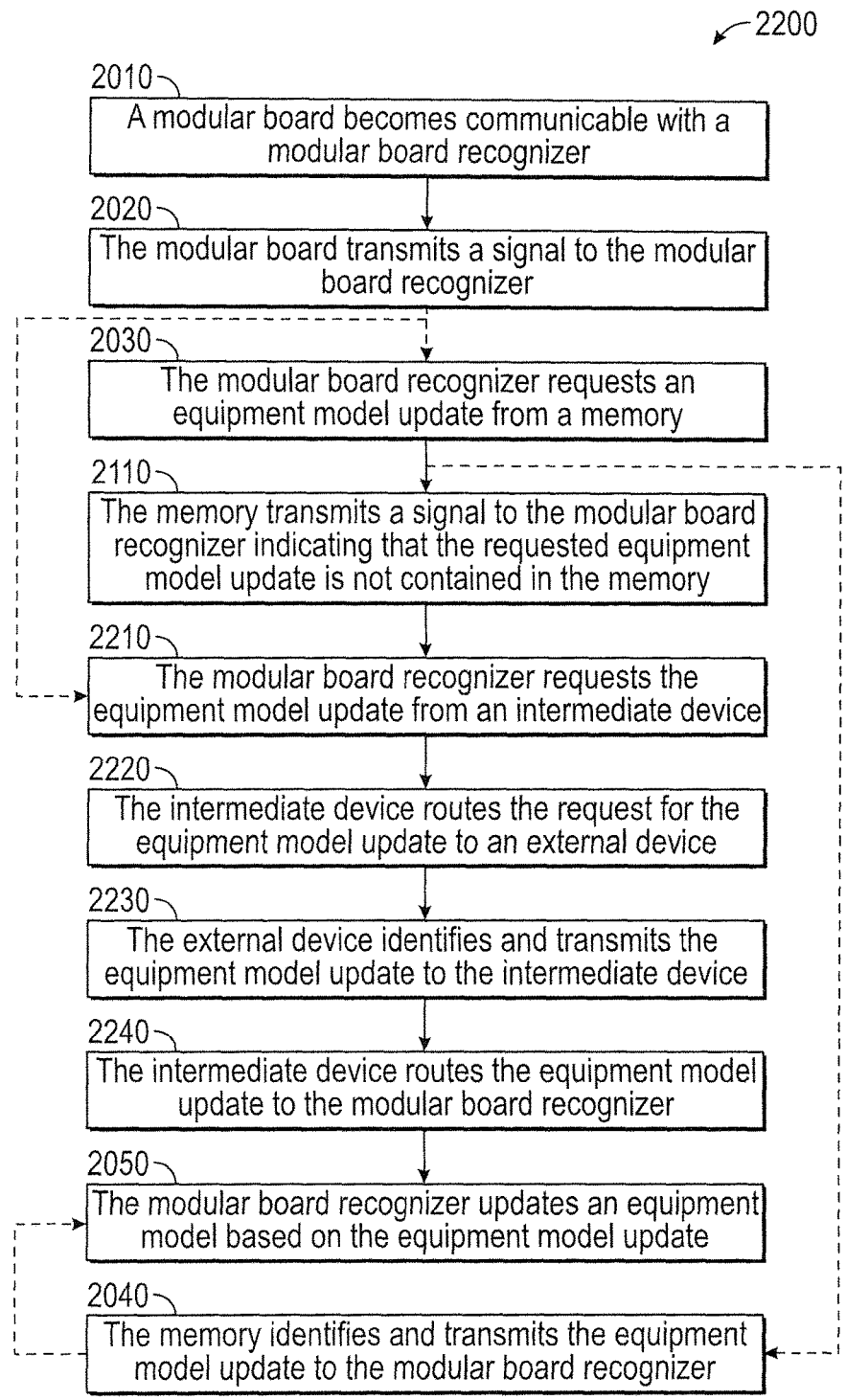
FIG. 22A is a flow diagram of yet another process for updating the equipment model of a modular thermostat, according to some embodiments.
Figure 22B:
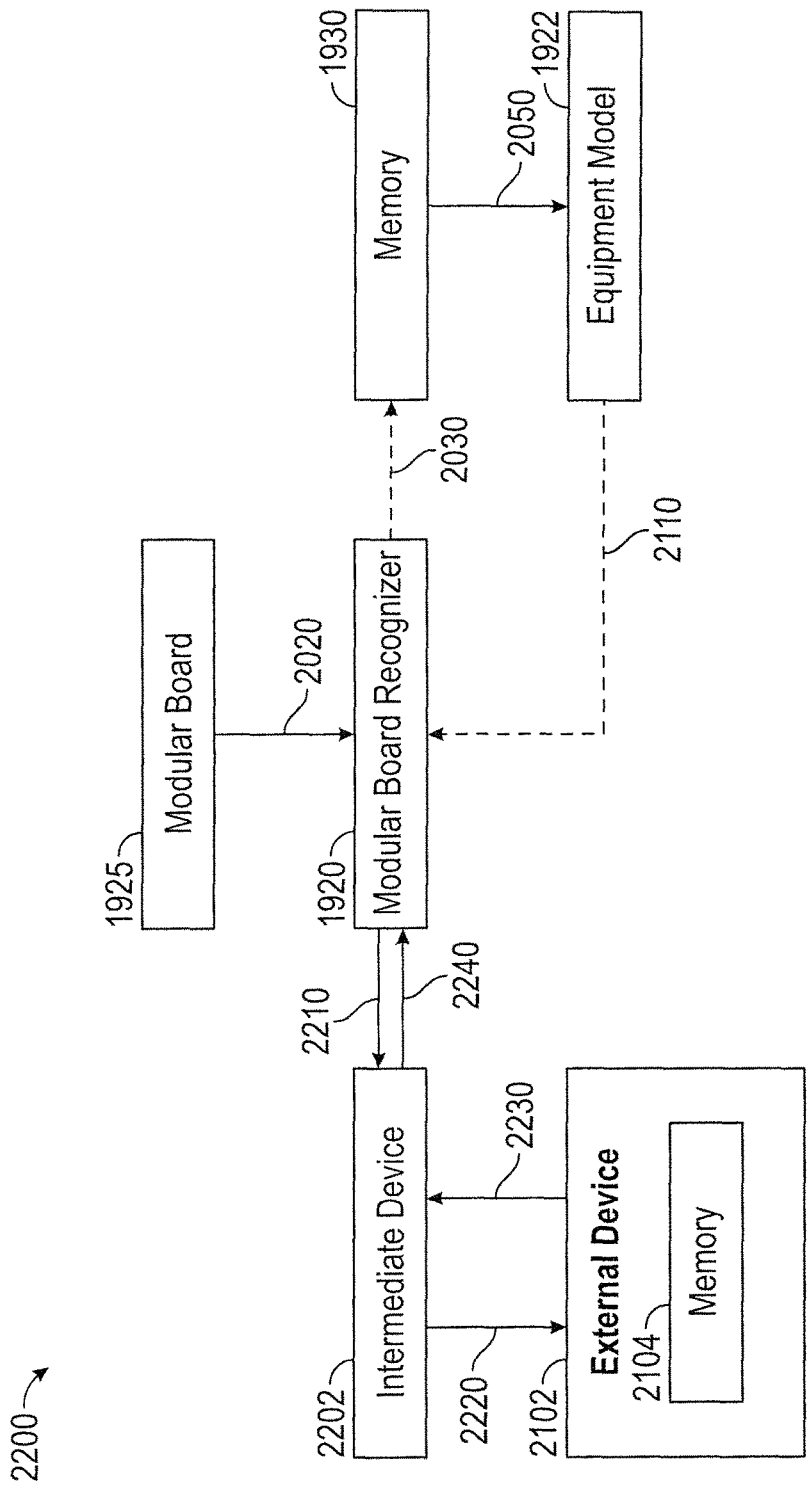
FIG. 22B is a block diagram of part of the process shown in FIG. 22A, according to some embodiments.

As shown in FIG. 22A-22B, modular board recognizer 1920 reconfigures the equipment model 1922 (e.g., changes the variable defined by equipment model 1922, etc.) via process 2200. Process 2200 is different from process 2100 in that in process 2200, modular board recognizer 1920 utilizes an intermediate device (e.g., personal electronic device, computer, smart phone, server, cloud network, mobile device, etc.) 2202 to communicate with external device 2102 to reconfigure equipment model 1922 (e.g., to change the variable defined by equipment model 1922, etc.). Similar to process 2100, process 2200 begins with step 2010 and step 2020 as previously described. As described in process 2000, memory 1930 may contain a library of various equipment model updates for various modular boards 1925.

In some implementations of process 2200, step 2030 and step 2110 are performed as described in process 2100. In step 2210, modular board recognizer 1920 requests the equipment model update from intermediate device 2202. This may cause a notification (e.g., prompt, message, image, etc.) to be pushed to the intermediate device. For example, a user may be requested to open an application (e.g., configuration application, etc.) associated with modular thermostat 600. In some implementations, step 2210 may occur via NFC, Bluetooth, Bluetooth low-energy, and other similar communication protocols. In step 2220, intermediate device 2202 routes the request to external device 2102. In some applications, step 2220 includes utilizing intermediate device 2202 to retransmit the request to external device 2102. In step 2230, external device 2102 identifies the requested equipment model update and transmits the equipment model update back to intermediate device 2202. Then, in step 2240, intermediate device 2202 routes the equipment model update back to modular board recognizer 1920. Similarly to process 2100, process 2200 concludes with step 2050 as previously described.

Figure 23A:
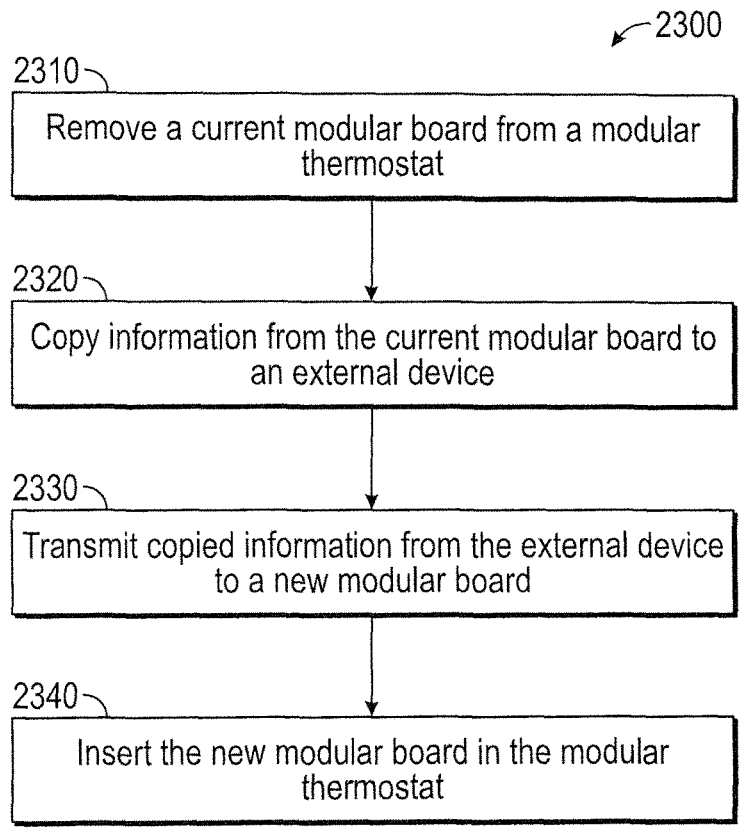
FIG. 23A is a flow diagram of a process for copying information from one modular board to another modular board, according to some embodiments.
Figure 23B:
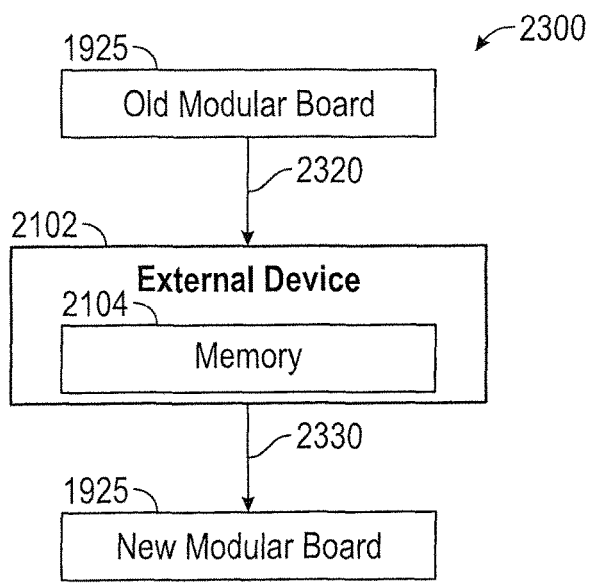
FIG. 23B is a block diagram of part of the process shown in FIG. 23A, according to some embodiments.

FIGS. 23A-23B illustrate a process 2300 for copying data from one modular board 1925 to another modular board 1925 using external device 2102. Process 2300 may be implemented in various situations such as upgrading, servicing, and customizing of modular thermostat 600. For example, a user may wish to upgrade communication capabilities of modular thermostat 600. One of the ways that this may be accomplished is by interchanging one networking board 820 with another networking board 820 having the target communication capabilities. Typically, process 2300 begins with step 2310 where an old modular board 1925 is removed from modular thermostat 600. A user may then place external device 2102 near the old modular board 1925 and use external device 2102, in step 2320, to copy information (e.g., settings, configuration information, logged data, etc.) from the old modular board 1925 to external device 2102 (e.g., to memory 2104, etc.). For example, in the step 2320, the user may activate an application on a smart phone and select a "Scanning Mode" within the application. Information may be transferred from the old modular board 1925 to external device 2102 over various communication protocols such as NFC, Bluetooth, Bluetooth low-energy, and other similar communication protocols.

After the information from the old modular board 1925 is copied to external device 2102, the user places a new modular board 1925 proximate external device 2102 and, in step 2330, external device 2102 transmits the copied information to the new modular board 1925. For example, in the step 2330, the user may utilize an application on a smart phone and select a "Transfer Mode" within the application. The transfer of information to the new modular board 1925 may be accomplished over the same or similar communication protocols described for step 2320. Typically, process 2300 terminates with the user inserting (e.g., connecting, coupling, etc.) the new modular board 1925 in modular thermostat 600. In some implementations of process 2300, step 2310 and/or step 2340 is eliminated and step 2320 and/or step 2330 occur while the modular board 1925 is in modular thermostat 600. For example, in step 2320, information may be copied from an old modular board 1925 while the old modular board 1925 is still inside modular thermostat 600. This may allow modular board 1925 to utilize various capabilities of modular thermostat 600 to facilitate information transfer to and from external device 2102. For example, modular board 1925 may receive electrical power from modular thermostat 600 that modular board 1925 may utilize to power communications devices that facilitate communication with external device 2102.

In some applications, process 2300 is implemented in conjunction with process 2000, process 2100, and/or process 2200. In this way, settings may be "cloned" from an old modular board 1925 to a new modular board 1925 and the equipment model 1922 may be dynamically updated with the capabilities of the new modular board 1925. In other applications, process 2300 may be implemented without any of process 200, process 2100, and/or process 2200. For example, if a new modular board 1925 has the same capabilities as an old modular board 1925 that it is replacing, there may only be a need to copy information to the new modular board 1925 and no need to update equipment model 1922. Similarly, equipment model 1922 may need to be updated (e.g., via process 2000, via process 2100, via process 220, etc.) when an old modular board 1925 is replaced with a new modular board 1925 without the need to copy information from the old modular board 1925 to the new modular board 1925. For example, equipment model 1922 may be updated such that the information for the new modular board 1925 is built into equipment model 1922.

Figure 24:
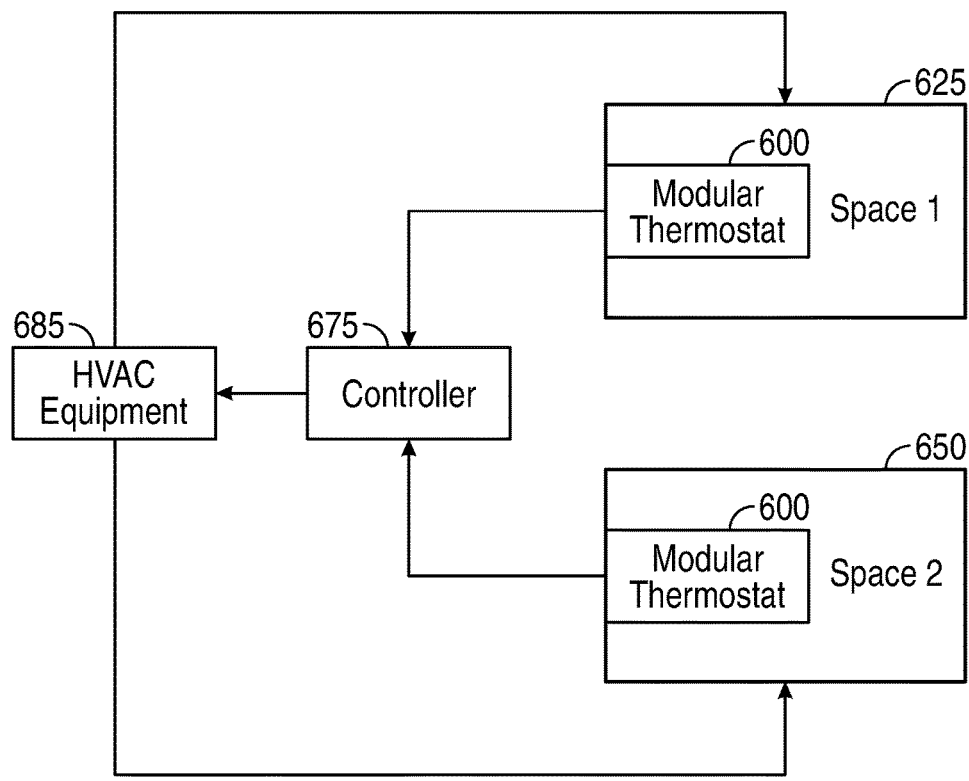
FIG. 24 is a block diagram of a system including multiple spaces, each of which includes an instance of the modular thermostat of FIG. 11 which provides control signals to a central controller for a HVAC system, according to some embodiments.

FIG. 24 illustrates a block diagram of a system including two modular thermostats 600, a first space 625 and a second space 650. According to various embodiments, the modular thermostats 600 are connected to a controller 675 and HVAC equipment 685. In application, the modular thermostats 600 receiving information regarding the condition of the corresponding space and transmit information to the controller. The controller 675 manipulates the HVAC equipment 685 in order to achieve the desired conditions with the corresponding space, as measured by the modular thermostat 600.

Figure 25:
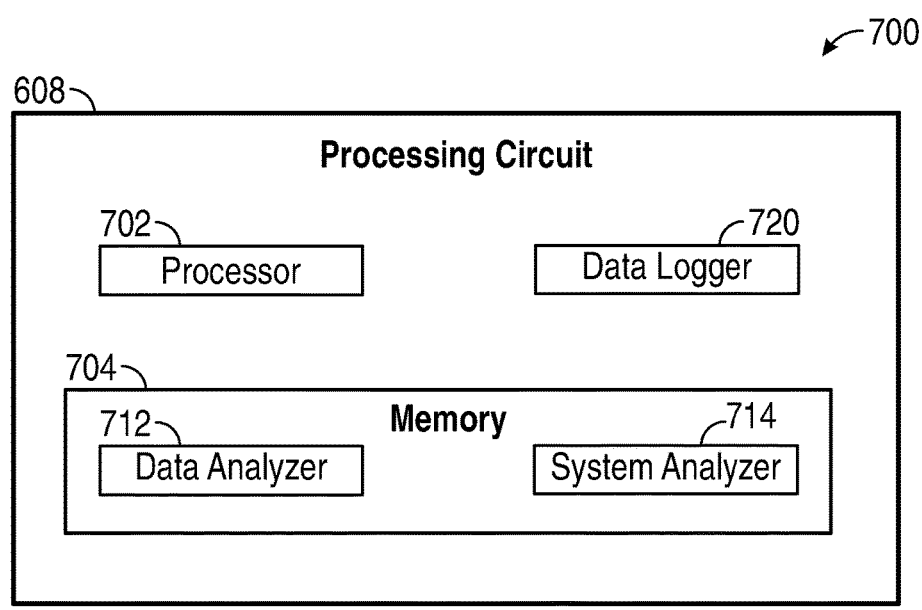
FIG. 25 is a system block diagram of a processing circuit of a modular thermostat, according to some embodiments.

Now referring to FIG. 25, processing circuit 608 is shown to include a processor 702 and memory 704. Processing circuit 608 is a general purpose processing circuit that may be adapted to be used with many various modular boards 1925, modular thermostat 600, and receiving bay 836. Processor 702 may be a general purpose or specific purpose processor 702, an application specific integrated circuit (ASIC), one or more field programmable gate arrays (FPGAs), a group of processing components, or other suitable processing components. Processor 702 is configured to execute computer code or instructions stored in memory 704 or received from other computer readable media (e.g., CDROM, network storage, a remote server, etc.).

Memory 704 may include one or more devices (e.g., memory units, memory devices, storage devices, etc.) for storing data and/or computer code for completing and/or facilitating the various processes described in the present disclosure. Memory 704 may include random access memory (RAM), read-only memory (ROM), hard drive storage, temporary storage, non-volatile memory, flash memory, optical memory, or any other suitable memory for storing software objects and/or computer instructions. Memory 704 may include database components, object code components, script components, or any other type of information structure for supporting the various activities and information structures described in the present disclosure. Memory 704 may be communicably connected to processor 702 via processing circuit 134 and may include computer code for executing (e.g., by processor 702) one or more processes described herein. When processor 702 executes instructions stored in memory 704 for completing the various activities described herein, processor 702 generally configures modular thermostat 600 (and more particularly processing circuit 608) to complete such activities.

Memory 704 is shown to include data analyzer 712 and system analyzer 714. However, according to some embodiments, processing circuit 608 may not include data analyzer 712 or system analyzer 714. It is to be understood that depending on the implementation of the processing circuit (e.g., on a particular modular board), that memory 704 may include additional devices specific to that implementation. For example, a processing circuit included on the occupancy detection board 822 may have a memory that includes occupancy detector, occupancy identifier, occupancy predictor, and voice recognition modular devices.

Processing circuit 608 is also shown to include a data logger 720. However, according to some embodiments, processing circuit 608 may not include data logger 720. System 700 is shown to include remote data storage 718. Data logger 720 may record data in memory 704. In some embodiments, processing circuit 608 may store data in remote data storage 718. While storing data locally may reduce access time, the cost of providing suitable storage space may discourage user adoption.

Figure 26:
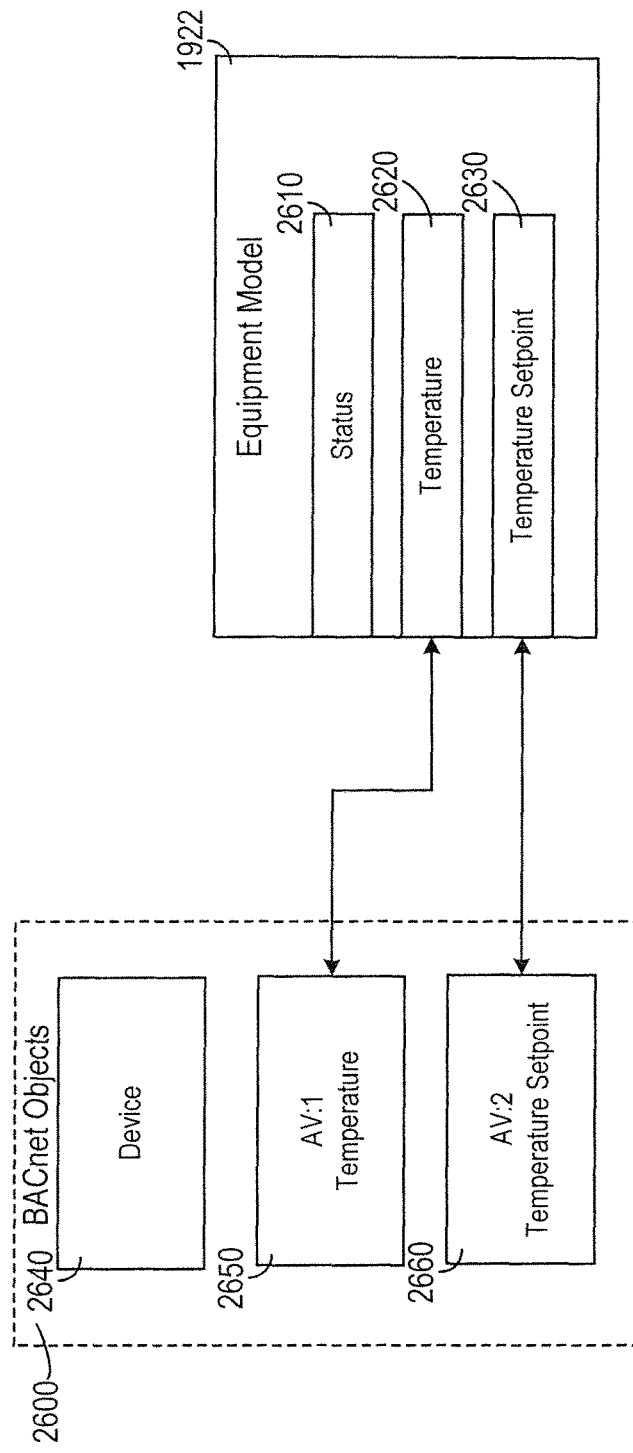
FIG. 26 is a block diagram of mapping an equipment model for a modular thermostat to BACnet objects, according to some embodiments.
Figure 27:
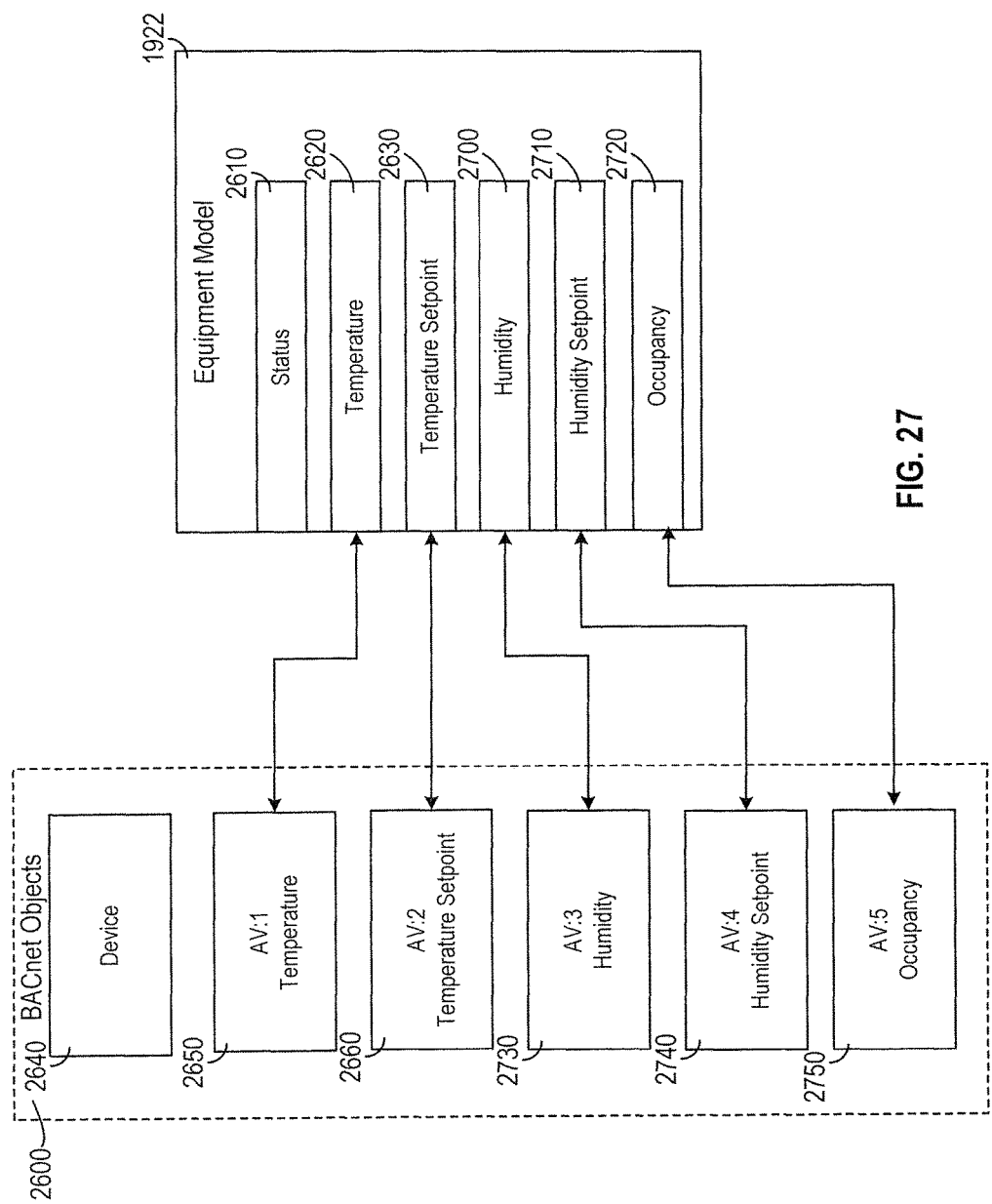
FIG. 27 is block diagram of mapping another equipment model for a modular thermostat to BACnet objects, according to some embodiments.

Referring now to FIGS. 26 and 27, attributes from equipment model 1922 are mapped to BACnet objects 2600 for interfacing with the BAS. FIGS. 26 and 27 illustrate equipment model 1922 and BACnet objects 2600 in a first state (FIG. 26) and a second state (FIG. 27), after being updated from the first state via a process (e.g., process 2000, process 2100, process 2200, process 2300, etc.). FIGS. 26 and 27 illustrate attributes of equipment model 1922, according to some embodiments. The attributes of equipment model 1922 can be defined by a user (e.g., using a data definition tool, or configuration tool as described below, etc.) and mapped to BACnet objects 2600 for interfacing with the BAS. Modular thermostat 600 presents itself to the BAS network via BACnet objects 2600. An equipment model, like equipment model 1922, defines equipment object attributes, view definitions, schedules, trends, and the associated value objects (e.g., analog value, binary value, multistate value, etc.) that are used for integration with other systems. In some cases, modular thermostat 600 stores equipment model 1922 internally. In other cases, modular thermostat 600 stores equipment model 1922 externally (e.g., within other devices). Modular thermostat 600 may automatically create equipment model 1922 based on the modular boards 1925 coupled to modular thermostat 600 (e.g., via automatic equipment discovery, etc.).

Equipment model 1922 defines corresponding BACnet objects 2600, view definitions, schedules, trends, and the associated value objects (e.g., analog value, binary value, multistate value, etc.) that are used for integration with other systems. Equipment model 1922 can include a collection of point objects that provide information about modular thermostat 600 (e.g., location of modular thermostat 600, network address of modular thermostat 600, model number of modular thermostat 600, etc.) and store present values of variables or parameters used by modular thermostat 600 as attributes of equipment model 1922. For example, equipment model 1922 can include point objects that store the values of input variables accepted by modular thermostat 600 (e.g., setpoint, control parameters, etc.), output variables provided by modular thermostat 600 (e.g., temperature measurements, occupancy measurements, feedback signals, etc.), configuration parameters used by modular thermostat 600 (e.g., operating mode, user settings, tuning parameters, etc.). The point objects in equipment model 1922 can be mapped to variables or parameters stored within modular thermostat 600 to expose those variables or parameters to external systems or devices in the BAS.

In FIG. 26, equipment model 1922 is shown to include a status attribute 2610, a temperature attribute 2620, and a temperature setpoint attribute 2630. Status attribute 2610, temperature attribute 2620, and temperature setpoint attribute 2630 are configured to define interactions between modular thermostat 600 and the BAS via BACnet objects 2600. Status attribute 2610 may define the status of modular thermostat 600. For example, status attribute 2610 may automatically be updated when modular board 600 is powered on, powered off, in need of maintenance, repair, and updating, and other similar status indications. Temperature attribute 2620 may communicate information from temperature board 828 to the BAS via BACnet objects 2600. For example, temperature attribute 2620 may communicate a real-time temperature reading of a room to the BAS. Temperature setpoint attribute 2630 may communicate a target temperature setpoint to the BAS via BACnet objects 2600. For example, a user may enter a target temperature for a room into modular thermostat (e.g., via display 802, etc.). This target temperature may be communicated to BACnet objects 2600 so that the BAS can perform various functions (e.g., heating, cooling, etc.) to achieve the target temperature in the room indicated by the user. In this way, the BAS may interact with modular thermostat 600 through BACnet objects 2600.

As shown in FIG. 26, BACnet objects 2600 are shown to include a device object 2640, an analog value (AV) temperature object 2650 mapped to temperature variable 2620, and an AC temperature setpoint object 2660 mapped to temperature setpoint variable 2630. The status variable 2610 is not shown mapped to a BACnet object. A user can choose to expose all or a subset of status attribute 2610, temperature attribute 2620, and temperature setpoint attribute 2630 as standard BACnet point objects by selectively mapping all or some of status attribute 2610, temperature attribute 2620, and temperature setpoint attribute 2630 to BACnet objects 2600. A BACnet/MSTP layer can read the one or more BACnet objects 2600 and provide the values of BACnet objects 2600 to the BAS (e.g., via a network, etc.).

In FIG. 27, equipment model 1922 has been updated to include a humidity attribute 2700, a humidity setpoint attribute 2710, and an occupancy attribute 2720. According to various embodiments, this update may occur because humidity board 824 and occupancy detection board 822 became coupled to (e.g., communicable with, etc.) modular thermostat 600. Humidity attribute 2700 may communicate a measured humidity, a determined humidity (e.g., using other data from modular thermostat 600, etc.), or other humidity related information to the BAS via BACnet objects 2600. Humidity setpoint attribute 2710 may communicate a target humidity to the BAS via BACnet objects 2600. For example, a user may enter a target humidity for a room into modular thermostat (e.g., via display 802, etc.). This target humidity may be communicated to BACnet objects 2600 so that the BAS can perform various functions (e.g., humidifying, dehumidifying, etc.) to achieve the target humidity in the room indicated by the user. Occupancy attribute 2720 may communicate a measured occupancy, a determined occupancy (e.g., using other data from modular thermostat 600, etc.), a maximum occupancy, measured or estimated effects of occupancy on other variables (e.g., temperature changes due to occupancy, humidity changes due to occupancy, network traffic due to occupancy, etc.), and other occupancy related information to the BAS via BACnet objects 2600.

By updating equipment model 1922, modular thermostat 600 may interact differently with the BAS via BACnet objects 2600. As shown in FIG. 27, BACnet objects 2600 are shown to include device object 2640, AV temperature object 2650 mapped to temperature attribute 2620, AC temperature setpoint object 2660 mapped to temperature setpoint attribute 2630, an AV humidity object 2730, an AV humidity setpoint object 2740, and an AV occupancy object 2750. The status attribute 2610 is not shown mapped to a BACnet object. A user can choose to expose all or a subset of status attribute 2610, temperature attribute 2620, temperature setpoint attribute 2630, humidity attribute 2700, humidity setpoint attribute 2710, and occupancy attribute 2720 as standard BACnet point objects by selectively mapping all or some of status attribute 2610, temperature attribute 2620, temperature setpoint attribute 2630, humidity attribute 2700, humidity setpoint attribute 2710, and occupancy attribute 2720 to BACnet objects 2600.

Temperature and Humidity Boards

In some embodiments, modular thermostat 600 includes temperature board 828. Temperature board 828 may be configured to monitor the temperature of a space through internal thermal sensors 1995 included on temperature board 828 or through externally mounted thermal sensors 1995. Both internal and external thermal sensors 1995 could be either contact or non-contact sensors. For example, contact sensors such a thermocouples, thermistors, resistance thermometers, liquid in glass thermometers, filled system thermometers, semiconductor temperature sensors, and other suitable sensors may be used. In addition, thermal imaging of a space could be performed and the image could be analyzed to determine a temperature of the space. For example, in an embodiment where modular thermostat 600 included at least temperature board 828 and networking board 820, several external thermal sensors 1995 could be set up within a space. In this example, the external thermal sensors 1995 could wirelessly, or through the use of wires, relay information back to modular thermostat 600.

According to various embodiments, modular thermostat 600 may also include humidity board 824. Humidity board 824 would operate in a manner similar to temperature board 828, substituting humidity for temperature. In some embodiments, humidity board 824 of modular thermostat 600 may control, vary, measure, and sense humidity, and operate in a manner similar to that of temperature board 828.

Networking Board

In some embodiments, modular thermostat 600 includes a networking board 820. Networking board 820 may enable modular thermostat 600 to connect to various other devices, to various other modular thermostats 600, the internet, a satellite network, a cellular network (e.g., as 3G, 4G, 4G LTE, etc.), Wi-Fi, ZigBee, cloud networks, or other suitable networks, may be desired. In order to provide connectivity, modular thermostat 600 may include networking board 820. Networking board 820 may include wireless internet, Bluetooth, infrared, radio, and other communications antennas. In addition, networking board 820 may allow modular thermostat 600 to connect to a network with other appliances, computers, and electronic devices. In some embodiments, networking board 820 may permit interconnectivity of multiple modular thermostats 600. Networking board 820 may also allow modular thermostat 600 to be capable of bi-directional communication with equipment through a data communications interface. In some embodiments, modular thermostat 600 may be able to communicate directly with devices. In the forthcoming disclosure, it is understood that if the modular thermostat 600 is said to "connect," "communicate," or otherwise interact with a system, device, or service, that modular thermostat 600 either connects directly (i.e., through a wire), or through the use of networking board 820.

According to these embodiments, the interconnected modular thermostats 600 may all be controlled by a central controller. Alternatively, modular thermostats 600 may be configured to be individually controlled but are configured to upload data to a central source. This central source could provide data logging for a wide range of modular thermostats 600 and could provide post-processing analysis of the entire data source that may be useful for users to optimize HVAC operations. Additionally, this post processing analysis could provide a useful tool to help users determine which modular thermostats 600 may benefit from a modular board 1925 upgrade, which modular board 1925 to upgrade, and what the estimated benefits of that upgrade would be. The post processing analysis may also allow users to determine HVAC system performance and may inform the user of, for example, suggested maintenance. According to some embodiments, networking board 820 may allow modular thermostat 600 to store data on a cloud network, rather than on-board memory such as that provided by motherboard 818 or processing circuit.

Networking board 820 may allow modular thermostat 600 to communicate via the internet. In some embodiments, a network-based application may be used instead of a web-based application, and may allow users to control modular thermostat 600 through any device which is connected to a local area network (LAN), regardless of Internet connectivity.

Through the use of networking board 820, modular thermostat 600 may be capable of communicating with a variety of devices, such as light system, refrigerator, security system, blinds or windows, door, fitness tracker or other wearable, either directly or through an intermediary. Modular thermostat 600 may also communicate directly with connected HVAC equipment. Modular thermostat 600 may also communicate with services such as a weather service, utility provider, network, or server. In some embodiments, networking board 820 of modular thermostat 600 communicates with devices through a router to which the devices are connected. In other embodiments, networking board 820 modular thermostat 600 communicates with devices through the network with which the devices are connected. User-owned portable electronic devices with which modular thermostat 600 through networking board 820 may communicate include devices, laptops, or tablets. It is to be understood that the resources with which modular thermostat 600 through networking board 820 is shown to be connected are not meant to be limiting, and that modular thermostat 600 through networking board 820 may be connected with any number of devices, services, and systems. Communication may occur over any of a number of protocols; for example, communication may occur over wired or wireless venues.

Networking board 820 may receive data from a weather service, as mentioned previously. In some embodiments, modular thermostat 600 may show the forecast on display 802. Networking board 820 may be able to send the forecast to a user's phone on a schedule or upon check-in with modular thermostat 600.

Networking board 820 may communicate with commercial storage solutions such as Dropbox, Google Docs, or Amazon Cloud. Networking board 820 may store data in such places in order to record trends and make data and analytic reports more accessible to users. Storing data in places other than local memory will also reduce the cost of modular thermostat 600 as a unit and promote sales.

Networking board 820 may communicate with the network to receive firmware updates. In some embodiments, the firmware updates are for connected equipment. For example, modular thermostat 600 may receive a notification that the AC unit has an available firmware update. Modular thermostat 600 may show a prompt on display 802 with a message such as: "A firmware update is available for your AC unit. Would you like to call your dealer to schedule a space visit?"

Networking board 820 may communicate with a user's utility provider. System performance data may be integrated with utility data in order to monitor a space's level of energy usage and inform users of their usage habits.

In some alternative embodiments, networking board 820 may facilitate connection with radio frequency identification (RFID) beacons. Through this connection, networking board 820 may identify locations of RFID beacons and provide the locations to modular thermostat 600. In this way, networking board 820 may facilitate tracking of the beacons (e.g., inventory tracking, patient tracking, etc.).

Occupancy Detection Board

In some embodiments, modular thermostat 600 includes an occupancy detection board 822. Occupancy detection board 822 adds further capabilities to modular thermostat 600, such as the ability to detect occupancy of the space in which modular thermostat 600 is located. In some embodiments, the occupancy detection board 822 may allow modular thermostat 600 to dynamically adjust the temperature of the space depending on the number of people in the space. The occupancy detection board 822 may include a number of sensors to determine the number of people in the space. According to some embodiments, the sensors may be motion sensors, thermal sensors, carbon dioxide ($CO_2$) sensors, cameras, microphones, capacitive sensors, or any number of other sensors suitable for detecting a person or a number of people in a space. According to some embodiments, the sensors may be cameras which detect heat signatures. According to other embodiments, the sensors may detect separate objects and distinguish between people and other objects. In some embodiments, the sensors could be any suitable transducer which detects some characteristic of their respective environment and surroundings. In one embodiment, occupancy detection board 822 is coupled to a $CO_2$ sensor that determines the amount of $CO_2$ in a given environment and occupancy detection board 822 correlates that amount of $CO_2$ to an occupancy of the environment.

According to some embodiments, occupancy detection board 822 may internally process data received from the sensors to determine whether occupancy has been detected. According to other embodiments, occupancy detection board 822 may utilize an external processor 702, such as that on motherboard 818, receiving bay 836, processing board 1910, a different modular board 1925, or externally through networking board 820. The memory 1822 of occupancy detection board 822 may include an occupancy identifier which is configured to process occupancy data collected to determine which user or users are in a space. The memory 1822 of occupancy detection board 822 may include an occupancy predictor which is configured to process calendar and scheduling data to determine when a user or users will be in a space, and the estimated demands of the HVAC system for the corresponding situation.

Determining the occupancy of a space allows modular thermostat 600 to make energy efficient operating decisions by reducing conditioning and power consumption when a space is unoccupied. User comfort may be increased when modular thermostat 600 is able to anticipate occupancy and condition the space to user preferences by the time the space is occupied. Occupancy based operation and control of an HVAC system allows users to conserve energy while adjusting a space to a comfortable environment without requiring a large amount of effort on the part of the user.

NFC Board

In some embodiments, modular thermostat 600 includes a NFC board 826. NFC board 826 enables modular thermostat 600 to communicate via NFC. Modular thermostat 600 may be able to base control and operation decisions on data obtained through near field communication (NFC). For example, a user may bring a personal electronic device within range of an NFC on NFC board 826. Modular thermostat 600 may receive identifying information through NFC. This information may include preferred settings for modular thermostat 600. Upon authentication and identification of the user through the electronic device, modular thermostat 600 may be receptive to commands. In some embodiments, modular thermostat 600 may provide an audible indication that the scan has occurred. For example, modular thermostat 600 may beep to let users know that scanning has been completed. In other embodiments, modular thermostat 600 may provide visual feedback that scanning has occurred. For example, modular thermostat 600 may flash display. In another embodiment modular thermostat 600 may communicate to the device to provide an indication, such as beeping, flashing, or vibrating, that scanning has occurred. Modular thermostat 600 may alert the user that scanning has occurred in any number of ways not limited to those enumerated. Upon receiving a command via NFC, modular thermostat 600 may transmit the command to connected equipment.

In some embodiments, modular thermostat 600 may automatically execute commands communicated through NFC. Users may be able to queue commands to modular thermostat 600 on their electronic device and transmit them through the use of NFC. In some embodiments, a user may send commands directly through user interface 406. In other embodiments, a user may send commands through the electronic device.

Energy Harvesting Board

Modular thermostat 600 may further include an energy harvesting board 830. In some embodiments, it may desirable for modular thermostat 600 to provide an energy harvesting (e.g., power harvesting, energy scavenging, etc.) capability. In particular, as energy harvesting technology advances and becomes more efficient, there will be many applications where integrating energy harvesting capabilities directly within the modular thermostat 600 is desirable. Energy harvesting board 830 may be inserted into modular thermostat 600 in a manner similar to the other modular boards 1925. Energy harvesting board 830 may be configured to harvest energy from solar power, wind energy, salinity gradients, kinetic energy, and other suitable external sources.

Energy harvesting board 830 may include any number of storage modules such as capacitors, super capacitors, and batteries. In some embodiments, energy harvesting board 830 may be configured to store energy on another modular board 1925 such as, for example, battery board 832. In some embodiments, energy harvesting board 830 may further include wireless transmitters for wirelessly communicating with other devices, or for transmitting power to various devices. In some embodiments, energy harvesting board 830 may be configured to communicate with networking board 820 to transmit energy from energy harvesting board 830, through modular thermostat 600, and from networking board 820 to various devices. In still other embodiments, energy harvesting board 830 may be configured to store energy on battery board 832, and networking board 820 may be configured to draw energy from battery board 832 and transmit that energy to various devices.

Battery Board

Modular thermostat 600 may further include battery board 832. Battery board 832 may be configured to provide energy to any number of modular boards 1925, sensors, external loads, internal components, or other suitable electrical loads. Battery board 832 may include a memory, a processor 702, a number of battery cells, a number of current sensors, a number of voltage sensors, a number of impedance sensors, and other suitable electrical components and hardware. Battery board 832 may include any type of battery cells such as alkaline, aluminum-air, aluminum ion, atomic, chromic acid, galvanic, lithium, lithium air, mercury, molten salt, nickel oxyhydroxide, oxyride, silver-oxide, solid-state, zinc-air, zinc-carbon, zinc-chloride, lead-acid, nickel-cadmium, nick-zinc, and other suitable battery cells may be used. In some embodiments, capacitors may be included with battery board 832, in addition to or in place of, the battery cells.

Battery board 832 may be configured to provide energy to modular thermostat 600 during routine operation, or in a backup-power mode. In some embodiments, when a failure of the surrounding power grid that modular thermostat 600 is connected to occurs, battery board 832 may provide energy to modular thermostat 600 the connection to the surrounding power grid has been reestablished. In some embodiments, battery board 832 may be configured to be constantly connected to modular thermostat 600 such that, in the event that a failure of the surrounding power grid occurs, battery board 832 will provide a coherent transition from the surrounding power grid to battery board 832. In some applications, such as medical, scientific, and engineering applications, it may be critical that modular thermostat 600 does not lose power. By utilizing the coherent transition, modular thermostat 600 may never lose power.

Battery board 832 may be configured to include wireless transmitters for communicating with other devices and/or modular boards 1925. Battery board 832 may be configured to wireless transmit energy to various devices. In some embodiments, battery board 832 may be in communication with energy harvesting board 830.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors 702, or by a special purpose computer processor 702 for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with processor 702. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with processor 702. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat, comprising:
   a motherboard configured to perform a thermostat function and generate a user interface comprising information relating to the thermostat function;
   a first modular board configured to be added to the thermostat by coupling the first modular board to the motherboard and to be removed from the thermostat by decoupling the first modular board from the motherboard, the first modular board configured to supplement the thermostat function performed by the motherboard when the first modular board is coupled to the motherboard; and
   a display communicably coupled to the motherboard and configured to display the user interface;
   wherein the motherboard is configured to adaptively reconfigure the user interface to include supplemental information provided by the first modular board in response to coupling of the first modular board to the motherboard.

2. The thermostat of claim 1, wherein the first modular board comprises a first sensor configured to obtain a first set of sensor data;
 wherein the first modular board is configured to provide the first set of sensor data to the motherboard when the first modular board is coupled to the motherboard; and
 wherein the motherboard is configured to adaptively reconfigure the user interface based on at least one of the first sensor and the first set of sensor data.

3. The thermostat of claim 1, wherein the first modular board is configured to facilitate communication between the motherboard and an external device using a first communication network;
 wherein the motherboard is configured to communicate with the external device over the first communication network when the first modular board is coupled to the motherboard; and
 wherein the motherboard is configured to adaptively reconfigure the user interface based on the communication between the motherboard and the external device.

4. The thermostat of claim 1, wherein the first modular board is interchangeable with a second modular board configured to be added to the thermostat by decoupling the first modular board from the motherboard and coupling the second modular board to the motherboard, the second modular board configured to supplement the thermostat function performed by the motherboard when the second modular board is coupled to the motherboard; and
 wherein the motherboard is configured to adaptively reconfigure the user interface to include supplemental information provided by the second modular board in response to coupling of the second modular board to the motherboard.

5. The thermostat of claim 4, wherein the second modular board comprises a second sensor configured to obtain a second set of sensor data;
 wherein the second modular board is configured to provide the second set of sensor data to the motherboard when the second modular board is coupled to the motherboard; and
 wherein the motherboard is configured to adaptively reconfigure the user interface based on at least one of the second sensor and the second set of sensor data.

6. The thermostat of claim 4, wherein the second modular board is configured to facilitate communication between the motherboard and an external device using a second communication network; and
 wherein the motherboard is configured to communicate with the external device over the second communication network when the second modular board is coupled to the motherboard.

7. The thermostat of claim 4, further comprising an IR gun communicably coupled to the motherboard;
 wherein the thermostat is mounted at least partially within a wall;
 wherein the IR gun is configured to project a beam into an environment proximate the thermostat, the beam configured obtain a temperature measurement of a space or surface in the environment;
 wherein the thermostat is mounted within the wall such that the display is substantially flush with the wall and such that the motherboard is located within the wall;
 wherein the first modular board is located within the wall when the first modular board is coupled to the motherboard; and
 wherein the second modular board is located within the wall when the second modular board is coupled to the motherboard.

8. The thermostat of claim 4, wherein the thermostat comprises an equipment model that defines a variable used by the thermostat and is configured to facilitate interactions between the thermostat and a building automation system;
 wherein the equipment model has a first configuration when the first modular board is coupled to the motherboard; and
 wherein the equipment model has a second configuration when the second modular board is coupled to the motherboard.

9. The thermostat of claim 8, wherein the motherboard comprises a modular board recognizer;
 wherein the second modular board transmits a signal to the modular board recognizer when the second modular board is coupled to the motherboard;
 wherein, in response to receiving the signal from the second modular board, the modular board recognizer requests an equipment model update;
 wherein the modular board recognizer receives the equipment model update; and
 wherein the modular board recognizer updates the equipment model, using the equipment model update, such that the equipment model has the second configuration.

10. The thermostat of claim 9, wherein the modular board recognizer receives the equipment model update from an external device;
 wherein the external device contains a library of equipment model updates; and
 wherein the external device selects the equipment model update from the library of equipment model updates based on the signal transmitted from the second modular board to the modular board recognizer.

11. A system for operating a thermostat, the system comprising:
 a thermostat for interacting with a building automation system, the thermostat configured to provide a user interface that facilitates user interaction with the building automation system, the thermostat comprising;
  a first modular board configured to perform a thermostat function, the first modular board configured to be removable from the thermostat;
  a display configured to display the user interface; and
  an equipment model that defines a variable used by the thermostat and is configured to facilitate interactions between the thermostat and the building automation system, the equipment model based on the thermostat function; and
 an external device configured to communicate with the thermostat, the external device containing a library of equipment model updates;
 wherein the thermostat is configured to adaptively reconfigure the user interface to remove supplemental information provided by the first modular board in response to removal of the first modular board.

12. The system of claim 11, wherein the thermostat further comprises a modular board recognizer configured to update the equipment model;
 wherein the modular board recognizer communicates an equipment model update request to the external device when an additional modular board is coupled to the thermostat, the equipment model update request based on a thermostat function associated with the additional modular board;

wherein the modular board recognizer receives an equipment model update, in response to the equipment model update request, the equipment model update based on the thermostat function performed associated with the additional modular board; and wherein the modular board recognizer is configured to update the equipment model based on the equipment model update.

13. The system of claim 11, wherein the thermostat further comprises a second modular board configured to perform a second thermostat function, the second modular board configured to be removable from the thermostat;

wherein the thermostat function performed by the first modular board is different from the second thermostat function performed by the second modular board; and wherein the equipment model is additionally based on the second thermostat function performed by the second modular board.

14. The system of claim 13, wherein the thermostat function performed by the first modular board is to provide temperature data to the thermostat; and wherein the second thermostat function performed by the second modular board is to provide humidity data to the thermostat.

15. The system of claim 11, wherein the thermostat further comprises an IR gun;

wherein the thermostat is mounted at least partially within a wall; and wherein the IR gun is configured to determine a temperature measurement of a space or surface external to the thermostat and proximate the thermostat.

16. The system of claim 11, further comprising a personal electronic device communicable with the thermostat and the external device;

wherein the thermostat is configured to transmit an equipment model update request to the personal electronic device;

wherein the personal electronic device is configured to route the equipment model update request to the external device;

wherein the external device is configured to transmit an equipment model update, based on the equipment model update request, to the personal electronic device;

wherein the personal electronic device is configured to transmit the equipment model update to the thermostat; and wherein the thermostat is configured to apply the equipment model update to the equipment model.

17. A method for reconfiguring a thermostat, the method comprising:

copying configuration information from an old modular board in the thermostat onto a personal electronic device;

removing the old modular board from the thermostat connecting a new modular board to the thermostat, the new modular board configured to perform a thermostat function;

copying the configuration information from the personal electronic device to the new modular board;

receiving, by the thermostat, a signal from the new modular board, the signal including information about the new modular board;

transmitting, by the thermostat, an equipment model update request based on the signal from the new modular board;

receiving, by the thermostat, an equipment model update in response to the equipment model update request, the equipment model update based on the signal from the new modular board; and applying, by the thermostat, the equipment model update to an equipment model of the thermostat;

wherein the equipment model defines a variable used by the thermostat and is configured to facilitate interactions between the thermostat and a building automation system.

18. The method of claim 17, further comprising adapting a user interface provided by a display of the thermostat to include supplemental information provided by the new modular board based on the thermostat function performed by the new modular board.

19. The method of claim 17, further comprising:

receiving, by the personal electronic device, the equipment model update request from the thermostat;

transmitting, by the personal electronic device, the equipment model update request to an external device;

selecting, by the external device, the equipment model update based on the equipment model update request;

transmitting, by the external device, the equipment model to the personal electronic device; and transmitting, by the personal electronic device, the equipment model to the thermostat.

* * * * *